US011817985B2

(12) United States Patent
Hu et al.

(10) Patent No.: US 11,817,985 B2
(45) Date of Patent: Nov. 14, 2023

(54) EHT-LTF SEQUENCE DESIGN FOR DISTRIBUTED-TONE RESOURCE UNITS WITH PAPR REDUCTION

(71) Applicant: MediaTek Singapore Pte. Ltd., Singapore (SG)

(72) Inventors: Shengquan Hu, San Jose, CA (US); Jianhan Liu, San Jose, CA (US); Gary A. Anwyl, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/671,567

(22) Filed: Feb. 14, 2022

(65) Prior Publication Data

US 2022/0271986 A1 Aug. 25, 2022

Related U.S. Application Data

(60) Provisional application No. 63/274,038, filed on Nov. 1, 2021, provisional application No. 63/256,651, filed (Continued)

(51) Int. Cl.
*H04W 84/12* (2009.01)
*H04L 5/00* (2006.01)
*H04L 27/26* (2006.01)

(52) U.S. Cl.
CPC ...... *H04L 27/26136* (2021.01); *H04L 5/0048* (2013.01); *H04L 5/0053* (2013.01)

(58) Field of Classification Search
CPC . H04W 84/12; H04W 72/04; H04W 72/0453; H04W 76/15; H04W 74/08;
(Continued)

(56) References Cited

U.S. PATENT DOCUMENTS

2016/0142187 A1 5/2016 Yang et al.
2020/0014509 A1 1/2020 Asterjadhi et al.
(Continued)

FOREIGN PATENT DOCUMENTS

CN 106797278 A 5/2017
CN 107113267 A 8/2017
(Continued)

OTHER PUBLICATIONS

European Patent Office, European Search Report for European Patent Application No. 22156818.1, dated Jun. 23, 2022.
(Continued)

*Primary Examiner* — Eva Y Puente
(74) *Attorney, Agent, or Firm* — Han IP PLLC; Andy M. Han

(57) ABSTRACT

Various schemes pertaining to extremely-high-throughput long training filed (EHT-LTF) sequence design for distributed-tone resource units (dRUs) with peak-to-average power ration (PAPR) reduction in 6 GHz low-power indoor (LPI) systems are described. A communication entity distributes subcarriers of a RU with a resolution of four times (4×) subcarrier spacing to generate a 4×EHT-LTF of an uplink (UL) trigger-based (TB) physical-layer protocol data unit (PPDU) with a dRU. The communication entity then transmits the 4×EHT-LTF for the UL TB PPDU with dRU.

16 Claims, 86 Drawing Sheets

Related U.S. Application Data on Oct. 18, 2021, provisional application No. 63/246,827, filed on Sep. 22, 2021, provisional application No. 63/200,497, filed on Mar. 11, 2021, provisional application No. 63/150,152, filed on Feb. 17, 2021.

(58) Field of Classification Search

CPC . H04W 28/06; H04W 72/23; H04W 74/0808; H04L 27/2602; H04L 5/0048; H04L 5/0044; H04L 5/0053; H04L 1/00; H04L 5/00; H04L 27/2603; H04L 27/26; H04L 5/0007; H04B 7/0452; H04B 7/0413; H04B 7/0617; H04B 7/024; H04B 7/0697; H04B 7/0417; H04B 7/06; H04B 7/0626

USPC .......................................................... 375/262

See application file for complete search history.

(56) References Cited

U.S. PATENT DOCUMENTS

| | | | | |
|---|---|---|---|---|
| 2020/0413482 | A1* | 12/2020 | Takada | H04L 1/0006 |
| 2021/0006494 | A1 | 1/2021 | Yazawa et al. | |
| 2021/0044398 | A1* | 2/2021 | Noh | H04L 1/0041 |
| 2021/0195591 | A1* | 6/2021 | Li | H04W 16/14 |
| 2023/0014333 | A1* | 1/2023 | Park | H04L 5/00 |
| 2023/0016370 | A1* | 1/2023 | Kim | H04L 65/40 |

FOREIGN PATENT DOCUMENTS

| | | | |
|---|---|---|---|
| CN | 110876200 | A | 3/2020 |
| CN | 107113140 | B | 8/2020 |
| TW | I577148 | B | 4/2017 |
| TW | 201935898 | A | 9/2019 |
| WO | WO 2020111638 | A1 | 6/2020 |
| WO | WO 2020122523 | A1 | 6/2020 |
| WO | WO 2021006494 | A1 | 1/2021 |

OTHER PUBLICATIONS

Taiwan Intellectual Property Office, Office Action for Taiwan Patent Application No. 111105595, dated Jul. 27, 2022.

Liu et al.; "EHT LTF Sequence"; IEEE 802.11-20/1495r0; [https://mentor.ieee.org/802.11/dcn/20/11-20-1495-00-00be-bdt-of-eht-ltf-sequences.docx]; Sep. 15, 2020.

European Patent Office, Extended European Search Report for European Patent Application No. 22156940.3, dated Jul. 13, 2022.

Taiwan Intellectual Property Office, Office Action for Taiwan Patent Application No. 111103230, dated Jul. 26, 2022.

Edward Au (Huawei); "Specification Framework for TGbe", vol. 802.11 EHT; 802.11be, No. 14, (Sep. 5, 2020), IEEE, Sep. 5, 2020, [https://mentor.ieee.org/802.11/dcn/19/11-19-1262-14-00be-specification-framework-for-tgbe.docx].

European Patent Office, European Search Report for European Patent Application No. 22153682.4, dated Jun. 27, 2022.

China National Intellectual Property Administration, First Office Action in China Patent Application No. 202210140775.3, dated Apr. 25, 2023.

* cited by examiner

200

$EHTLTF_{-122,122} =$

Data and pilot subcarrier indices for interleaved RUs (dRU) in a 20 MHz EHT TB PPDU for 6GHz LPI

| dRU type | dRU index and subcarrier range | | | | |
|---|---|---|---|---|---|
| 26-tone dRU<br>i=1:9 | dRU1<br>[-120:9:-12, 6:9:114] | dRU2<br>[-116:9:-8, 10:9:118] | dRU3<br>[-118:9:-10, 8:9:116] | dRU4<br>[-114:9:-6, 12:9:120] | dRU5<br>[-112:9:-4, 5:9:113] |
| | dRU6<br>[-119:9:-11, 7:9:115] | dRU7<br>[-115:9:-7, 11:9:119] | dRU8<br>[-117:9:-9, 9:9:117] | dRU9<br>[-113:9:-5, 4:9:112] | |
| 52-tone dRU<br>i=1:4 | dRU1<br>26-tone [dRU1, dRU2] | | dRU2<br>26-tone [dRU3, dRU4] | | |
| | dRU3<br>26-tone [dRU6, dRU7] | | dRU4<br>26-tone [dRU8, dRU9] | | |
| 106-tone dRU<br>i=1:2 | dRU1<br>26-tone [dRU1~4], [-3, 3] | | dRU2<br>26-tone [dRU6~9], [-2, 2] | | |

EHT-LTF sequence to be transmitted for 26-tone dRU1 in BW20

$EHTLTF_{-122,122}$ =

$$r_{\text{EHT-LTF},r,u}^{(i_{TX})}(t) = \frac{1}{\sqrt{N_{SS,r,total}\left|K_r^{\text{EHT-LTF}}\right|}} \sum_{n=0}^{N_{\text{EHT-LTF}}-1} w_{T_{\text{EHT-LTF}}}(t - nT_{\text{EHT-LTF}})$$

$$\sum_{k \in K_r} \sum_{m=1}^{N_{SS,r,u}} ([Q_{k,u}]_{i_{TX},m} [A_{\text{EHT-LTF}}^{k}]_{(M_{r,u}+m),(n+1)} \text{EHT-LTF}_{k,u,m}$$

$$\exp(j2\pi k \Delta_{F,\text{EHT}}(t - nT_{\text{EHT-LTF-SYM}} - T_{GI,\text{EHT-LTF}} - T_{CS,\text{EHT}}(M_{r,u}+m))))$$

*Kr* denotes a set of subcarrier indices for the tones in dRU

| RU type | RU index and subcarrier range | | | | |
|---|---|---|---|---|---|
| 26-tone RU | RU 1 [−121: −96] | RU 2 [−95: −70] | RU 3 [−68: −43] | RU 4 [−42: −17] | RU 5 [−16: −4, 4: 16] |
| | RU 6 [17: 42] | RU 7 [43: 68] | RU 8 [70: 95] | RU 9 [96: 121] | |
| 52-tone RU | RU 1 [−121: −70] | RU 2 [−68: −17] | RU 3 [17: 68] | RU 4 [70: 121] | |
| 106-tone RU | RU 1 [−122: −17] | | RU 2 [17: 122] | | |
| 242-tone RU | RU 1 [−122: −2, 2:122] | | | | |

FIG. 6

Kr denotes a set of subcarrier indices for the tones in the dRU being transmitted

1300

$EHT\text{-}LTF_{dRU26,BW20}$ = [-1 1 -1 -1 1 1 -1 1 -1 -1 -1 -1 -1 1 -1 1 1 1 -1 -1 1 1 1 -1 -1 -1];

$EHT\text{-}LTF_{dRU26,BW40}$ = $EHT\text{-}LTF_{dRU26,BW20}$ $EHT\text{-}LTF_{dRU26,BW80}$ = [1 -1 1 1 1 -1 -1 1 1 1 -1 -1 -1 -1 1 -1 -1 1 1 -1 1 -1 -1 -1 -1 -1];

$EHT\text{-}LTF_{dRU52,BW20}$ =
[-1 1 -1 -1 -1 1 1 -1 1 1 1 1 -1 -1 -1 1 1 1 1 -1 -1 1 1 1 1 1 1 -1 1 1 1 -1 1 1 -1 -1 -1 1 -1 1 -1 -1 1 1 -1 1 -1 1 1 1 1 1];

$EHT\text{-}LTF_{dRU52,BW40}$ =
[-1 -1 -1 -1 1 -1 -1 1 1 -1 1 -1 1 -1 1 1 -1 1 -1 -1 -1 1 1 -1 -1 -1 -1 -1 -1 -1 1 -1 -1 1 1 -1 1 -1 -1 -1 -1 -1 1 -1 1 1 1 -1 -1 1 1 1];

$EHT\text{-}LTF_{dRU52,BW80}$ = $EHT\text{-}LTF_{dRU52,BW20}$

EHT-LTF$_{dRU106,BW20}$ =

[-1 -1 1 1 -1 1 -1 1 -1 1 1 -1 1 -1 -1 -1 1 1 -1 -1 -1 -1 -1 -1 -1 1 -1 -1 1 1 -1 1 -1 -1 -1 -1 -1 1 -1 1 1 1 -1 -1 1 1 1 -1 -1 -1 -1 -1 -1
1 -1 -1 1 1 -1 1 -1 1 -1 1 1 -1 1 -1 -1 -1 1 1 -1 -1 -1 1 1 1 1 -1 1 1 -1 -1 1 -1 1 1 1 1 1 -1 1 -1 -1 -1 1 1 -1 -1 -1 1 -1 1 1 1];

EHT-LTF$_{dRU106,BW40}$ =

[-1 1 -1 1 -1 1 1 1 -1 1 1 1 -1 -1 1 -1 -1 -1 -1 1 1 -1 -1 -1 -1 1 -1 1 -1 1 1 -1 -1 1 -1 -1 -1 1 1 -1 1 1 1 1 -1 -1 -1 1 1 1 1 -1
1 1 1 1 1 1 1 -1 1 1 1 -1 1 1 -1 -1 -1 1 -1 1 -1 -1 1 1 -1 1 -1 1 1 1 1 1 -1 -1 1 1 1 -1 1 1 -1 -1 -1 1 -1 1 1 -1 1 1 -1 1 -1];

EHT-LTF$_{dRU106,BW80}$ =

$EHT\text{-}LTF_{dRU242,BW40}$ =

[-1 -1 -1 1 1 -1 -1 -1 -1 -1 -1 -1 -1 1 -1 -1 1 1 1 -1 1 1 -1 1 1 -1 1 1 1 -1 1 1 -1 -1 -1 1 1 -1 -1 -1 1 1 -1 -1 -1 -1 -1 -1 -1 1 -1 -1 1 1 -1 1 -1 -1 -1 -1 -1 1 -1 1 1 1 -1 -1 1 1 1

1 -1 -1 -1 -1 -1 -1 1 -1 -1 1 1 -1 1 -1 1 -1 1 1 -1 1 -1 -1 -1 1 1 -1 -1 -1 1 1 1 -1 1 1 1 1 -1 1 1 -1 -1 1 -1 1 1 1 1 1 -1 1 -1 -1 -1 1 1 -1 -1 -1 1 -1 1 1 1

1 -1 1 1 -1 -1 1 -1 1 -1 1 -1 -1 1 -1 1 1 1 -1 -1 1 1 1 1 1 1 1 -1 1 1 -1 -1 1 -1 1 1 1 1 1 1 -1 1 -1 -1 -1 1 1 -1 -1 -1 1 1 -1 -1 -1 -1 1 1 -1 -1 1 1

-1 1 -1 1 -1 1 1 -1 1 -1 -1 -1 1 1 -1 -1 -1 1 1 1 1 -1 1 1 -1 -1 1 -1 1 1 1 1 1 -1 1 1 -1 -1 -1 1 1 -1 -1 -1 1 -1 -1 -1 -1 1 -1 -1 1 1 -1 1 -1 1 -1 1 1 1 -1 1 1];

$EHT\text{-}LTF_{dRU242,BW80}$ =

$EHT\text{-}LTF_{dRU78,BW20}$ =

[1 -1 1 -1 1 1 -1 1 1 1 -1 -1 1 -1 -1 1 -1 1 -1 1 1 1 -1 1 1 1
-1 -1 1 -1 -1 -1 -1 -1 1 1 -1 -1 -1 -1 -1 -1 1 -1 1 -1 -1 -1 -1 1 -1 1 1 -1 -1 1 -1 -1 -1 -1 1 1 -1 1 1 1 1 1 1 1 -1 1 1 -1 -1 -1 -1 1]

Used for dRU26 of dMRU78 (= dRU26 + dRU52)

Used for dRU52 of dMRU78 (= dRU26 + dRU52)

$EHT\text{-}LTF_{dRU78,BW40}$ =

[-1 -1 -1 -1 1 -1 -1 1 1 -1 1 -1 1 -1 1 1 -1 1 -1 -1 -1 1 1 -1 -1 -1
-1 -1 -1 -1 1 -1 -1 1 1 -1 1 -1 -1 -1 -1 -1 1 -1 1 1 1 -1 -1 1 1 1 -1 1 -1 -1 -1 -1 1 -1 -1 1 1 -1 1 -1 1 -1 1 1 -1 1 -1 -1 -1 1 1 -1]

$EHT\text{-}LTF_{dRU78,BW80}$ =

[1 -1 1 -1 1 1 -1 1 1 1 -1 -1 1 -1 -1 1 -1 1 -1 1 1 1 -1 1 1 1
-1 -1 1 -1 -1 -1 -1 -1 1 1 -1 -1 -1 -1 -1 -1 1 -1 1 -1 -1 -1 -1 1 -1 1 1 -1 -1 1 -1 -1 -1 -1 1 1 -1 1 1 1 1 1 1 1 -1 1 1 -1 -1 -1 -1 1 1 ]

$EHT\text{-}LTF_{dRU132,BW20}$ =

Used for dRU26 of dMRU132 (= dRU26 + dRU106)

[1 -1 -1 1 -1 -1 -1 -1 1 -1 1 1 -1 -1 -1 1 -1 -1 -1 -1 1 -1 1 1 1 1
1 1 -1 -1 -1 -1 1 -1 -1 1 -1 -1 -1 1 1 -1 -1 -1 1 -1 -1 1 -1 1 1 1 -1 1 -1 1 -1 -1 -1 -1 1 1 1 1 1 -1 -1 1 -1 1 -1 -1 -1 1 1 1 -1 -1 1 1 -1
-1 -1 1 1 1 -1 -1 1 1 -1 -1 1 -1 1 1 -1 1 -1 1 1 1 -1 1 -1 1 1 1 1 1 1 -1 -1 -1 1 -1 1 -1 -1 -1 1 -1 -1 1 1 1 1 1 1 -1 1 -1 1 1 1]

Used for dRU106 of dMRU132 (= dRU26 + dRU106)

$EHT\text{-}LTF_{dRU132,BW40}$ =

[-1 1 1 -1 -1 1 -1 -1 -1 1 1 -1 1 1 1 1 -1 -1 -1 1 1 1 1 -1 1 1
1 1 1 1 1 -1 1 1 1 -1 1 1 -1 -1 -1 1 -1 1 -1 -1 1 1 -1 1 -1 1 1 1 1 1 -1 -1 1 1 1 -1 1 1 -1 -1 -1 1 -1 1 1 -1 1 1 -1 1 -1 -1 1 1
-1 1 -1 1 -1 1 1 1 -1 1 1 1 -1 -1 1 -1 -1 -1 -1 -1 1 1 -1 -1 -1 -1 1 -1 1 -1 1 1 -1 -1 1 -1 -1 -1 1 1 -1 1 1 1 1 -1 -1 -1 1 1 1 1 -1]

$EHT\text{-}LTF_{dRU132,BW80}$ =

$EHT\text{-}LTF_{dRU26,BW20}$ = [-1 1 -1 -1 1 1 1 -1 -1 -1 1 1 1 1 1 1 -1 1 -1 1 -1 -1 -1 1 1 1 1 -1 1 1 1]

$EHT\text{-}LTF_{dRU26,BW40}$ = [-1 1 -1 1 1 1 1 1 1 1 -1 -1 -1 -1 1 1 -1 -1 1 1 -1 -1 -1 1 1 1 -1 -1 -1 1 1]

$EHT\text{-}LTF_{dRU26,BW80}$ = $EHT\text{-}LTF_{dRU26,BW40}$ $EHT\text{-}LTF_{dRU52,BW20}$ =
[-1 -1 -1 -1 1 -1 -1 1 1 -1 1 -1 -1 -1 -1 -1 1 -1 1 1 1 -1 -1 1 1 1 -1 -1 1 1 1 1 -1 1 1 -1 -1 1 -1 1 -1 1 -1 -1 1 -1 1 1 1 -1 -1 1]

$EHT\text{-}LTF_{dRU52,BW40}$ =
[1 1 1 1 -1 1 1 -1 -1 1 -1 1 1 1 1 1 -1 1 -1 -1 -1 1 1 -1 -1 -1 1 -1 1 1 1 1 -1 1 1 -1 -1 1 -1 1 -1 1 -1 -1 1 -1 1 1 1 -1 -1 1]

$EHT\text{-}LTF_{dRU52,BW80}$ =
[-1 -1 1 1 1 1 1 -1 1 1 -1 -1 -1 1 -1 -1 -1 1 -1 1 -1 1 -1 1 1 -1 1 -1 1 -1 1 1 1 -1 1 1 1 -1 -1 1 -1 -1 -1 -1 -1 1 1 -1 -1 -1 -1 1 -1 1]

Figure 18:
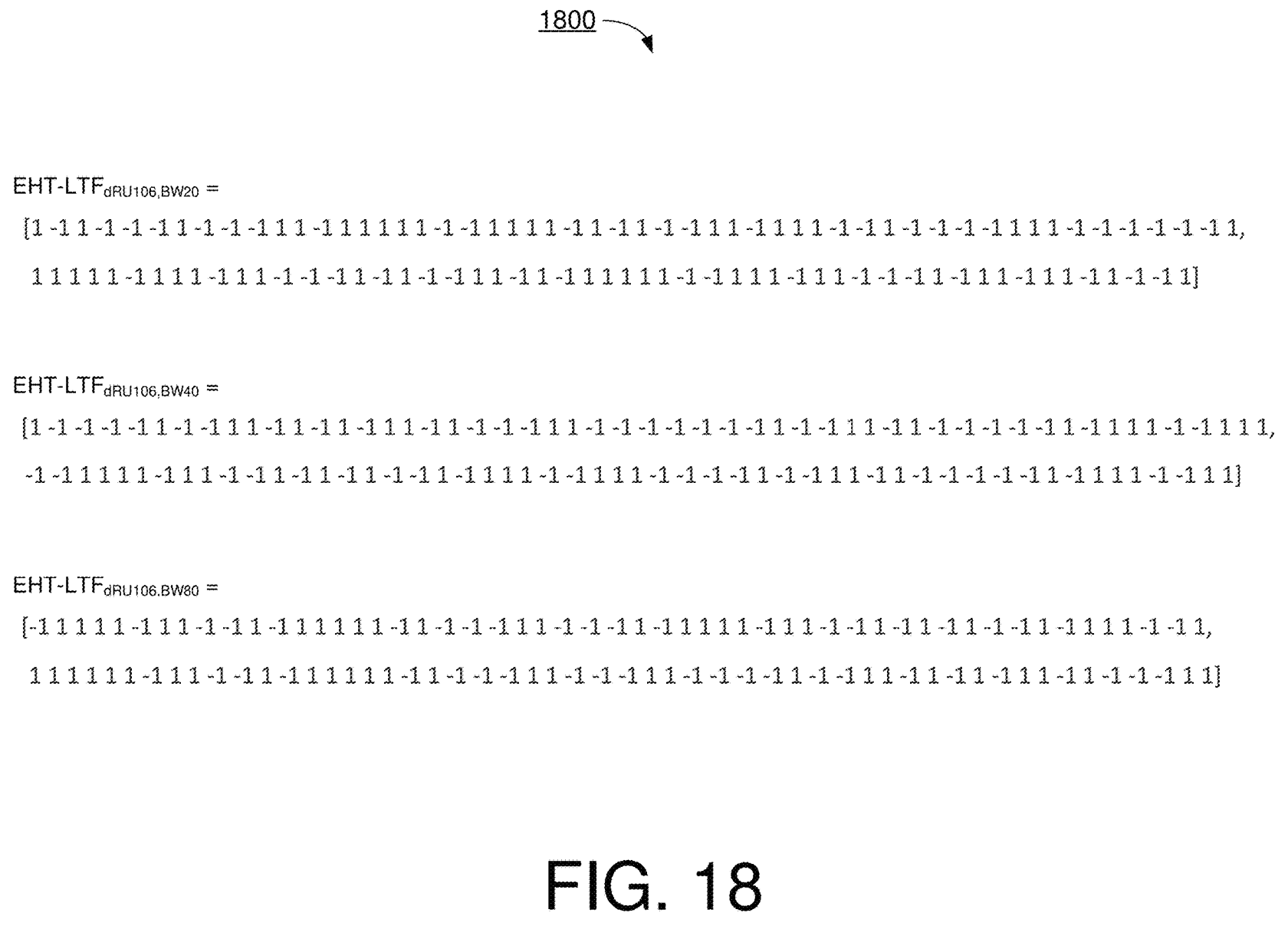

$EHT\text{-}LTF_{dRU106,BW20}$ =

[1 -1 1 -1 -1 -1 1 -1 -1 -1 1 1 -1 1 1 1 1 1 -1 -1 1 1 1 1 -1 1 -1 1 -1 -1 1 1 -1 1 1 1 -1 -1 1 -1 -1 -1 -1 1 1 1 -1 -1 -1 -1 -1 -1 1, 1 1 1 1 1 -1 1 1 1 -1 1 1 -1 -1 -1 1 -1 1 -1 -1 1 1 -1 1 -1 1 1 1 1 1 -1 -1 1 1 1 -1 1 1 -1 -1 -1 1 -1 1 1 -1 1 1 -1 1 -1 -1 1]

$EHT\text{-}LTF_{dRU106,BW40}$ =

[1 -1 -1 -1 -1 1 -1 -1 1 1 -1 1 -1 1 -1 1 1 -1 1 -1 -1 -1 1 1 -1 -1 -1 -1 [illegible] 1 -1 -1 -1 -1 -1 1 -1 1 1 1 -1 -1 1 1 1 1, -1 -1 1 1 1 1 -1 1 1 -1 -1 1 -1 1 -1 1 1 [illegible] 1 -1 -1 -1 -1 -1 1 -1 1 1 1 -1 -1 1 1 1]

$EHT\text{-}LTF_{dRU106,BW80}$ =

[-1 1 1 1 1 -1 1 1 -1 -1 1 -1 1 1 1 1 1 [illegible] 1 1 -1 1 -1 -1 1 -1 1 1 1 -1 -1 1, 1 1 1 1 1 1 -1 1 1 -1 -1 1 -1 1 1 1 1 1 [illegible] -1 1 -1 1 -1 1 1 -1 1 -1 -1 -1 1 1]

$EHT\text{-}LTF_{dRU242,BW40}$ =

[-1 -1 -1 1 1 -1 -1 -1 -1 -1 -1 -1 -1 1 -1 -1 1 1 -1 1 -1 1 -1 1 1 -1 1 -1 -1 -1 1 1 -1 -1 -1 -1 -1 -1 -1 1 -1 -1 1 1 -1 1 -1 -1 -1 -1 -1 1 -1 1 1 1 -1 -1 1 1,

1 -1 -1 -1 -1 -1 -1 1 -1 -1 1 1 -1 1 -1 1 -1 1 1 -1 1 -1 -1 -1 1 1 -1 -1 -1 1 1 1 1 -1 1 1 -1 -1 1 -1 1 1 1 1 1 -1 1 -1 -1 -1 1 1 -1 -1 -1 1 -1 1 1 1

1 -1 1 1 -1 -1 1 -1 1 -1 1 -1 -1 1 -1 1 1 1 -1 -1 1 1 1 1 1 1 1 -1 1 1 -1 -1 1 -1 1 1 1 1 1 -1 1 -1 -1 -1 1 1 -1 -1 -1 1 1 -1 -1 -1 -1 1 -1 -1 1 1

-1 1 -1 1 -1 1 1 -1 1 -1 -1 -1 1 1 -1 -1 -1 1 1 1 1 -1 1 1 -1 -1 1 -1 1 1 1 1 1 -1 1 -1 -1 -1 1 1 -1 -1 -1 1 -1 -1 -1 -1 1 -1 -1 1 1 -1 1 -1 1 -1 1 1 -1 1]

$EHT\text{-}LTF_{dRU242,BW80}$ =

$EHT\text{-}LTF_{dRU78,BW20}$ =

[-1 1 -1 -1 -1 1 1 -1 -1 -1 1 -1 -1 1 -1 1 1 1 -1 1 -1 1 -1 -1 -1 -1
1 1 1 1 1 -1 -1 1 -1 1 -1 -1 -1 1 1 -1 -1 1 -1 -1 -1 1 1 1 -1 -1 1 1 -1 -1 1 -1 1 1 -1 1 -1 1 1 1 -1 1 -1 1 1 1 1 1 1 -1 -1 -1]

$EHT\text{-}LTF_{dRU78,BW40}$ =

[-1 -1 -1 -1 1 -1 -1 1 1 -1 1 -1 1 -1 1 1 -1 1 -1 -1 -1 1 1 -1 -1 -1
-1 -1 -1 -1 1 -1 -1 1 1 -1 1 -1 -1 -1 -1 -1 1 -1 1 1 1 -1 -1 1 1 1 -1 1 -1 -1 -1 -1 1 -1 -1 1 1 -1 1 -1 1 -1 1 1 -1 1 -1 -1 -1 1 1 -1 ]

$EHT\text{-}LTF_{dRU78,BW80}$ =

[1 -1 1 -1 -1 1 -1 1 -1 -1 1 1 1 1 1 -1 1 1 -1 -1 1 1 1 -1 1 1
-1 1 1 -1 -1 1 1 -1 -1 -1 -1 1 1 1 1 1 -1 1 1 1 1 1 -1 1 -1 1 -1 -1 1 -1 -1 -1 -1 -1 1 -1 -1 -1 1 1 -1 1 -1 1 -1 -1 -1 -1 -1 1 1 1 1]

$EHT\text{-}LTF_{dRU132,BW20}$ =

[1 -1 -1 1 -1 -1 -1 -1 1 -1 1 1 -1 -1 -1 1 -1 -1 -1 -1 1 -1 1 1 1 1
1 1 -1 -1 -1 -1 1 -1 -1 1 -1 -1 -1 1 1 -1 -1 -1 1 -1 -1 1 -1 1 1 1 -1 1 -1 1 -1 -1 -1 -1 1 1 1 1 1 -1 -1 1 -1 1 -1 -1 -1 1 1 -1 -1 1 -1
-1 -1 1 1 1 -1 -1 1 1 -1 -1 1 -1 1 1 -1 1 -1 1 1 1 -1 1 -1 1 1 1 1 1 1 -1 -1 -1 1 -1 1 -1 -1 -1 1 -1 -1 1 1 1 1 1 1 -1 1 -1 1 1 1 ]

$EHT\text{-}LTF_{dRU132,BW40}$ =

[-1 1 1 -1 -1 1 -1 -1 -1 1 1 -1 1 1 1 1 -1 -1 -1 1 1 1 1 -1 1 1
1 1 1 1 -1 1 1 1 -1 1 1 -1 -1 -1 1 -1 1 -1 -1 1 1 -1 1 -1 1 1 1 1 1 -1 -1 1 1 1 -1 1 1 -1 -1 -1 1 -1 1 1 -1 1 1 -1 1 -1 -1 1 1
-1 1 -1 1 -1 1 1 1 -1 1 1 1 -1 -1 1 -1 -1 -1 -1 -1 1 1 -1 -1 -1 -1 1 -1 1 -1 1 1 -1 -1 1 -1 -1 -1 1 1 -1 1 1 1 1 -1 -1 -1 1 1 1 1 -1]

$EHT\text{-}LTF_{dRU132,BW80}$ =

$EHT\text{-}LTF_{dRU26,BW20}$ = [-1 1 -1 -1 1 1 -1 1 -1 -1 -1 -1 -1 1 -1 1 1 1 -1 -1 1 1 1 -1 -1 -1]

$EHT\text{-}LTF_{dRU26,BW40}$ = [-1 1 -1 -1 1 1 -1 1 -1 -1 -1 -1 -1 1 -1 1 1 1 -1 -1 1 1 1 -1 -1 -1]

$EHT\text{-}LTF_{dRU26,BW80}$ = [-1 1 -1 -1 1 1 -1 1 -1 -1 -1 -1 -1 1 -1 1 1 1 -1 -1 1 1 1 -1 -1 -1]

$EHT\text{-}LTF_{dRU52,BW20}$ =
[1 1 1 1 1 -1 1 1 -1 -1 1 -1 1 1 1 1 1 -1 1 -1 -1 -1 1 1 -1 -1 -1 -1 -1 -1 -1 -1 1 -1 -1 1 1 -1 1 -1 1 -1 1 1 -1 1 -1 -1 -1 1 1 -1]

$EHT\text{-}LTF_{dRU52,BW40}$ =
[1 1 1 1 -1 1 1 -1 -1 1 -1 1 -1 1 -1 -1 1 -1 1 1 1 -1 -1 1 1 1 -1 -1 -1 -1 1 -1 -1 1 1 -1 1 -1 -1 -1 -1 -1 1 -1 1 1 1 -1 -1 1 1 1]

$EHT\text{-}LTF_{dRU52,BW80}$ =
[1 1 -1 -1 -1 -1 -1 -1 -1 1 -1 -1 1 1 1 -1 1 -1 -1 -1 -1 -1 1 -1 1 1 1 -1 -1 1 1 1 -1 -1 1 1 1 1 -1 1 1 -1 -1 1 -1 1 -1 1 -1 -1 1 -1 1 1]

$EHT\text{-}LTF_{dRU106,BW20}$ =
[1 -1 1 -1 -1 -1 1 -1 -1 -1 1 1 -1 1 1 1 1 1 -1 -1 1 1 1 1 -1 1 -1 1 1 -1 -1 1 1 -1 1 1 1 -1 -1 1 -1 -1 -1 -1 1 1 1 -1 -1 -1 -1 -1 1 1
1 1 1 1 1 -1 1 1 1 -1 1 1 -1 -1 -1 1 -1 1 -1 -1 1 1 1 -1 1 -1 1 1 1 1 1 -1 -1 1 1 1 -1 1 1 -1 -1 -1 1 -1 1 1 1 -1 1 1 1 -1 1 -1 -1 1 1]

$EHT\text{-}LTF_{dRU106,BW40}$ =
[-1 1 -1 1 -1 1 1 1 -1 1 1 1 -1 -1 1 -1 -1 -1 -1 1 1 1 -1 -1 -1 -1 1 -1 1 -1 1 1 -1 1 -1 -1 -1 1 1 -1 1 1 1 1 -1 -1 -1 1 1 1 1 1 -1
-1 1 1 1 1 1 1 -1 1 1 1 1 -1 1 1 1 -1 -1 -1 1 -1 1 -1 -1 1 1 1 -1 1 -1 1 1 1 1 1 1 -1 -1 1 1 1 1 -1 1 1 1 -1 -1 -1 1 -1 1 1 1 -1 1 1 1 -1 1 -1]

$EHT\text{-}LTF_{dRU106,BW80}$ =
[1 1 1 -1 1 -1 -1 1 1 1 -1 1 1 1 1 1 -1 -1 1 -1 -1 -1 1 1 1 1 1 -1 1 1 1 -1 -1 -1 -1 1 -1 -1 1 1 1 -1 1 1 -1 -1 -1 -1 1 1 -1 1 -1 -1 -1 -1 -1 -1 -1 1 1 1
-1 -1 -1 -1 -1 1 1 -1 -1 1 1 1 1 -1 1 1 1 1 -1 1 -1 1 -1 -1 -1 -1 -1 1 1 1 1 -1 -1 -1 1 1 -1 1 1 1 1 -1 1 -1 1 -1 1 1 -1 1 1 -1 1 1 1 1 -1 -1 1 1 -1 -1 1 1 -1]

$EHT\text{-}LTF_{dRU242,BW40}$ =

[-1 -1 -1 1 1 -1 -1 -1 -1 -1 -1 -1 -1 1 -1 -1 1 1 1 -1 1 1 -1 1 1 -1 1 1 1 -1 1 1 -1 -1 -1 1 1 -1 -1 1 1 1 -1 -1 -1 -1 -1 -1 -1 1 1 -1 -1 1 1 1 -1 1 1 -1 -1 -1 -1 -1 1 1 -1 1 1 1 1 -1 -1 1 1 1
1 -1 -1 -1 -1 -1 -1 1 1 -1 -1 1 1 1 -1 1 1 -1 1 1 -1 1 1 1 -1 1 1 -1 -1 -1 1 1 1 -1 -1 -1 1 1 1 1 1 -1 1 1 1 -1 -1 1 1 -1 1 1 1 1 1 1 -1 1 1 -1 -1 -1 1 1 1 -1 -1 -1 1 1 -1 1 1 1 1
1 -1 1 1 -1 -1 1 1 -1 1 1 -1 1 1 -1 -1 1 1 -1 1 1 1 1 -1 -1 1 1 1 1 1 1 1 1 -1 1 1 1 -1 -1 1 1 -1 1 1 1 1 1 1 -1 1 1 -1 -1 -1 1 1 1 -1 -1 -1 1 1 1 -1 -1 -1 -1 1 1 -1 -1 1 1 1
-1 1 -1 1 -1 1 1 1 -1 1 1 -1 -1 -1 1 1 1 -1 -1 -1 1 1 1 1 1 -1 1 1 1 -1 -1 1 1 -1 1 1 1 1 1 1 -1 1 1 1 1 -1 1 1 -1 -1 -1 1 1 1 -1 -1 -1 1 1 -1 -1 -1 -1 1 1 -1 -1 1 1 1 -1 1 1 -1 1 1 -1 1 1 1 -1 1 1]

$EHT\text{-}LTF_{dRU242,BW80}$ =

EHT-LTF$_{dRU78,BW20}$ =

[-1 1 -1 -1 -1 1 1 -1 -1 -1 1 -1 -1 1 -1 1 1 1 -1 1 -1 1 -1 -1 -1 -1
1 1 1 1 1 -1 -1 1 -1 1 -1 -1 -1 1 1 -1 -1 1 -1 -1 -1 1 1 1 -1 -1 1 1 -1 -1 1 -1 1 1 -1 1 -1 1 1 1 -1 1 -1 1 1 1 1 1 1 -1 -1 -1]

EHT-LTF$_{dRU78,BW40}$ =

[-1 -1 -1 -1 1 -1 -1 1 1 -1 1 -1 1 -1 1 1 -1 1 -1 -1 -1 1 1 -1 -1 -1
-1 -1 -1 -1 1 -1 -1 1 1 -1 1 -1 -1 -1 -1 -1 1 -1 1 1 1 -1 -1 1 1 1 -1 1 -1 -1 -1 -1 1 -1 -1 1 1 -1 1 -1 1 -1 1 1 -1 1 -1 -1 -1 1 1 -1]

EHT-LTF$_{dRU78,BW80}$ =

[-1 -1 -1 -1 1 -1 -1 1 1 -1 1 -1 1 -1 1 1 -1 1 -1 -1 -1 1 1 -1 -1 -1
-1 -1 -1 -1 1 -1 -1 1 1 -1 1 -1 -1 -1 -1 -1 1 -1 1 1 1 -1 -1 1 1 1 -1 -1 1 1 1 1 -1 1 1 -1 -1 1 -1 1 -1 1 -1 -1 1 -1 1 1 1 -1 -1 1 1]

EHT-LTF$_{dRU132,BW20}$ =

[1 -1 -1 1 -1 -1 -1 -1 1 -1 1 1 -1 -1 -1 1 -1 -1 -1 -1 1 -1 1 1 1 1
1 1 -1 -1 -1 -1 1 -1 -1 1 -1 -1 -1 1 1 -1 -1 -1 1 -1 -1 1 -1 1 1 1 -1 1 -1 1 -1 -1 -1 -1 1 1 1 1 1 -1 -1 1 -1 1 -1 -1 -1 1 1 -1 -1 1 -1
-1 -1 1 1 1 -1 -1 1 1 -1 -1 1 -1 1 1 -1 1 -1 1 1 1 -1 1 -1 1 1 1 1 1 1 -1 -1 -1 1 -1 1 -1 -1 -1 1 -1 -1 1 1 1 1 1 1 -1 1 -1 1 1]

EHT-LTF$_{dRU132,BW40}$ =

[-1 -1 1 1 -1 -1 -1 1 -1 -1 1 1 1 -1 1 -1 -1 1 -1 -1 1 -1 1 1 1 -1
1 -1 -1 1 1 -1 1 -1 1 1 1 -1 -1 1 -1 -1 -1 1 -1 -1 -1 -1 -1 -1 -1 1 -1 1 1 -1 1 1 -1 1 -1 -1 -1 1 1 -1 1 1 1 -1 -1 1 1 1 1 1 -1 1 1 -1
-1 -1 -1 1 1 -1 -1 -1 -1 -1 1 -1 -1 1 1 1 -1 1 1 1 -1 1 -1 1 -1 -1 -1 -1 -1 1 1 1 -1 -1 -1 -1 1 -1 -1 1 1 1 -1 1 1 -1 -1 1 -1 1 -1 1 1 1]

EHT-LTF$_{dRU132,BW80}$ =

$EHT\text{-}LTF_{dRU26,BW20}$ = [1 -1 1 1 1 -1 -1 1 1 1 -1 -1 -1 -1 1 -1 -1 1 1 -1 1 -1 -1 -1 -1 -1]

$EHT\text{-}LTF_{dRU26,BW40}$ = $EHT\text{-}LTF_{dRU26,BW20}$ $EHT\text{-}LTF_{dRU26,BW80}$ = $EHT\text{-}LTF_{dRU26,BW20}$ $EHT\text{-}LTF_{dRU52,BW20}$ =

[-1 1 -1 -1 -1 1 1 -1 1 1 1 1 -1 -1 -1 1 1 1 1 -1 -1 1 1 1 1 1 1 -1 1 1 1 -1 1 1 -1 -1 -1 1 -1 1 -1 -1 1 1 -1 1 -1 1 1 1 1 1]

$EHT\text{-}LTF_{dRU52,BW40}$ =

[1 1 1 1 -1 1 1 -1 -1 1 -1 1 -1 1 -1 -1 1 -1 1 1 1 -1 -1 1 1 1 1 -1 -1 -1 -1 1 -1 -1 1 1 -1 1 -1 -1 -1 -1 -1 1 -1 1 1 1 -1 -1 1 1 1 1]

$EHT\text{-}LTF_{dRU52,BW80}$ =

[-1 -1 -1 -1 1 -1 -1 1 1 -1 1 -1 1 -1 1 1 -1 1 -1 -1 -1 1 1 -1 -1 -1 -1 -1 -1 -1 1 -1 -1 1 1 -1 1 -1 -1 -1 -1 -1 1 -1 1 1 1 -1 -1 1 1 1 1]

$EHT\text{-}LTF_{dRU106,BW20}$ =

[-1 1 -1 1 1 -1 -1 1 -1 1 -1 -1 -1 1 1 -1 1 1 1 -1 1 1 1 1 1 1 1 -1 1 -1 -1 1 -1 -1 1 -1 1 1 1 -1 -1 1 -1 -1 -1 1 1 -1 -1 -1 -1 -1 1 1
-1 -1 -1 -1 -1 1 1 -1 -1 -1 -1 -1 1 -1 -1 1 1 1 -1 1 1 1 -1 1 -1 1 -1 -1 -1 -1 -1 1 1 1 -1 -1 -1 -1 1 -1 -1 1 1 1 -1 1 1 -1 -1 1 -1 1 -1]

$EHT\text{-}LTF_{dRU106,BW40}$ =

[1 1 -1 1 -1 -1 1 1 -1 1 -1 1 1 1 -1 -1 1 -1 -1 -1 1 -1 -1 -1 -1 -1 -1 -1 1 -1 1 1 -1 1 1 -1 1 -1 -1 -1 1 1 -1 1 1 1 -1 -1 1 1 1 1 1
-1 1 1 1 1 1 -1 -1 1 1 1 1 1 -1 1 1 -1 -1 -1 1 -1 -1 -1 1 -1 1 -1 1 1 1 1 1 -1 -1 -1 1 1 1 1 -1 1 1 -1 -1 -1 1 -1 -1 1 1 -1 1 -1]

$EHT\text{-}LTF_{dRU106,BW80}$ =

EHT-LTF$_{dRU242,BW40}$ =

[-1 1 1 1 -1 1 1 -1 -1 1 -1 -1 -1 1 1 1 -1 1 -1 1 -1 -1 -1 1 -1 1 -1 1 -1 1 -1 -1 -1 1 -1 -1 1 -1 1 1 -1 -1 -1 1 1 -1 -1 -1 -1 1 -1 1 1 -1 1 -1 1 1 1 1 1 1
-1 -1 1 -1 -1 -1 1 -1 1 -1 -1 -1 1 1 1 1 1 1 -1 1 -1 1 1 1 -1 1 -1 1 1 -1 1 -1 -1 1 1 -1 -1 1 1 1 -1 -1 -1 1 -1 -1 1 1 -1 -1 -1 1 -1 1 -1 -1 1 1 1 1
1 -1 -1 -1 -1 1 -1 1 -1 1 1 1 -1 1 -1 -1 1 -1 -1 -1 1 1 -1 -1 -1 1 -1 -1 1 -1 -1 -1 -1 1 -1 1 1 -1 -1 -1 1 -1 -1 -1 -1 1 -1 1 1 1 1 1 1 -1 -1 -1 -1 1 -1 -1
1 -1 -1 -1 1 1 -1 -1 -1 1 -1 -1 1 -1 1 1 1 -1 1 -1 1 -1 -1 -1 -1 1 1 1 1 1 -1 -1 1 -1 1 -1 -1 -1 1 1 -1 -1 1 -1 -1 -1 1 1 1 -1 -1 1 1 -1 -1 1 -1 1 1 -1 1 -1]

EHT-LTF$_{dRU242,BW80}$ =

$EHT\text{-}LTF_{dRU78,BW20}$ =

[1 -1 1 -1 1 1 1 -1 -1 -1 1 -1 -1 1 1 -1 1 1 1 -1 -1 -1 -1 1 -1 -1
-1 -1 -1 -1 1 -1 1 1 -1 1 -1 1 1 -1 -1 -1 -1 -1 1 -1 -1 1 1 -1 -1 -1 1 -1 -1 1 -1 -1 1 1 -1 -1 1 1 1 1 -1 -1 -1 -1 -1 1 -1 -1 -1 -1 -1 1 1]

$EHT\text{-}LTF_{dRU78,BW40}$ =

[-1 -1 -1 1 -1 -1 1 1 -1 1 -1 -1 -1 -1 -1 1 -1 1 1 1 -1 -1 1 1 1 -1
-1 -1 -1 -1 -1 1 -1 -1 1 1 -1 1 -1 1 -1 1 1 -1 1 -1 -1 -1 1 1 -1 -1 -1 1 1 1 1 -1 1 1 -1 -1 1 -1 1 1 1 1 1 -1 1 -1 -1 -1 1 1 -1 -1]

$EHT\text{-}LTF_{dRU78,BW80}$ =

[-1 -1 -1 1 -1 -1 1 1 -1 1 -1 -1 -1 -1 -1 1 -1 1 1 1 -1 -1 1 1 1 -1
-1 -1 -1 -1 -1 1 -1 -1 1 1 -1 1 -1 1 -1 1 1 -1 1 -1 -1 -1 1 1 -1 -1 -1 1 1 1 1 -1 1 1 -1 -1 1 -1 1 1 1 1 1 -1 1 -1 -1 -1 1 1 -1 -1]

$EHT\text{-}LTF_{dRU132,BW20}$ =

[-1 1 -1 -1 -1 -1 1 -1 1 1 -1 -1 -1 1 -1 -1 -1 -1 1 -1 1 1 1 1 1 1
-1 -1 -1 -1 1 -1 -1 1 -1 -1 -1 1 1 -1 -1 -1 1 -1 -1 1 -1 1 1 1 -1 1 -1 1 -1 1 -1 -1 -1 -1 1 1 1 1 1 -1 -1 1 -1 1 -1 -1 -1 1 1 -1 -1 1 -1 -1 -1
1 1 1 -1 -1 1 1 -1 -1 1 -1 1 1 -1 1 -1 1 1 1 -1 1 -1 1 1 1 1 1 1 -1 -1 -1 1 -1 1 -1 -1 -1 1 -1 -1 1 1 1 1 1 1 -1 1 -1 1 1 1 -1 1 1]

$EHT\text{-}LTF_{dRU132,BW40}$ =

[-1 -1 -1 1 1 1 -1 -1 -1 -1 1 -1 -1 1 1 1 -1 1 1 -1 -1 1 -1 1 -1 1
1 1 -1 1 -1 -1 1 1 -1 1 -1 1 1 1 -1 -1 1 -1 -1 -1 1 -1 -1 -1 -1 -1 -1 -1 -1 1 -1 1 1 -1 1 1 -1 1 -1 -1 -1 1 1 -1 1 1 1 -1 -1 1 1 1 1 1
-1 1 1 1 1 1 -1 -1 1 1 1 1 1 -1 1 1 -1 -1 -1 1 -1 -1 -1 1 -1 1 -1 1 1 1 1 1 -1 -1 -1 1 1 1 1 -1 1 1 -1 -1 -1 1 -1 -1 1 1 -1 1 -1]

$EHT\text{-}LTF_{dRU132,BW80}$ =

$EHT\text{-}LTF_{dRU26,BW20}$ = [-1 1 1 -1 1 -1 -1 -1 -1 -1 1 -1 1 1 1 -1 -1 1 1 1 -1 -1 -1 -1 -1 -1 ]

$EHT\text{-}LTF_{dRU26,BW40}$ = [-1 1 -1 1 1 1 1 1 1 -1 -1 -1 -1 1 -1 -1 1 -1 -1 -1 1 1 -1 -1 -1 1 ]

$EHT\text{-}LTF_{dRU26,BW80}$ = [-1 1 -1 1 1 1 1 1 1 -1 -1 -1 -1 1 -1 -1 1 -1 -1 -1 1 1 -1 -1 -1 1 ]

$EHT\text{-}LTF_{dRU52,BW20}$ =

[-1 -1 -1 -1 1 -1 -1 1 1 -1 1 -1 -1 -1 -1 -1 1 -1 1 1 1 -1 -1 1 1 1 -1 -1 1 1 1 1 -1 1 1 -1 -1 1 -1 1 -1 1 -1 -1 1 -1 1 1 1 -1 -1 1 ]

$EHT\text{-}LTF_{dRU52,BW40}$ =

[1 1 1 1 -1 1 1 -1 -1 1 -1 1 -1 1 -1 -1 1 -1 1 1 1 -1 -1 1 1 1 -1 -1 -1 -1 1 -1 -1 1 1 -1 1 -1 -1 -1 -1 -1 1 -1 1 1 1 -1 -1 1 1 1 1 ]

$EHT\text{-}LTF_{dRU52,BW80}$ =

[1 1 1 1 -1 1 1 -1 -1 1 -1 1 1 1 1 1 -1 1 -1 -1 -1 1 1 -1 -1 -1 1 -1 1 1 1 1 -1 1 1 -1 -1 1 -1 1 -1 1 -1 -1 1 -1 1 1 1 -1 -1 1 1 ]

$EHT\text{-}LTF_{dRU106,BW20}$ =

[1 1 -1 1 1 -1 -1 1 -1 1 1 1 1 1 -1 1 -1 -1 -1 1 1 -1 -1 -1 1 -1 1 1 1 1 -1 1 1 -1 -1 1 -1 1 -1 1 -1 -1 1 -1 1 1 1 -1 -1 1 1 1 1 1
1 1 1 -1 1 1 -1 -1 1 -1 1 1 1 1 1 -1 1 -1 -1 -1 1 1 -1 -1 -1 1 1 -1 -1 -1 -1 1 -1 -1 1 1 -1 1 -1 1 -1 1 1 -1 1 -1 -1 -1 1 1 -1 -1 -1]

$EHT\text{-}LTF_{dRU106,BW40}$ =

[1 -1 1 -1 1 1 1 1 -1 1 -1 -1 1 1 -1 1 1 1 1 -1 -1 1 -1 -1 -1 1 1 1 1 -1 1 1 -1 -1 -1 -1 1 -1 -1 1 1 -1 1 -1 -1 -1 -1 1 -1 1 -1 -1 -1
-1 -1 -1 1 1 -1 -1 -1 -1 -1 1 -1 -1 1 1 1 -1 1 1 1 -1 1 -1 1 -1 -1 -1 -1 -1 1 1 1 -1 -1 -1 1 -1 1 1 1 -1 1 -1 1 -1 1 1 -1 1 1 1 -1 -1]

$EHT\text{-}LTF_{dRU106,BW80}$ =

$EHT\text{-}LTF_{dRU242,BW40}$ =

[1 1 1 -1 1 -1 -1 -1 1 1 -1 -1 -1 -1 -1 -1 -1 -1 1 -1 -1 1 -1 -1 1 1 -1 1 -1 1 -1 1 1 -1 1 -1 -1 -1 1 1 -1 -1 -1 -1 -1 -1 -1 -1 -1 -1 1 -1 -1 1 1 -1 1 -1 -1 -1 -1 -1 1 -1 1 1
1 -1 -1 1 1 1 -1 -1 -1 -1 -1 -1 1 -1 -1 1 1 -1 1 -1 1 -1 1 -1 1 -1 1 1 -1 1 -1 -1 -1 1 1 -1 -1 -1 1 1 1 1 -1 1 1 -1 -1 1 -1 -1 1 -1 1 1 1 1 1 -1 1 -1 -1 -1 1 1 -1 -1 -1
1 -1 1 1 1 1 -1 1 1 -1 -1 1 -1 1 -1 1 -1 -1 1 -1 1 1 1 -1 1 1 1 -1 -1 1 1 1 1 1 1 1 -1 1 1 -1 -1 1 -1 1 1 1 1 1 -1 1 1 -1 1 -1 -1 -1 1 1 -1 -1 -1 1 1 -1 -1 -1 -1
1 -1 -1 1 1 -1 1 -1 1 -1 1 1 -1 1 -1 -1 -1 1 1 -1 -1 -1 -1 -1 -1 1 1 1 1 -1 1 1 -1 -1 1 -1 1 1 1 1 1 -1 1 -1 -1 -1 -1 -1 -1 1 1 -1 -1 -1 1 -1 -1 -1 -1 1 -1 -1 1 1 -1 1 -1 1]

$EHT\text{-}LTF_{dRU242,BW80}$ =

EHT-LTF$_{dRU78,BW20}$ =

[-1 1 1 -1 -1 -1 1 -1 1 -1 -1 1 1 -1 1 -1 1 1 1 1 1 -1 -1 1 1 1]
-1 1 1 -1 -1 -1 1 -1 1 1 -1 1 1 -1 1 -1 -1 1 -1 1 -1 1 -1 1 1 1 -1 1 1 1 -1 -1 1 -1 -1 -1 -1 -1 1 1 -1 -1 -1 -1 1 -1 1 -1 1 1 -1 -1]

EHT-LTF$_{dRU78,BW40}$ =

[1 1 -1 1 1 -1 -1 1 -1 1 1 1 1 1 -1 1 -1 -1 -1 1 1 -1 -1 -1 1 -1
1 1 1 1 -1 1 1 1 -1 -1 1 -1 1 -1 1 -1 -1 1 -1 1 1 1 -1 -1 1 1 1 1 1 1 -1 1 1 -1 -1 1 -1 1 1 1 1 1 -1 1 -1 -1 -1 1 1 -1 -1 -1]

EHT-LTF$_{dRU78,BW80}$ =

[1 1 -1 1 1 -1 -1 1 -1 1 1 1 1 1 -1 1 -1 -1 -1 1 1 -1 -1 -1 1 -1
1 1 1 1 -1 1 1 1 -1 -1 1 -1 1 -1 1 -1 -1 1 -1 1 1 1 -1 -1 1 1 1 1 1 1 -1 1 1 -1 -1 1 -1 1 1 1 1 1 -1 1 -1 -1 -1 1 1 -1 -1 -1]

EHT-LTF$_{dRU132,BW20}$ =

[-1 -1 1 1 1 -1 -1 -1 -1 1 -1 -1 1 1 1 -1 1 1 -1 -1 1 -1 1 -1 1 1
1 -1 1 -1 -1 1 1 -1 1 -1 1 1 1 -1 -1 1 -1 -1 -1 1 -1 -1 -1 -1 -1 -1 -1 1 -1 1 1 -1 1 1 -1 1 -1 -1 -1 1 1 -1 1 1 1 -1 -1 1 1 1 1 1 -1
1 1 1 1 1 -1 -1 1 1 1 1 1 -1 1 1 -1 -1 -1 1 -1 -1 -1 1 -1 1 -1 1 -1 1 1 1 1 1 -1 -1 -1 1 1 1 1 -1 1 1 -1 -1 -1 1 -1 -1 1 1 -1 1 -1 1 1]

EHT-LTF$_{dRU132,BW40}$ =

[1 1 1 -1 -1 1 1 1 -1 1 1 -1 -1 -1 1 -1 1 1 -1 1 1 -1 1 -1 -1 1
-1 1 -1 1 -1 1 1 1 -1 1 1 1 -1 -1 1 -1 -1 -1 -1 -1 1 1 -1 -1 -1 -1 1 -1 1 -1 1 1 -1 -1 1 -1 -1 -1 1 1 -1 1 1 1 1 -1 -1 -1 1 1 1 1 -1
1 -1 -1 -1 -1 -1 -1 1 -1 -1 -1 1 -1 -1 1 1 1 -1 1 -1 1 1 -1 -1 1 -1 1 -1 1 -1 -1 -1 -1 -1 1 1 -1 -1 -1 1 -1 -1 1 1 1 -1 1 -1 -1 1 -1 -1 1 -1 1]

EHT-LTF$_{dRU132,BW80}$ =

$EHT\text{-}LTF_{dRU26,BW20}$ = [-1 1 -1 -1 1 1 -1 1 -1 -1 -1 -1 -1 1 -1 1 1 1 -1 -1 1 1 1 -1 -1 -1 ]

$EHT\text{-}LTF_{dRU26,BW40}$ = [-1 1 -1 -1 1 1 -1 1 -1 -1 -1 -1 -1 1 -1 1 1 1 -1 -1 1 1 1 -1 -1 -1 ]

$EHT\text{-}LTF_{dRU26,BW80}$ = [-1 1 -1 -1 1 1 -1 1 -1 -1 -1 -1 -1 1 -1 1 1 1 -1 -1 1 1 1 -1 -1 -1 ]

$EHT\text{-}LTF_{dRU52,BW20}$ =

[1 1 1 1 1 -1 1 1 -1 -1 1 -1 1 1 1 1 1 1 -1 1 -1 -1 -1 1 1 -1 -1 -1 -1 -1 -1 -1 1 -1 -1 1 1 -1 1 -1 1 -1 1 1 -1 1 -1 -1 -1 1 1 -1 ]

$EHT\text{-}LTF_{dRU52,BW40}$ =

[1 1 1 1 -1 1 1 -1 -1 1 -1 1 -1 1 -1 -1 1 -1 1 1 1 -1 -1 1 1 1 -1 -1 -1 -1 1 -1 -1 1 1 -1 1 -1 -1 -1 -1 -1 1 -1 1 1 1 -1 -1 1 1 1 1]

$EHT\text{-}LTF_{dRU52,BW80}$ =

[-1 -1 -1 -1 1 -1 -1 1 1 -1 1 -1 1 -1 1 1 -1 1 -1 -1 -1 1 1 -1 -1 -1 -1 -1 -1 -1 1 -1 -1 1 1 -1 1 -1 -1 -1 -1 -1 1 -1 1 1 1 -1 -1 1 1 1 ]

$EHT\text{-}LTF_{dRU106,BW20}$ =

[-1 -1 -1 1 1 1 1 1 -1 1 -1 1 -1 -1 1 1 1 -1 1 1 1 1 1 -1 1 1 -1 1 -1 1 -1 -1 -1 -1 -1 1 -1 -1 -1 -1 -1 1 1 1 1 -1 -1 1 1 -1 -1 1 -1
-1 1 -1 -1 -1 1 1 -1 -1 1 -1 -1 -1 -1 -1 1 1 -1 1 -1 1 1 -1 1 -1 -1 -1 -1 -1 -1 1 -1 -1 -1 -1 1 1 1 -1 1 1 -1 -1 1 -1 -1 -1 1 1 1 -1 1 -1]

$EHT\text{-}LTF_{dRU106,BW40}$ =

[1 -1 1 -1 1 -1 1 1 1 -1 1 1 1 -1 -1 1 -1 -1 -1 -1 -1 1 1 -1 -1 -1 -1 1 -1 1 -1 1 1 -1 -1 1 -1 -1 -1 1 1 -1 1 1 1 1 -1 -1 -1 1 1 1 1
-1 1 -1 -1 -1 -1 -1 -1 1 -1 -1 -1 1 -1 -1 1 1 1 -1 1 -1 1 1 -1 -1 1 -1 1 -1 -1 -1 -1 -1 1 1 -1 -1 -1 1 -1 -1 1 1 1 -1 1 -1 -1 1 -1 -1 1 -1]

$EHT\text{-}LTF_{dRU106,BW80}$ =

$EHT\text{-}LTF_{dRU242,BW40}$ =

[1 1 1 -1 1 -1 -1 -1 1 1 -1 -1 -1 -1 -1 -1 -1 -1 1 -1 -1 1 1 -1 1 -1 1 -1 1 1 -1 1 -1 -1 -1 1 1 -1 -1 -1 -1 -1 -1 -1 1 -1 -1 1 1 -1 1 -1 -1 -1 -1 -1 1 -1 1 1
1 -1 -1 1 1 1 -1 -1 -1 -1 -1 -1 1 -1 -1 1 1 -1 1 -1 1 -1 1 1 -1 1 -1 -1 -1 1 1 -1 -1 1 1 1 1 -1 1 1 -1 -1 1 -1 1 1 1 1 1 -1 1 -1 -1 -1 1 1 -1 -1 -1
1 -1 1 1 1 1 -1 1 1 -1 -1 1 -1 1 -1 1 -1 -1 1 -1 1 1 1 -1 -1 1 1 1 1 1 1 1 -1 1 1 -1 -1 1 -1 1 1 1 1 1 -1 1 -1 -1 -1 1 1 -1 -1 -1 1 1 -1 -1 -1 -1
1 -1 -1 1 1 -1 1 -1 1 -1 1 1 -1 1 -1 -1 -1 1 1 -1 -1 -1 1 1 1 1 -1 1 1 -1 -1 1 -1 1 1 1 1 1 -1 1 -1 -1 -1 1 1 -1 -1 -1 1 -1 -1 -1 -1 1 -1 -1 1 1 -1 1 -1 1]

$EHT\text{-}LTF_{dRU242,BW80}$ =

$EHT\text{-}LTF_{dRU78,BW20}$ =

[-1 1 1 -1 -1 -1 1 -1 1 -1 -1 1 1 -1 1 -1 1 1 1 1 1 1 -1 -1 1 1 1 1
-1 1 1 -1 -1 -1 1 -1 1 1 -1 1 1 -1 1 -1 -1 1 1 1 1 -1 -1 1 1 1 1 1 -1 1 1 -1 -1 -1 1 -1 -1 -1 1 -1 1 -1 1 1 -1 1 -1 1 -1 1 1 1 1]

$EHT\text{-}LTF_{dRU78,BW40}$ =

[1 1 -1 1 1 -1 -1 1 -1 1 1 1 1 1 1 -1 1 -1 -1 -1 1 1 -1 -1 -1 1 -1
1 1 1 1 -1 1 1 -1 -1 1 -1 1 -1 1 -1 -1 1 -1 1 1 1 -1 -1 1 1 1 1 1 1 1 -1 1 1 -1 -1 1 -1 1 1 1 1 1 -1 1 -1 -1 -1 1 1 -1 -1 -1]

$EHT\text{-}LTF_{dRU78,BW80}$ =

[-1 -1 1 1 -1 1 -1 1 -1 1 1 -1 1 -1 -1 -1 1 1 -1 -1 -1 -1 -1 -1 -1 1
-1 -1 1 1 -1 1 -1 -1 -1 -1 -1 1 -1 1 1 1 -1 -1 1 1 1 -1 1 -1 -1 -1 -1 1 -1 -1 1 1 -1 1 -1 1 -1 1 1 -1 1 -1 -1 -1 1 1 -1 -1 -1 1 1 1]

$EHT\text{-}LTF_{dRU132,BW20}$ =

[-1 -1 -1 -1 -1 1 -1 -1 1 1 -1 1 -1 1 -1 1 1 -1 1 -1 -1 -1 1 1 -1 -1
-1 -1 -1 -1 -1 1 -1 -1 1 1 -1 1 -1 -1 -1 -1 -1 1 -1 1 1 1 -1 -1 1 1 1 -1 -1 -1 -1 -1 -1 1 -1 -1 1 1 -1 1 -1 1 -1 1 1 -1 1 -1 -1 -1 1 1 -1
-1 -1 1 1 1 1 -1 1 1 -1 -1 1 -1 1 1 1 1 1 -1 1 -1 -1 -1 1 1 -1 -1 -1 1 -1 1 1 1 1 -1 1 1 -1 -1 1 -1 1 -1 1 -1 -1 1 -1 1 1 1 -1 -1]

$EHT\text{-}LTF_{dRU132,BW40}$ =

[1 1 1 -1 -1 1 1 1 -1 1 1 -1 -1 -1 1 -1 1 1 -1 1 1 -1 1 -1 -1 1
-1 1 -1 1 -1 1 1 1 -1 1 1 1 -1 -1 1 -1 -1 -1 -1 -1 1 1 -1 -1 -1 -1 1 -1 1 -1 1 1 -1 -1 1 -1 -1 -1 1 1 -1 1 1 1 1 -1 -1 -1 1 1 1 1 -1
1 -1 -1 -1 -1 -1 -1 1 -1 -1 -1 1 -1 -1 1 1 1 -1 1 -1 1 1 -1 -1 1 -1 1 -1 -1 -1 -1 -1 1 1 -1 -1 -1 1 -1 -1 1 1 1 -1 1 -1 -1 1 -1 -1 1 -1 1]

$EHT\text{-}LTF_{dRU132,BW80}$ =

$\text{EHT-LTF}_{\text{dRU26,BW20}}$ = [-1 1 -1 -1 1 1 -1 1 -1 -1 -1 -1 -1 1 -1 1 1 1 -1 -1 1 1 1 -1 -1 -1]

$\text{EHT-LTF}_{\text{dRU26,BW40}}$ = [-1 1 -1 -1 1 1 -1 1 -1 -1 -1 -1 -1 1 -1 1 1 1 -1 -1 1 1 1 -1 -1 -1] = $\text{EHT-LTF}_{\text{dRU26,BW20}}$ $\text{EHT-LTF}_{\text{dRU26,BW80}}$ = [-1 1 -1 -1 1 1 -1 1 -1 -1 -1 -1 -1 1 -1 1 1 1 -1 -1 1 1 1 -1 -1 -1] = $\text{EHT-LTF}_{\text{dRU26,BW20}}$ $\text{EHT-LTF}_{\text{dRU52,BW20}}$ =

[-1 1 -1 -1 -1 1 1 -1 1 1 1 1 -1 -1 -1 1 1 1 1 -1 -1 1 1 1 1 1 1 -1 1 1 1 -1 1 1 -1 -1 -1 1 -1 1 -1 -1 1 1 -1 1 -1 1 1 1 1 1]

$\text{EHT-LTF}_{\text{dRU52,BW40}}$ =

[1 1 1 1 -1 1 1 -1 -1 1 -1 1 -1 1 -1 -1 1 -1 1 1 1 -1 -1 1 1 1 -1 -1 -1 -1 1 -1 -1 1 1 -1 1 -1 -1 -1 -1 -1 1 -1 1 1 1 -1 -1 1 1 1]

$\text{EHT-LTF}_{\text{dRU52,BW80}}$ =

[-1 1 -1 -1 -1 1 1 -1 1 1 1 1 -1 -1 -1 1 1 1 1 -1 -1 1 1 1 1 1 1 -1 1 1 1 -1 1 1 -1 -1 -1 1 -1 1 -1 -1 1 1 -1 1 -1 1 1 1 1 1]

$\text{EHT-LTF}_{\text{dRU106,BW20}}$ =

[-1 -1 -1 1 1 -1 1 -1 1 1 -1 1 -1 -1 -1 -1 -1 -1 1 -1 -1 -1 -1 1 1 1 -1 1 1 -1 -1 1 -1 1 -1 -1 -1 1 1 1 -1 1 1 -1 1 1 -1 -1 -1 1 1 -1 1 1 -1 1 1 -1 -1 -1
1 -1 -1 1 -1 1 1 -1 -1 -1 1 1 -1 -1 -1 -1 1 -1 1 1 -1 1 -1 1 1 1 1 1 1 -1 -1 1 -1 -1 -1 1 -1 1 -1 -1 -1 1 1 1 1 1 1 1 -1 1 -1 1 1 1 1]

$\text{EHT-LTF}_{\text{dRU106,BW40}}$ =

[-1 1 -1 1 -1 1 1 1 -1 1 1 1 -1 -1 1 -1 -1 -1 -1 -1 1 1 -1 -1 -1 -1 1 -1 1 -1 1 1 -1 1 -1 1 -1 -1 -1 1 1 -1 1 1 1 1 -1 -1 -1 1 1 1 1 -1
1 1 1 1 1 1 1 -1 1 1 1 -1 1 1 -1 -1 -1 1 -1 1 -1 -1 1 1 -1 1 -1 1 1 1 1 1 1 -1 -1 1 1 1 1 -1 1 1 -1 -1 -1 1 -1 1 1 -1 1 1 -1 1 -1]

$\text{EHT-LTF}_{\text{dRU106,BW80}}$ =

$EHT\text{-}LTF_{dRU242,BW40}$ =

[-1 1 -1 -1 1 -1 1 1 1 -1 1 -1 1 -1 -1 -1 -1 1 1 1 1 1 -1 -1 1 -1 1 -1 -1 -1 1 1 -1 -1 1 -1 -1 -1 1 1 1 -1 -1 1 1 -1 -1 1 1 -1 -1 1 -1 1 1 -1 1 -1 1 1 1 -1 1 -1
1 1 1 1 1 1 -1 -1 -1 1 -1 1 -1 -1 -1 1 -1 -1 1 1 1 1 1 1 -1 1 -1 1 1 -1 1 -1 1 -1 1 -1 1 -1 -1 1 1 1 1 -1 -1 -1 -1 -1 -1 -1 -1 1 -1 -1 1 -1 -1 1 1 1
-1 1 -1 -1 -1 1 1 1 -1 1 1 -1 -1 1 -1 -1 -1 1 1 1 1 -1 1 1 1 1 1 1 -1 1 -1 -1 1 -1 1 -1 -1 1 1 1 1 1 -1 1 1 -1 -1 1 1 1 -1 1 1 -1 1 1 -1 -1 1 1
-1 -1 -1 -1 1 1 1 1 1 -1 1 1 1 1 1 -1 1 -1 1 -1 -1 1 -1 -1 -1 -1 -1 1 -1 -1 -1 1 1 -1 1 -1 1 -1 -1 -1 -1 -1 1 1 1 1 -1 1 -1 -1 1 1 -1 -1 -1 1 1 1 1 1 -1 1]

$EHT\text{-}LTF_{dRU242,BW80}$ =

$EHT\text{-}LTF_{dRU78,BW20}$ =

[-1 -1 -1 -1 -1 1 -1 -1 1 1 -1 1 -1 1 -1 1 1 -1 1 -1 -1 -1 1 1 -1 -1
-1 -1 -1 -1 -1 1 -1 -1 1 1 -1 1 -1 -1 -1 -1 -1 1 -1 1 1 1 -1 -1 1 1 1 -1 -1 -1 -1 -1 -1 1 -1 -1 1 1 -1 1 -1 1 -1 1 1 -1 1 -1 -1 -1 1 1]

$EHT\text{-}LTF_{dRU78,BW40}$ =

[-1 -1 -1 -1 1 -1 -1 1 1 -1 1 -1 1 -1 1 1 -1 1 -1 -1 -1 1 1 -1 -1 -1
-1 -1 -1 -1 1 -1 -1 1 1 -1 1 -1 -1 -1 -1 -1 1 -1 1 1 1 -1 -1 1 1 1 -1 1 -1 -1 -1 -1 1 -1 -1 1 1 -1 1 -1 1 -1 1 1 -1 1 -1 -1 -1 1 1 -1]

$EHT\text{-}LTF_{dRU78,BW80}$ =

[1 -1 1 -1 1 1 -1 1 1 1 -1 -1 1 -1 -1 1 -1 1 -1 1 1 1 -1 1 1 1
-1 -1 1 -1 -1 -1 -1 -1 1 1 -1 -1 -1 -1 -1 -1 1 -1 1 -1 -1 -1 -1 1 -1 1 1 -1 -1 1 -1 -1 -1 -1 1 1 -1 1 1 1 1 1 1 1 -1 1 1 -1 -1 -1 -1 1 1]

$EHT\text{-}LTF_{dRU132,BW20}$ =

[1 1 1 -1 -1 -1 1 -1 1 1 1 -1 1 -1 1 -1 1 1 -1 1 1 1 -1 -1 1 -1
-1 1 -1 1 -1 1 1 1 -1 1 1 1 -1 -1 1 -1 -1 -1 -1 -1 1 1 -1 -1 -1 -1 -1 -1 1 -1 1 -1 -1 -1 1 -1 1 1 -1 -1 1 -1 -1 -1 -1 1 1 -1 1 1 1 1
1 1 1 -1 1 1 -1 -1 -1 -1 1 -1 -1 1 1 -1 1 1 -1 -1 -1 -1 1 -1 1 -1 -1 1 1 1 1 -1 -1 1 1 1 1 1 -1 1 1 -1 -1 -1 1 -1 -1 -1 1 -1 1 -1 1 1 1]

$EHT\text{-}LTF_{dRU132,BW40}$ =

[-1 1 1 -1 -1 1 -1 -1 -1 1 1 -1 1 1 1 1 -1 -1 -1 1 1 1 1 -1 1 1
1 1 1 1 -1 1 1 1 -1 1 1 -1 -1 -1 1 -1 1 -1 -1 1 1 -1 1 -1 1 1 1 1 1 -1 -1 1 1 1 -1 1 1 -1 -1 -1 1 -1 1 1 -1 1 1 -1 1 1 -1 -1 1 1
-1 1 -1 1 -1 1 1 1 -1 1 1 1 -1 -1 1 -1 -1 -1 -1 -1 1 1 -1 -1 -1 -1 1 -1 1 -1 1 1 -1 -1 1 -1 -1 -1 1 1 -1 1 1 1 1 -1 -1 -1 1 1 1 1 -1]

$EHT\text{-}LTF_{dRU132,BW80}$ =

$EHT\text{-}LTF_{dRU26,BW20}$ = [1 1 1 -1 -1 1 1 -1 -1 1 -1 1 1 -1 1 -1 1 1 1 -1 1 -1 1 1 1 1]

$EHT\text{-}LTF_{dRU26,BW40}$ = [1 -1 1 1 -1 -1 1 1 -1 -1 -1 -1 1 1 1 1 1 -1 1 1 1 1 1 -1 1 -1]

$EHT\text{-}LTF_{dRU26,BW80}$ = [1 -1 1 -1 -1 -1 -1 -1 1 -1 -1 -1 -1 -1 1 1 1 1 -1 -1 1 1 -1 -1 1 -1]

$EHT\text{-}LTF_{dRU52,BW20}$ =

[-1 -1 -1 -1 -1 1 1 -1 -1 -1 1 -1 -1 1 1 1 -1 1 -1 -1 1 -1 -1 1 -1 1 1 1 -1 1 -1 -1 1 1 -1 1 -1 1 1 1 -1 -1 1 -1 -1 -1 1 -1 -1 -1 -1 -1]

$EHT\text{-}LTF_{dRU52,BW40}$ =

[-1 -1 -1 1 -1 -1 1 1 -1 1 -1 -1 -1 -1 -1 1 -1 1 1 1 -1 -1 1 1 1 -1 -1 -1 -1 -1 -1 1 -1 -1 1 1 -1 1 -1 1 -1 1 1 -1 1 -1 -1 -1 1 1 -1 -1]

$EHT\text{-}LTF_{dRU52,BW80}$ =

[-1 -1 -1 -1 -1 1 1 -1 -1 -1 1 -1 -1 1 1 1 -1 1 -1 -1 1 -1 -1 1 -1 1 1 1 -1 1 -1 -1 1 1 -1 1 -1 1 1 1 -1 -1 1 -1 -1 -1 1 -1 -1 -1 -1 -1]

$EHT\text{-}LTF_{dRU106,BW20}$ =

[-1 1 -1 -1 1 1 -1 1 -1 1 -1 1 1 -1 1 -1 -1 -1 1 1 -1 -1 -1 1 1 1 1 -1 1 1 -1 -1 1 -1 1 1 1 1 1 -1 1 -1 -1 -1 1 1 -1 -1 -1 1 -1 1 1
1 1 -1 1 1 -1 -1 1 -1 1 -1 1 -1 -1 1 -1 1 1 1 -1 -1 1 1 1 1 1 1 1 -1 1 1 -1 -1 1 -1 1 1 1 1 1 -1 1 -1 -1 -1 1 1 -1 -1 -1 1 1 -1]

$EHT\text{-}LTF_{dRU106,BW40}$ =

[1 -1 1 -1 1 -1 1 1 1 -1 1 1 1 -1 -1 1 -1 -1 -1 -1 -1 1 1 -1 -1 -1 -1 1 -1 1 -1 1 1 -1 -1 1 -1 -1 -1 1 1 -1 1 1 1 1 -1 -1 -1 1 1 1 1
-1 -1 1 1 1 1 1 1 -1 1 1 1 -1 1 1 -1 -1 -1 1 -1 1 -1 -1 1 1 -1 1 -1 1 1 1 1 1 -1 -1 1 1 1 -1 1 1 -1 -1 -1 1 -1 1 1 -1 1 1 -1 1 1]

$EHT\text{-}LTF_{dRU106,BW80}$ =

$\text{EHT-LTF}_{dRU242,BW40}$ =

[-1 1 1 1 -1 1 1 1 -1 -1 1 1 -1 -1 -1 1 1 1 1 -1 1 -1 1 1 -1 -1 -1 1 1 -1 1 1 -1 1 1 -1 -1 -1 1 1 -1 -1 1 1 -1 1 1 1 -1 -1 -1 1 1 1 -1 -1 -1 -1 1 1 -1 1 1 1 -1 1 1 -1 1 1 1 1 1 1 1
-1 -1 1 -1 -1 -1 1 1 -1 1 1 -1 -1 -1 1 1 1 1 1 1 1 -1 1 -1 1 1 1 1 -1 1 -1 1 1 1 -1 1 1 -1 1 -1 1 1 1 -1 -1 1 1 1 1 -1 -1 -1 1 1 -1 -1 1 1 1 -1 -1 -1 1 1 -1 1 1 -1 -1 1 1 1 1 1
1 -1 -1 -1 -1 1 1 -1 1 1 -1 1 1 1 1 -1 1 1 -1 -1 1 1 -1 -1 -1 1 1 1 -1 -1 -1 1 1 -1 -1 1 1 -1 1 1 -1 -1 -1 -1 1 1 -1 1 1 1 -1 -1 -1 1 1 -1 -1 -1 -1 1 1 -1 1 1 1 1 1 1 1 -1 -1 -1 -1 1 1 -1 -1
1 -1 -1 -1 1 1 1 -1 -1 -1 1 1 -1 -1 1 1 -1 1 1 1 1 -1 1 1 -1 1 1 -1 -1 -1 -1 1 1 1 1 1 1 -1 -1 1 1 -1 1 1 -1 -1 -1 1 1 1 -1 -1 1 1 -1 -1 -1 1 1 1 1 -1 -1 1 1 1 -1 -1 1 1 -1 1 1 1 -1 1 1 -1]

$\text{EHT-LTF}_{dRU242,BW80}$ =

$EHT\text{-}LTF_{dRU78,BW20}$ =

[ 1 -1 -1 1 1 -1 1 -1 1 1 -1 -1 1 -1 1 -1 -1 -1 1 1 -1 1 1 1 -1 1
1 1 1 1 1 1 -1 1 -1 -1 1 -1 -1 1 -1 1 1 1 -1 -1 1 -1 -1 -1 1 1 -1 -1 -1 -1 -1 1 -1 -1 -1 -1 -1 1 1 -1 -1 -1 -1 -1 1 -1 -1 1 1 1 -1 1]

$EHT\text{-}LTF_{dRU78,BW40}$ =

[ 1 1 -1 1 -1 1 -1 -1 -1 1 -1 -1 -1 1 1 -1 1 1 1 1 1 -1 -1 1 1 1
1 -1 1 -1 1 -1 -1 1 1 -1 1 1 1 -1 -1 1 -1 -1 -1 -1 1 1 1 -1 -1 -1 -1 -1 -1 1 1 1 1 1 1 -1 1 1 1 -1 1 1 -1 -1 -1 1 -1 1 -1 -1 1 1]

$EHT\text{-}LTF_{dRU78,BW80}$ =

[ 1 1 -1 1 -1 1 -1 -1 -1 1 -1 -1 -1 1 1 -1 1 1 1 1 1 -1 -1 1 1 1
1 -1 1 -1 1 -1 -1 1 1 -1 1 1 1 -1 -1 1 -1 -1 -1 -1 1 1 1 -1 -1 -1 -1 -1 -1 1 1 1 1 1 1 -1 1 1 1 -1 1 1 -1 -1 -1 1 -1 1 -1 -1 1 1]

$EHT\text{-}LTF_{dRU132,BW20}$ =

[ -1 1 1 1 1 -1 -1 -1 1 1 1 -1 1 1 1 1 1 1 1 -1 1 1 1 -1 1 1
1 -1 -1 -1 1 -1 1 -1 -1 1 1 -1 1 -1 1 1 1 1 1 -1 -1 1 1 1 -1 1 1 -1 -1 -1 1 -1 1 1 -1 1 1 -1 1 -1 -1 1 -1 1 -1 1 -1 1 1 1 -1 1 1
1 -1 -1 1 -1 -1 -1 -1 -1 1 1 -1 -1 -1 -1 1 -1 1 -1 1 1 -1 -1 1 -1 -1 -1 1 1 -1 1 1 1 1 -1 -1 -1 1 1 1 1 -1 1 -1 -1 -1 -1 -1 -1 1 -1 -1 -1]

$EHT\text{-}LTF_{dRU132,BW40}$ =

[ -1 -1 1 -1 -1 -1 -1 1 -1 1 1 -1 -1 -1 1 -1 -1 -1 -1 1 -1 1 1 1 1 1
1 -1 -1 -1 -1 1 -1 -1 1 -1 -1 -1 1 1 -1 -1 -1 1 -1 -1 1 -1 1 1 1 -1 1 -1 1 -1 -1 -1 -1 1 1 1 1 1 -1 -1 1 -1 1 -1 -1 -1 1 1 -1 -1 1 -1 -1
-1 1 1 1 -1 -1 1 1 -1 -1 1 -1 1 1 -1 1 -1 1 1 1 -1 1 -1 1 1 1 1 1 1 -1 -1 -1 1 -1 1 -1 -1 -1 1 -1 -1 1 1 1 1 1 1 -1 1 -1 1 1 -1]

$EHT\text{-}LTF_{dRU132,BW80}$ =

$EHT\text{-}LTF_{dRU26,BW20}$ = [-1 1 1 1 -1 -1 1 1 1 -1 -1 -1 -1 -1 -1 1 -1 -1 1 1 -1 1 1 -1 1 1]

$EHT\text{-}LTF_{dRU26,BW40}$ = [-1 1 1 1 -1 -1 1 1 1 -1 -1 -1 -1 -1 -1 1 -1 -1 1 1 -1 1 1 -1 1 1]

$EHT\text{-}LTF_{dRU26,BW80}$ = [-1 1 1 1 -1 -1 1 1 1 -1 -1 -1 -1 -1 -1 1 -1 -1 1 1 -1 1 1 -1 1 1]

$EHT\text{-}LTF_{dRU52,BW20}$ =

[-1 -1 -1 -1 -1 1 1 -1 -1 -1 1 -1 -1 1 1 1 -1 1 -1 -1 1 -1 -1 1 -1 1 1 1 -1 1 -1 -1 1 1 -1 1 -1 1 1 1 -1 -1 1 -1 -1 -1 1 -1 -1 -1 -1 -1]

$EHT\text{-}LTF_{dRU52,BW40}$ =

[-1 -1 -1 -1 1 -1 -1 1 1 -1 1 -1 1 -1 1 1 -1 1 -1 -1 -1 1 1 -1 -1 -1 -1 -1 -1 -1 1 -1 -1 1 1 -1 1 -1 -1 -1 -1 -1 1 -1 1 1 1 -1 -1 1 1 1]

$EHT\text{-}LTF_{dRU52,BW80}$ =

[-1 -1 -1 -1 -1 1 1 -1 -1 -1 1 -1 -1 1 1 1 -1 1 -1 -1 1 -1 -1 1 -1 1 1 1 -1 1 -1 -1 1 1 -1 1 -1 1 1 1 -1 -1 1 -1 -1 -1 1 -1 -1 -1 -1 -1]

$EHT\text{-}LTF_{dRU106,BW20}$ =

[ -1 1 -1 -1 1 1 -1 1 -1 1 -1 1 1 -1 1 -1 -1 -1 1 1 -1 -1 -1 1 1 1 1 -1 1 1 -1 -1 1 -1 1 1 1 1 1 -1 1 -1 -1 -1 1 1 -1 -1 -1 1 -1 1 1
1 1 -1 1 1 1 -1 -1 1 -1 1 -1 1 -1 -1 1 -1 1 1 1 1 -1 -1 1 1 1 1 1 1 1 -1 1 1 -1 -1 1 -1 1 1 1 1 1 1 -1 1 -1 -1 -1 1 1 -1 -1 -1 1 1 -1]

$EHT\text{-}LTF_{dRU106,BW40}$ =

[ 1 -1 1 -1 1 -1 1 1 1 -1 1 1 1 -1 -1 1 -1 -1 -1 -1 -1 1 1 -1 -1 -1 -1 1 -1 1 1 -1 1 1 1 -1 -1 1 -1 -1 -1 1 1 -1 1 1 1 1 -1 -1 -1 1 1 1 1
-1 -1 1 1 1 1 1 1 -1 1 1 1 -1 1 1 -1 -1 -1 1 -1 1 1 -1 -1 1 1 -1 1 1 -1 1 1 1 1 1 -1 -1 1 1 1 -1 1 1 -1 -1 -1 1 1 -1 1 1 1 -1 1 1 1 -1 1 1]

$EHT\text{-}LTF_{dRU106,BW80}$ =

$EHT\text{-}LTF_{dRU242,BW40}$ =

[-1 -1 -1 1 -1 -1 1 -1 1 1 1 -1 1 -1 1 -1 -1 -1 -1 1 1 1 1 1 -1 -1 1 -1 1 -1 -1 -1 1 1 -1 -1 1 -1 -1 -1 1 1 1 -1 -1 1 1 -1 -1 1 -1 1 1 -1 1 -1 1 1 1 -1
1 -1 1 1 1 1 1 1 -1 -1 -1 1 -1 1 -1 -1 -1 1 -1 -1 1 1 1 1 1 1 -1 1 -1 1 1 -1 1 -1 -1 -1 -1 1 1 -1 -1 -1 1 1 -1 1 -1 -1 1 -1 -1 -1 1 -1 1 -1 1 -1 -1 -1
1 -1 1 -1 1 1 1 1 -1 -1 -1 1 -1 -1 1 1 1 -1 1 1 1 1 -1 -1 -1 -1 1 1 -1 -1 -1 -1 -1 -1 1 1 -1 1 -1 -1 -1 -1 -1 1 -1 -1 1 1 -1 -1 -1 1 -1 -1 1 -1 -1 1 1 1
-1 -1 1 1 1 1 -1 -1 -1 -1 -1 1 -1 -1 -1 -1 -1 1 1 -1 1 1 -1 1 1 1 1 1 -1 1 1 1 -1 -1 1 -1 1 -1 1 1 1 1 1 -1 -1 -1 1 1 -1 -1 -1 -1 -1 -1 -1 -1 1 1 1 1 1]

$EHT\text{-}LTF_{dRU242,BW80}$ =

$EHT\text{-}LTF_{dRU78,BW20}$ =

[ 1 -1 -1 1 1 1 -1 1 -1 1 1 -1 -1 1 -1 1 -1 -1 -1 1 1 -1 1 1 1 -1 1
1 1 1 1 1 1 -1 1 -1 -1 1 -1 -1 1 -1 1 1 1 -1 -1 1 -1 -1 -1 1 1 -1 -1 -1 -1 -1 1 -1 -1 -1 -1 -1 1 1 -1 -1 -1 -1 -1 1 -1 -1 1 1 1 -1 1 1]

$EHT\text{-}LTF_{dRU78,BW40}$ =

[ -1 -1 -1 -1 1 -1 -1 1 1 -1 1 -1 1 -1 1 1 -1 1 -1 -1 -1 1 1 -1 -1 -1
-1 -1 -1 -1 1 -1 -1 1 1 -1 1 -1 -1 -1 -1 -1 1 -1 1 1 1 -1 -1 1 1 1 -1 1 -1 -1 -1 -1 1 -1 -1 1 1 -1 1 -1 1 -1 1 1 -1 1 -1 -1 -1 1 1 -1]

$EHT\text{-}LTF_{dRU78,BW80}$ =

[ 1 1 -1 1 -1 1 -1 -1 -1 1 -1 -1 -1 1 1 -1 1 1 1 1 1 -1 -1 1 1 1 1
1 -1 1 -1 1 -1 -1 1 1 -1 1 1 1 -1 -1 1 -1 -1 -1 -1 1 1 1 -1 -1 -1 -1 -1 -1 1 1 1 1 1 1 -1 1 1 1 -1 1 1 -1 -1 -1 1 -1 1 -1 -1 1 1 1]

$EHT\text{-}LTF_{dRU132,BW20}$ =

[ -1 1 1 1 1 -1 -1 -1 1 1 1 1 -1 1 1 1 1 1 1 1 -1 1 1 1 -1 1
1 -1 -1 -1 1 -1 1 -1 -1 1 1 -1 1 -1 1 1 1 1 1 -1 -1 1 1 1 -1 1 1 -1 -1 -1 1 -1 1 1 -1 1 1 -1 1 -1 -1 1 -1 1 -1 1 -1 1 1 1 -1 1 1
1 -1 -1 1 -1 -1 -1 -1 -1 1 1 -1 -1 -1 -1 1 -1 1 -1 1 1 -1 -1 1 -1 -1 -1 1 1 -1 1 1 1 1 -1 -1 -1 1 1 1 1 -1 1 -1 -1 -1 -1 -1 -1 1 -1 -1 -1]

$EHT\text{-}LTF_{dRU132,BW40}$ =

[-1 1 1 -1 -1 1 -1 -1 -1 1 1 -1 1 1 1 1 -1 -1 -1 1 1 1 1 -1 1 1
1 1 1 1 1 -1 1 1 1 -1 1 1 -1 -1 -1 1 -1 1 -1 -1 1 1 -1 1 -1 1 1 1 1 1 -1 -1 1 1 1 -1 1 1 -1 -1 -1 1 -1 1 1 -1 1 1 -1 1 -1 -1 1
-1 1 -1 1 -1 1 1 1 -1 1 1 1 -1 -1 1 -1 -1 -1 -1 -1 1 1 -1 -1 -1 -1 1 -1 1 -1 1 1 -1 -1 1 -1 -1 -1 1 1 -1 1 1 1 1 -1 -1 -1 1 1 1 1 -1]

$EHT\text{-}LTF_{dRU132,BW80}$ =

$HELTF_{1:242}$ =

{−1, −1, +1, −1, +1, −1, +1, +1, +1, −1, +1, +1, +1, −1, −1, +1, −1, −1, −1, −1, −1, +1, +1,
−1, −1, −1, −1, +1, +1, −1, +1, −1, +1, +1, +1, +1, −1, +1, −1, −1, +1, +1, −1, +1, +1, +1,
+1, −1, −1, +1, −1, −1, −1, +1, +1, +1, +1, −1, +1, +1, −1, −1, −1, −1, +1, −1, −1, +1, +1,
−1, +1, −1, −1, −1, −1, +1, −1, +1, −1, −1, −1, −1, −1, −1, +1, +1, −1, −1, −1, −1, −1, +1,
−1, −1, +1, +1, +1, −1, +1, +1, +1, −1, +1, −1, +1, −1, −1, −1, −1, −1, +1, +1, +1, −1, −1,
−1, +1, −1, +1, +1, +1, [redacted] −1, +1, −1, +1, −1, +1, +1, −1, +1, +1, +1, −1, −1, +1, −1,
−1, +1, −1, +1, −1, +1, +1, +1, −1, +1, +1, +1, −1, −1, +1, −1, −1, −1, −1, −1, +1, +1, −1,
−1, −1, −1, −1, −1, +1, −1, +1, −1, −1, −1, −1, +1, −1, +1, +1, −1, −1, +1, −1, −1, −1, −1,
+1, +1, −1, +1, +1, +1, +1, +1, +1, +1, −1, +1, +1, −1, −1, −1, −1, +1, −1, −1, +1, +1, −1,
+1, −1, −1, −1, −1, +1, −1, +1, −1, −1, +1, +1, +1, +1, −1, −1, +1, +1, +1, +1, +1, −1, +1,
+1, −1, −1, −1, +1, −1, −1, −1, +1, −1, +1, −1, +1, +1}

$HELTF_{1:484}$ =

{+1, −1, −1, −1, −1, +1, −1, −1, +1, +1, −1, +1, −1, +1, −1, +1, +1, −1, +1, −1, −1, −1, +1,
+1, −1, −1, −1, −1, −1, −1, −1, +1, −1, −1, +1, +1, −1, +1, −1, −1, −1, −1, −1, +1, −1, +1,
+1, +1, −1, −1, +1, +1, +1, −1, −1, +1, +1, +1, +1, −1, +1, +1, −1, −1, +1, −1, +1, −1, +1,
−1, −1, +1, −1, +1, +1, +1, −1, −1, +1, +1, +1, −1, −1, −1, −1, +1, −1, −1, +1, +1, −1, +1,
−1, −1, −1, −1, −1, +1, −1, +1, +1, +1, −1, −1, +1, +1, +1, +1, +1, +1, +1, +1, −1, +1, +1,
−1, −1, +1, −1, +1, +1, +1, +1, +1, −1, +1, −1, −1, −1, +1, +1, −1, −1, −1, −1, −1, −1, −1,
−1, +1, −1, −1, +1, +1, −1, +1, −1, +1, −1, +1, +1, −1, +1, −1, −1, −1, +1, +1, −1, −1, −1,
−1, −1, −1, −1, +1, −1, −1, +1, +1, −1, +1, −1, −1, −1, −1, −1, +1, −1, +1, +1, +1, −1, −1,
+1, +1, +1, −1, −1, −1, −1, −1, −1, +1, −1, −1, +1, +1, −1, +1, −1, +1, −1, +1, +1, −1, +1,
−1, −1, −1, +1, +1, −1, −1, −1, +1, +1, +1, +1, −1, +1, +1, −1, −1, +1, −1, +1, +1, +1, +1,
+1, −1, +1, −1, −1, −1, +1, +1, −1, −1, −1, +1, [redacted] −1, +1, +1, +1, +1, −1, +1, +1,
−1, −1, +1, −1, +1, −1, +1, −1, −1, +1, −1, +1, +1, +1, −1, −1, +1, +1, +1, +1, +1, +1, +1,
−1, +1, +1, −1, −1, +1, −1, +1, +1, +1, +1, +1, −1, +1, −1, −1, −1, +1, +1, −1, −1, −1, +1,
+1, −1, −1, −1, −1, +1, −1, −1, +1, +1, −1, +1, −1, +1, −1, +1, +1, −1, +1, −1, −1, −1, +1,
+1, −1, −1, −1, +1, +1, +1, +1, −1, +1, +1, −1, −1, +1, −1, +1, +1, +1, +1, +1, −1, +1, −1,
−1, −1, +1, +1, −1, −1, −1, +1, −1, −1, −1, −1, +1, −1, −1, +1, +1, −1, +1, −1, +1, −1, +1,
+1, −1, +1, −1, −1, −1, +1, +1, −1, −1, −1, +1, −1, −1, −1, −1, +1, −1, −1, +1, +1, −1, +1,
−1, +1, −1, +1, +1, −1, +1, −1, −1, −1, +1, +1, −1, −1, −1, −1, −1, −1, −1, +1, −1, −1, +1,
+1, −1, +1, −1, −1, −1, −1, −1, +1, −1, +1, +1, +1, −1, −1, +1, +1, +1, −1, +1, −1, −1, −1,
−1, +1, −1, −1, +1, +1, −1, +1, −1, +1, −1, +1, +1, −1, +1, −1, −1, −1, +1, +1, −1, −1, −1,
+1, +1, +1, +1, −1, +1, +1, −1, −1, +1, −1, +1, +1, +1, +1, +1, −1, +1, −1, −1, −1, +1, +1,
−1, −1, −1, −1}

$HELTF_{1:996}$ =
{+1, +1, −1, +1, −1, +1, −1, −1, −1, +1, −1, −1, −1, +1, +1, −1, +1, +1, +1, +1, +1, −1, −1,
+1, +1, +1, +1, −1, +1, −1, +1, −1, −1, +1, +1, −1, +1, +1, +1, −1, −1, +1, −1, −1, −1, −1,
+1, +1, +1, −1, −1, −1, −1, −1, −1, +1, +1, +1, +1, +1, +1, −1, +1, +1, +1, −1, +1, +1, −1,
−1, −1, +1, −1, +1, −1, −1, +1, +1, −1, +1, −1, +1, +1, +1, +1, +1, −1, −1, +1, +1, +1, −1,
+1, +1, −1, −1, −1, +1, −1, +1, +1, −1, +1, +1, −1, +1, −1, −1, +1, +1, +1, +1, −1, −1, +1,
+1, +1, +1, +1, −1, +1, +1, −1, −1, −1, +1, −1, −1, −1, +1, −1, +1, −1, +1, +1, −1, +1, −1,
+1, −1, +1, +1, +1, −1, +1, +1, +1, −1, −1, +1, −1, −1, −1, −1, −1, +1, +1, −1, −1, −1, −1,
+1, −1, +1, −1, +1, +1, −1, −1, +1, −1, −1, −1, +1, +1, −1, +1, +1, +1, +1, −1, −1, −1, +1,
+1, +1, +1, −1, +1, +1, +1, +1, +1, +1, +1, −1, +1, +1, +1, −1, +1, +1, −1, −1, −1, +1, −1,
+1, −1, −1, +1, +1, −1, +1, −1, +1, +1, +1, +1, +1, −1, −1, +1, +1, +1, −1, +1, +1, −1, −1,
−1, +1, −1, +1, +1, −1, +1, +1, −1, +1, −1, −1, +1, −1, +1, −1, +1, −1, +1, +1, +1, −1, +1,
+1, +1, −1, −1, +1, −1, −1, −1, −1, −1, +1, +1, −1, −1, −1, −1, +1, −1, +1, −1, +1, +1, −1,
−1, +1, −1, −1, −1, +1, +1, −1, +1, +1, +1, +1, −1, −1, −1, +1, +1, +1, +1, −1, +1, −1, −1,
−1, −1, −1, −1, +1, −1, −1, −1, +1, −1, −1, +1, +1, +1, −1, +1, −1, +1, +1, −1, −1, +1, −1,
+1, −1, −1, −1, −1, −1, +1, +1, −1, −1, −1, +1, −1, −1, +1, +1, +1, −1, +1, −1, −1, +1, −1,
−1, +1, −1, +1, +1, +1, +1, +1, +1, −1, −1, +1, +1, +1, +1, +1, −1, +1, +1, −1, −1, −1, +1,
−1, −1, −1, +1, −1, +1, −1, +1, +1, −1, +1, −1, +1, −1, +1, +1, +1, −1, +1, +1, +1, −1, −1,
+1, −1, −1, −1, −1, −1, +1, +1, −1, −1, −1, −1, +1, −1, +1, −1, +1, +1, −1, −1, +1, −1, −1,
−1, +1, +1, −1, +1, +1, +1, +1, −1, −1, −1, +1, +1, +1, +1, −1, −1, +1, +1, +1, +1, +1, +1,
−1, +1, +1, +1, −1, +1, +1, −1, −1, −1, +1, −1, +1, −1, −1, +1, +1, −1, +1, −1, +1, +1, +1,
+1, +1, −1, −1, +1, +1, +1, −1, +1, +1, −1, −1, −1, +1, −1, +1, +1, −1, +1, +1, −1, +1, −1,
−1, −1, +1, −1, +1, −1, −1, −1, −1, +1, +1, +1, −1, −1, +1, [redacted] +1, −1, −1, −1, −1,
−1, −1, +1, −1, +1, +1, −1, −1, +1, +1, −1, +1, −1, +1, +1, −1, −1, +1, −1, +1, −1, −1, −1,
+1, +1, −1, +1, +1, +1, −1, +1, +1, +1, +1, +1, +1, +1, −1, +1, −1, −1, +1, −1, −1, +1, −1,
+1, +1, +1, −1, −1, +1, −1, −1, −1, +1, +1, −1, −1, −1, −1, −1, +1, −1, −1, −1, −1, −1, +1,
+1, −1, −1, −1, −1, −1, +1, −1, −1, +1, +1, +1, −1, +1, +1, +1, −1, +1, −1, +1, −1, −1, −1,
−1, −1, +1, +1, +1, −1, −1, −1, −1, +1, −1, −1, +1, +1, +1, −1, +1, +1, −1, −1, +1, −1, +1,
−1, −1, −1, −1, −1, −1, −1, +1, +1, −1, −1, −1, +1, −1, −1, +1, +1, +1, −1, +1, −1, −1, +1,
−1, −1, +1, −1, +1, +1, +1, −1, +1, −1, −1, +1, +1, −1, +1, −1, +1, +1, +1, −1, −1, +1, −1,
−1, −1, +1, −1, −1, −1, −1, −1, −1, −1, +1, −1, +1, +1, −1, +1, +1, −1, +1, −1, −1, −1, +1,
+1, −1, +1, +1, +1, −1, −1, +1, +1, +1, +1, +1, −1, +1, −1, −1, −1, −1, +1, +1, −1, −1, −1,
−1, −1, +1, −1, −1, +1, +1, +1, −1, +1, +1, +1, −1, +1, −1, +1, −1, −1, −1, −1, −1, +1, +1,
+1, −1, −1, −1, −1, +1, −1, −1, +1, +1, +1, −1, +1, +1, −1, −1, +1, −1, +1, −1, +1, +1, +1,
−1, +1, −1, −1, +1, +1, −1, +1, −1, +1, +1, +1, −1, −1, +1, −1, −1, −1, +1, −1, −1, −1, −1,
−1, −1, −1, +1, −1, +1, +1, −1, +1, +1, −1, +1, −1, −1, −1, +1, +1, −1, +1, +1, +1, −1, −1,
+1, +1, +1, +1, +1, −1, +1, +1, +1, +1, +1, −1, −1, +1, +1, +1, +1, +1, −1, +1, +1, −1, −1,
−1, +1, −1, −1, −1, +1, −1, +1, −1, +1, +1, +1, +1, +1, −1, −1, −1, +1, +1, +1, +1, −1, +1,
+1, −1, −1, −1, +1, −1, −1, +1, +1, −1, +1, −1, +1, −1, −1, −1, −1, −1, −1, +1, +1, −1, −1,
−1, +1, −1, −1, +1, +1, +1, −1, +1, −1, −1, +1, −1, −1, +1, −1, +1, −1, +1, −1, +1, −1, −1,
+1, +1, −1, +1, −1, +1, +1, +1, −1, −1, +1, −1, −1, −1, +1, −1, −1, −1, −1, −1, −1, −1, +1,
−1, +1, +1, −1, +1, +1, −1, +1, −1, −1, −1, +1, +1, −1, +1, +1, +1, −1, −1, +1, +1, +1, +1,
+1, −1, +1, −1, −1, −1, −1, +1, +1, −1, −1, −1, −1, −1, +1, −1, −1, +1, +1, +1, −1, +1, +1,
+1, −1, +1, −1, +1, −1, −1, −1, −1, −1, +1, +1, +1, −1, −1, −1, −1, +1, −1, −1, +1, +1, +1,
−1, +1, +1, −1, −1, +1, −1, +1, −1, +1}

$LTF_{80MHz\_left\_4x}$ = [+1, −1, −1, −1, −1, +1, −1, −1, +1, −1, −1, −1, +1, +1, −1, −1, −1, +1, −1, −1, +1, −1, +1,
+1, +1, −1, +1, −1, +1, −1, −1, −1, −1, +1, +1, +1, +1, +1, −1, −1, +1, −1, +1, −1, −1, −1, +1, +1,
−1, −1, +1, −1, −1, −1, +1, +1, +1, −1, −1, +1, +1, −1, −1, +1, −1, +1, +1, −1, +1, −1, +1, +1, +1,
−1, +1, −1, +1, +1, +1, +1, +1, +1, −1, −1, −1, +1, −1, +1, −1, −1, −1, +1, −1, −1, +1, +1, +1, +1,
+1, +1, −1, +1, −1, +1, +1, −1, +1, −1, +1, −1, +1, −1, +1, −1, −1, +1, +1, +1, +1, −1, −1, −1, −1,
−1, −1, −1, −1, +1, −1, −1, +1, −1, −1, +1, +1, +1, −1, +1, −1, −1, −1, +1, +1, +1, −1, +1, +1, −1,
−1, +1, −1, −1, −1, +1, +1, +1, +1, −1, +1, +1, +1, +1, +1, +1, −1, +1, −1, −1, +1, −1, +1, −1, −1,
+1, +1, +1, +1, +1, −1, +1, +1, −1, −1, +1, +1, +1, −1, +1, +1, −1, +1, +1, −1, −1, +1, +1, −1,
−1, −1, −1, +1, +1, +1, +1, +1, −1, +1, +1, +1, +1, +1, −1, +1, −1, +1, −1, −1, +1, −1, −1, −1, −1,
−1, +1, −1, −1, −1, +1, +1, −1, +1, −1, +1, −1, −1, −1, −1, −1, +1, +1, +1, +1, −1, +1, −1, −1, +1,
+1, −1, −1, −1, +1, +1, +1, +1, +1, −1, +1, −1, +1, −1, −1, +1, +1, +1, −1, +1, +1, +1, +1, +1,
−1, +1, +1, −1, +1, −1, +1, −1, −1, −1, −1, −1, +1, −1, −1, −1, −1, −1, +1, +1, +1, +1, −1, −1, +1,
+1, −1, −1, +1, −1, −1, +1, −1, −1, −1, +1, +1, −1, −1, +1, −1, −1, −1, −1, −1, +1, +1, −1, +1, −1,
+1, +1, −1, +1, −1, −1, −1, −1, −1, −1, +1, −1, −1, −1, −1, +1, +1, +1, −1, +1, +1, −1, −1, +1, −1,
−1, −1, +1, +1, +1, −1, +1, −1, +1, −1, −1, −1, +1, −1, +1, −1, +1, −1, −1, −1, +1, −1, −1, +1, −1,
+1, +1, −1, −1, −1, +1, +1, −1, −1, −1, −1, +1, −1, +1, +1, −1, +1, −1, +1, +1, +1, +1, +1, +1, −1,
−1, +1, −1, −1, −1, +1, −1, +1, −1, −1, −1, +1, +1, +1, +1, +1, +1, −1, +1, −1, +1, +1, +1, −1, +1,
−1, +1, +1, −1, +1, −1, −1, +1, +1, −1, −1, +1, +1, +1, −1, −1, −1, +1, −1, −1, +1, +1, −1, −1, −1,
+1, −1, +1, −1, −1, +1, +1, +1, +1, +1, −1, −1, −1, −1, +1, −1, +1, −1, +1, +1, +1, −1, +1, −1, −1,
+1, −1, −1, −1, +1, +1, −1, −1, −1, +1, −1, −1, +1, −1, −1, −1, −1, +1, −1, +1, +1, −1, −1, −1, +1,
−1, −1].

$LTF_{80MHz\_right\_4x}$ = [−1, −1, +1, −1, +1, +1, +1, +1, +1, +1, −1, −1, −1, −1, +1, −1, −1, +1, −1, −1, −1, +1, +1,
−1, −1, −1, +1, −1, −1, +1, −1, +1, +1, +1, −1, +1, −1, +1, −1, −1, −1, −1, +1, +1, +1, +1, +1, −1,
−1, +1, −1, +1, −1, −1, −1, +1, +1, −1, −1, +1, −1, −1, −1, +1, +1, +1, −1, −1, +1, +1, −1, −1, +1,
−1, +1, +1, −1, +1, −1, +1, +1, +1, −1, +1, −1, +1, +1, +1, +1, +1, +1, −1, −1, −1, +1, −1, +1,
−1, −1, −1, +1, −1, −1, +1, +1, +1, +1, +1, +1, −1, +1, −1, +1, +1, −1, +1, −1, −1, −1, −1, +1, +1,
−1, −1, −1, +1, +1, −1, +1, −1, −1, +1, −1, −1, −1, +1, −1, +1, −1, +1, −1, −1, −1, +1, −1, +1, −1,
+1, +1, +1, −1, −1, −1, +1, −1, −1, +1, +1, −1, +1, +1, +1, −1, −1, −1, −1, +1, −1, −1, −1, −1, −1,
−1, +1, −1, +1, +1, −1, +1, −1, +1, +1, −1, −1, −1, −1, −1, +1, −1, −1, +1, +1, −1, −1, −1, +1, −1,
−1, +1, −1, −1, +1, +1, −1, −1, +1, +1, +1, +1, −1, −1, −1, −1, −1, +1, −1, −1, −1, −1, −1, +1, −1,
+1, −1, +1, +1, −1, +1, +1, +1, +1, +1, −1, +1, +1, +1, −1, −1, +1, −1, +1, −1, +1, +1, +1, +1, +1,
−1, −1, −1, +1, +1, −1, −1, −1, −1, −1, −1, −1, −1, +1, +1, +1, +1, +1, −1, +1, −1, +1, −1, −1, +1,
+1, +1, −1, +1, +1, +1, +1, +1, −1, +1, +1, −1, +1, −1, +1, −1, −1, −1, −1, −1, +1, −1, −1, −1, −1,
−1, +1, +1, +1, +1, −1, −1, +1, +1, −1, −1, +1, −1, −1, +1, −1, −1, −1, +1, +1, −1, −1, +1, −1, −1,
−1, −1, −1, +1, +1, −1, +1, −1, +1, +1, −1, +1, −1, −1, −1, −1, −1, −1, +1, −1, −1, −1, −1, +1, +1,
+1, −1, +1, +1, −1, −1, +1, −1, −1, −1, +1, +1, +1, −1, +1, −1, −1, −1, +1, +1, −1, +1, +1, −1, +1,
+1, +1, +1, +1, +1, +1, +1, −1, −1, −1, −1, +1, +1, −1, +1, −1, +1, −1, +1, −1, +1, −1, −1, +1, −1,
+1, −1, −1, −1, −1, −1, −1, +1, +1, −1, +1, +1, +1, −1, +1, −1, +1, +1, +1, −1, −1, −1, −1, −1, −1,
+1, −1, +1, −1, −1, −1, +1, −1, +1, −1, −1, +1, −1, +1, +1, −1, −1, +1, +1, −1, −1, −1, +1, +1, +1,
−1, +1, +1, −1, −1, +1, +1, +1, −1, +1, −1, +1, +1, −1, −1, −1, −1, −1, +1, +1, +1, +1, −1, +1, −1,
+1, −1, −1, −1, +1, −1, +1, +1, −1, +1, +1, +1, −1, −1, +1, +1, +1, −1, +1, +1, −1, +1, +1, +1, +1,
−1].

$EHT\text{-}LTF_{dRU26,BW20}$ = [-1 1 1 -1 -1 -1 -1 1 -1 -1 1 1 -1 1 -1 -1 -1 -1 1 -1 1 -1 -1 1 1 1]

$EHT\text{-}LTF_{dRU52,BW20}$ = [1 -1 -1 -1 -1 -1 -1 -1 1 -1 -1 1 1 -1 1 -1 -1 -1 -1 -1 1 -1 1 1 1 -1 -
1 1 1 1 -1 -1 -1 -1 -1 -1 1 -1 -1 1 1 -1 1 -1 1 -1 1 1 -1 1 -1 -1]

$EHT\text{-}LTF_{dRU106,BW20}$ = [1 1 1 1 1 -1 1 1 1 -1 1 1 -1 -1 -1 1 -1 1 -1 -1 1 1 -1 1 -1 1 1 1 1
1 -1 -1 1 1 1 -1 1 1 -1 -1 -1 1 -1 1 1 -1 1 1 -1 1 -1 -1 1 1 1 -1 1 -1 1
1 1 -1 1 1 1 -1 -1 1 -1 -1 -1 -1 -1 1 1 -1 -1 -1 -1 1 -1 1 -1 1 1 -1 -1
1 -1 -1 -1 1 1 -1 1 1 1 1 -1 -1 -1 1 1 1 1 -1]

EHT-LTF Starting Index for dRU on BW20

| dRU Type | $S_{ltf}$ for Option-1 | EHT-LTF base sequence |
|---|---|---|
| dRU26, i=1:9 | 193 | *BW20 EHT-LTF 4x* |
| dRU52, i=1:4 | 158 | *BW40 EHT-LTF 4x* |
| dRU106, i=1:2 | 191 | *BW80 EHT-LTF 4x* |

- BW40

EHT-LTF Starting Index for dRU on BW40

| dRU Type | $S_{ltf}$ for Option-1 | EHT-LTF base sequence |
|---|---|---|
| dRU26, i=1:18 | 164 | *BW80 EHT-LTF 4x* |
| dRU52, i=1:8 | 56 | *BW40 EHT-LTF 4x* |
| dRU106, i=1:4 | 1 | *BW20 EHT-LTF 4x* |
| dRU242, i=1:2 | 118 | *BW40 EHT-LTF 4x* |

- BW80

EHT-LTF Starting Index for dRU on BW80

| dRU Type | $S_{ltf}$ for Option-1 | EHT-LTF base sequence |
|---|---|---|
| dRU52, i=1:16 | 148 | *BW20 EHT-LTF 4x* |
| dRU106, i=1:8 | 35 | *BW320 EHT-LTF 4x* |
| dRU242, i=1:4 | 1 | *BW40 EHT-LTF 4x* |
| dRU484, i=1:2 | 1 | *BW320 EHT-LTF 4x* |

Starting index ($S_{ltf}$) is 1

$S_{ltf}$ for dRU26_1 on BW20

{+1, +1, −1, +1, −1, +1, −1, −1, −1, +1, −1, −1, −1, +1, +1, −1, +1, +1, +1, +1, +1, −1, −1,
+1, +1, +1, +1, −1, +1, −1, +1, −1, −1, +1, +1, −1, +1, +1, +1, −1, −1, +1, −1, −1, −1, −1,
+1, +1, +1, −1, −1, −1, −1, −1, −1, +1, +1, +1, +1, +1, +1, −1, +1, +1, +1, −1, +1, +1, −1,
−1, −1, +1, −1, +1, −1, −1, +1, +1, −1, +1, −1, +1, +1, +1, +1, +1, −1, −1, +1, +1, +1, −1,
+1, +1, −1, −1, −1, +1, −1, +1, +1, −1, +1, +1, −1, +1, −1, −1, +1, +1, +1, +1, −1, −1, +1,
+1, +1, +1, +1, −1, +1, +1, −1, −1, −1, +1, −1, −1, −1, +1, −1, +1, −1, +1, +1, −1, +1, −1,
+1, −1, +1, +1, +1, −1, +1, +1, +1, −1, −1, +1, −1, −1, −1, −1, −1, +1, +1, −1, −1, −1, −1,
+1, −1, +1, −1, +1, +1, −1, −1, +1, −1, −1, −1, +1, +1, −1, +1, +1, +1, +1, −1, −1, −1, +1,
+1, +1, +1, −1, +1, +1, +1, +1, +1, +1, +1, −1, +1, +1, +1, −1, +1, +1, −1, −1, −1, +1, −1,
+1, −1, −1, +1, +1, −1, +1, −1, +1, +1, +1, +1, +1, −1, −1, +1, +1, +1, −1, +1, +1, −1, −1,
−1, +1, −1, +1, +1, −1, +1, +1, −1, +1, −1, −1, +1, −1, +1, −1, +1, −1, +1, +1, +1, −1, +1,
+1, +1, −1, −1, +1, −1, −1, −1, −1, −1, +1, +1, −1, −1, −1, −1, +1, −1, +1, −1, +1, +1, −1,
−1, +1, −1, −1, −1, +1, +1, −1, +1, +1, +1, +1, −1, −1, −1, +1, +1, +1, +1, −1, +1, −1, −1,
−1, −1, −1, −1, +1, −1, −1, −1, +1, −1, −1, +1, +1, +1, −1, +1, −1, +1, +1, −1, −1, +1, −1,
+1, −1, −1, −1, −1, −1, +1, +1, −1, −1, −1, +1, −1, −1, +1, +1, +1, −1, +1, −1, −1, +1, −1,
−1, +1, −1, +1, +1, +1, +1, +1, +1, −1, −1, +1, +1, +1, +1, +1, −1, +1, +1, −1, −1, −1, +1, $S_{ltf}$ for dRU52_1 on BW40

$S_{ltf}$ for dRU106_1 on BW80

EHT-LTF Starting Index for dRU on BW20

| dRU Type | $S_{st}$ for Option-2a | $S_{st}$ for Option-2b | EHT-LTF base sequence |
|---|---|---|---|
| dRU26, i=1:9 | [529, 164, 164, 164, 2, 520, 164, 861, 103] | 164 | *11be BW80 EHT-LTF 4x* |
| dRU52, i=1:4 | [541, 539, 621, 284] | 91 | |
| dRU106, i=1:2 | [733, 194] | 191 | |

- BW40

EHT-LTF Starting Index for dRU on BW40

| dRU Type | $S_{st}$ for Option-2a | $S_{st}$ for Option-2b | EHT-LTF base sequence |
|---|---|---|---|
| dRU26, i=1:18 | [529, 164, 164, 520, 861, 520, 529, 861, 164, 164, 164, 104, 164, 164, 164, 164, 477, 104] | 164 | *11be BW80 EHT-LTF 4x* |
| dRU52, i=1:8 | [729, 584, 674, 455, 729, 578, 674, 272] | 257 | |
| dRU106, i=1:4 | [137, 136, 138, 139] | 732 | |
| dRU242, i=1:2 | [104, 244] | 515 | |

- BW80

EHT-LTF Starting Index for dRU on BW80

| dRU Type | $S_{st}$ for Option-2a | $S_{st}$ for Option-2b | EHT-LTF base sequence |
|---|---|---|---|
| dRU52, i=1:16 | [343, 257, 675, 93, 674, 411, 675, 411, 93, 167, 15, 675, 222, 675, 411, 343] | 547 | *11be BW80 EHT-LTF 4x* |
| dRU106, i=1:8 | [246, 854, 555, 137, 379, 245, 140, 245] | 137 | |
| dRU242, i=1:4 | [240, 751, 753, 641] | 641 | |
| dRU484, i=1:2 | [7, 511] | 1 | |

EHT-LTF Starting Index for dRU on BW20

| dRU Type | $S_{id}$ for Option-2a | $S_{id}$ for Option-2b | EHT-LTF base sequence |
|---|---|---|---|
| dRU26, i=1:9 | [529, 164, 272, 578, 2, 520, 15, 28, 103] | 164 | *11be BW80 EHT-LTF 4x* |
| dRU52, i=1:4 | [541, 539, 621, 284] | 91 | |
| dRU106, i=1:2 | [733, 194] | 191 | |

- BW40

EHT-LTF Starting Index for dRU on BW40

| dRU Type | $S_{id}$ for Option-2a | $S_{id}$ for Option-2b | EHT-LTF base sequence |
|---|---|---|---|
| dRU26, i=1:18 | [529, 578,210, 520, 861, 582, 529, 783, 76, 594, 149, 273, 164, 134, 272, 712, 477, 104] | 164 | *11be BW80 EHT-LTF 4x* |
| dRU52, i=1:8 | [729, 584, 674, 455, 729, 578, 674, 272] | 257 | |
| dRU106, i=1:4 | [137, 136, 138, 139] | 732 | |
| dRU242, i=1:2 | [104, 244] | 515 | |

- BW80

EHT-LTF Starting Index for dRU on BW80

| dRU Type | $S_{id}$ for Option-2a | $S_{id}$ for Option-2b | EHT-LTF base sequence |
|---|---|---|---|
| dRU52, i=1:16 | [112, 257, 28, 92, 674, 672,917, 411, 93, 167, 15, 675, 222, 621, 914, 343] | 547 | *11be BW80 EHT-LTF 4x* |
| dRU106, i=1:8 | [246, 854, 555, 137, 379, 245, 140, 245] | 137 | |
| dRU242, i=1:4 | [240, 751, 753, 641] | 641 | |
| dRU484, i=1:2 | [7, 511] | 1 | |

Segment Sequence

EHT-LTF Starting Index for dRU on BW20/40/80

| dRU Type | $S_{ltf}$ for Option-3 | EHT-LTF base sequence |
|---|---|---|
| dRU26 | 164 | *BW80 EHT-LTF 4x* |
| dRU52 | 148 | *BW20 EHT-LTF 4x* |
| dRU106 | 137 | *BW80 EHT-LTF 4x* |
| dRU242 | 118 | *BW40 EHT-LTF 4x* |
| dRU484 | 1 | *BW320 EHT-LTF 4x* |

$$r^{(i_{TX})}_{\text{dRU-LTF},r,u}(t) = \frac{1}{\sqrt{N_{SS,r,total}\left|K_r^{\text{EHT-LTF}}\right|}} \sum_{n=0}^{N_{\text{EHT-LTF}}-1} w_{T_{\text{EHT-LTF}}}(t - nT_{\text{EHT-LTF}})$$

$$\sum_{k \in K_r} \sum_{m=1}^{N_{SS,r,u}} ([Q_{k,u}]_{i_{TX},m} [A^k_{\text{EHT-LTF}}]_{(M_{r,u}+m),(n+1)} \,\text{dRU-LTF}_{k,u,m}$$

$$\exp(j2\pi k\Delta_{F,\text{EHT}}(t - nT_{\text{EHT-LTF-SYM}} - T_{GI,\text{EHT-LTF}} - T_{CS,\text{EHT}}(M_{r,u}+m))))$$

5400

$dRU\_LTF_{-122:122}$=

{0 0 -1 1 -1 1 -1 1 1 1 -1 1 1 -1 1 -1 -1 -1 -1 1 -1 -1 1 -1 -1
1 1 -1 -1 -1 -1 -1 -1 -1 1 1 -1 1 -1 1 1 -1 1 -1 1 -1 -1 -1 -1 -1
1 1 1 -1 1 1 -1 -1 1 1 -1 1 -1 1 -1 1 -1 -1 1 -1 1 1 1 1 -1
1 1 -1 1 -1 -1 -1 1 1 -1 1 -1 -1 1 -1 -1 -1 -1 -1 -1 1 -1 1 -1 -1
1 1 -1 1 1 -1 1 1 -1 1 1 -1 1 -1 1 -1 1 -1 -1 1 -1 0 0 0 -1
1 -1 1 -1 -1 1 -1 -1 -1 1 -1 1 -1 -1 -1 1 1 1 -1 1 -1 -1 -1 -1 -1
-1 -1 -1 -1 -1 -1 1 1 -1 1 -1 -1 -1 -1 1 1 1 1 1 -1 -1 1 -1 -1 1
1 -1 -1 -1 -1 1 -1 1 1 -1 -1 1 1 1 -1 -1 1 -1 -1 -1 -1 1 -1 1 1
-1 -1 1 -1 1 1 -1 1 1 -1 1 1 -1 1 1 -1 1 -1 1 -1 -1 1 1 -1 -1
-1 -1 1 1 1 -1 -1 -1 -1 1 -1 -1 -1 1 1 1 -1 1 0 0} dRU-LTF PAPR (dB) for BW20, {1ss,2ss}

<table>
<tr><th></th><th>1</th><th>2</th><th>3</th><th>4</th><th>5</th><th>6</th><th>7</th><th>8</th><th>9</th></tr>
<tr><td>dRU26</td><td>3.12, 3.79</td><td>3.29, 3.56</td><td>3.58, 3.67</td><td>3.8, 3.53</td><td rowspan="3">2.96, 2.97</td><td>2.99, 3.47</td><td>2.79, 3.70</td><td>3.77, 3.72</td><td>3.3, 3.42</td></tr>
<tr><td>dRU52</td><td colspan="2">4.74, 4.75</td><td colspan="2">4.71, 4.75</td><td colspan="2">4.72, 4.72</td><td colspan="2">4.74, 4.73</td></tr>
<tr><td>dRU106</td><td colspan="4">4.59, 4.77</td><td colspan="4">4.77, 4.68</td></tr>
</table>

$dRU\_LTF_{-244:244}$=

{1 1 -1 1 -1 1 -1 1 -1 -1 1 -1 1 -1 1 -1 -1 -1 -1 1 1 -1 1 1 1 -1 1 1 -1 1 -1
-1 -1 1 1 1 -1 -1 -1 -1 -1 -1 -1 1 1 -1 1 -1 1 -1 -1 -1 -1 -1 -1 1 1 1 1 1 1 -1
-1 1 1 1 1 -1 1 1 1 -1 -1 -1 -1 1 -1 -1 -1 -1 -1 -1 -1 1 -1 1 1 -1 -1 1 1 1 -1
-1 -1 1 1 -1 -1 -1 1 -1 1 -1 -1 1 1 1 -1 1 1 -1 1 -1 1 1 1 -1 1 -1 -1 1 -1 -1
-1 1 1 -1 -1 1 -1 1 1 1 -1 -1 -1 -1 1 -1 -1 1 -1 -1 1 -1 -1 1 -1 1 1 -1 -1 -1 -1
1 -1 1 1 1 1 -1 -1 1 1 1 -1 1 -1 -1 1 -1 1 -1 1 -1 -1 -1 -1 1 1 1 -1 1 -1 -1
1 -1 -1 1 -1 -1 -1 1 1 1 1 -1 1 1 -1 1 1 -1 -1 1 1 -1 -1 1 1 1 -1 1 1 1 1
1 -1 1 -1 -1 -1 -1 1 1 -1 1 1 -1 1 -1 -1 1 1 -1 -1 1 1 1 -1 -1 0 0 0 0 0 1
1 -1 1 -1 -1 -1 -1 1 1 1 -1 -1 1 -1 1 1 1 1 -1 1 -1 -1 1 1 -1 -1 -1 1 -1 -1 1
1 -1 1 1 1 -1 1 -1 1 1 1 -1 1 -1 -1 -1 1 1 -1 -1 1 -1 -1 -1 -1 1 1 -1 -1 -1 -1
1 1 -1 -1 1 -1 -1 1 -1 1 -1 -1 1 1 -1 1 -1 -1 1 1 1 -1 1 1 1 1 -1 1 -1 1 -1
1 1 1 1 -1 1 -1 1 1 -1 -1 1 -1 1 1 1 1 -1 -1 1 1 1 -1 1 1 -1 -1 1 -1 1 1
1 -1 -1 1 -1 -1 1 1 1 1 -1 1 -1 -1 -1 1 -1 -1 1 -1 -1 1 -1 -1 1 1 1 1 -1 -1 -1
1 1 1 -1 1 1 1 1 -1 -1 -1 -1 1 1 -1 -1 -1 -1 1 -1 1 -1 1 -1 1 1 -1 -1 -1 -1 -1
1 1 -1 1 -1 1 1 -1 -1 1 -1 1 1 -1 -1 -1 1 -1 -1 -1 -1 1 1 1 1 1 -1 -1 1 1 1
-1 1 -1 1 -1 -1 -1 1 1 1 1 1 1 -1 -1 1 -1 1 1 1 1 -1 -1 -1} dRU-LTF PAPR (dB) for BW40, {1ss,2ss}

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| dRU26 | 3.72, 3.53 | 3.79, 3.63 | 3.85, 3.69 | 3.41, 3.37 | 3.54, 3.90 | 3.59, 3.75 | 3.75, 3.64 | 3.47, 3.51 | 3.84, 3.83 | 3.44, 3.79 | 3.51, 3.40 | 3.28, 3.75 | 3.63, 3.43 | 3.88, 3.82 | 3.89, 3.81 | 3.70, 3.78 | 3.61, 3.74 | 3.63, 3.59 |
| dRU52 | 4.15, 4.04 | | 3.61, 4.08 | | | 3.71, 3.95 | | 3.82, 3.88 | | 4.11, 3.92 | | 3.75, 4.12 | | | 4.09, 3.85 | | 4.15, 3.90 | |
| dRU106 | 5.20, 5.23 | | | | | 5.09, 5.13 | | | | 5.15, 5.01 | | | | | 4.76, 5.01 | | | |
| dRU242 | 5.46, 5.53 | | | | | | | | | 5.38, 5.42 | | | | | | | | |

$dRU\_LTF_{-500:500}$=
{0 -1 1 -1 1 -1 1 -1 1 -1 -1 -1 1 1 1 1 1 -1 -1 -1 -1 -1 -1 -1 -1 -1 -1 -1 -1 -1 -1 -1 -1 -1 -1 -1 -1
-1 -1 -1 -1 -1 -1 -1 -1 -1 -1 -1 -1 1 1 -1 -1 -1 1 -1 1 1 1 1 1 1 1 1 -1 1 1 -1 -1 1 1 -1 1 1
1 1 1 1 1 1 1 -1 1 1 1 -1 -1 -1 1 1 -1 1 -1 -1 -1 -1 -1 -1 -1 -1 1 -1 -1 1 -1 -1 -1 -1 -1 -1 -1
-1 -1 -1 -1 -1 -1 -1 -1 -1 -1 1 1 -1 1 -1 -1 1 -1 -1 -1 -1 -1 -1 -1 -1 -1 -1 -1 1 1 -1 -1 -1 -1 -1 -1 -1
-1 -1 -1 -1 -1 -1 -1 -1 -1 1 1 1 1 -1 1 -1 1 1 1 1 1 1 1 1 -1 1 1 -1 -1 1 1 1 1 1 1 1 1
1 1 1 1 -1 1 1 1 -1 1 -1 1 1 1 -1 1 1 1 1 1 1 1 1 1 1 1 -1 -1 1 1 1 1 1 -1 1 1 1
1 1 1 1 1 1 1 -1 -1 1 1 -1 -1 -1 -1 -1 1 -1 -1 -1 1 -1 -1 -1 -1 1 1 -1 -1 1 -1 -1 1 -1 -1 -1 1
-1 -1 1 -1 -1 -1 1 1 -1 -1 1 1 1 -1 1 -1 -1 -1 -1 -1 1 -1 1 1 -1 -1 -1 1 -1 1 -1 -1 1 1 -1 -1 1
1 1 -1 -1 -1 -1 1 1 1 -1 1 1 -1 -1 -1 1 1 1 -1 -1 -1 -1 1 1 -1 1 1 -1 -1 -1 -1 -1 -1 -1 -1 -1 1
-1 -1 1 -1 1 -1 -1 1 -1 1 1 1 -1 -1 1 1 1 -1 -1 -1 1 1 1 1 -1 1 1 -1 1 -1 1 1 1 -1 1 -1 -1
1 -1 1 -1 1 -1 -1 1 -1 1 1 1 -1 -1 1 1 -1 -1 1 1 1 -1 1 -1 1 -1 -1 1 1 -1 1 1 -1 1 -1 -1 1
1 1 1 -1 -1 -1 -1 -1 1 -1 1 -1 -1 -1 1 1 1 -1 -1 1 -1 -1 -1 -1 1 1 -1 -1 -1 1 1 1 -1 1 1 -1 -1
1 -1 1 -1 1 -1 -1 1 1 1 -1 -1 -1 1 1 1 -1 1 1 -1 1 -1 -1 -1 -1 1 1 -1 -1 1 -1 1 -1 -1 1 1 1
-1 -1 -1 1 0 0 0 0 0 0 0 0 0 0 0 0 0 0 0 0 0 0 0 0 0 0 0 0 0 0 0 0 0 0 0 0 1
-1 1 1 -1 -1 -1 -1 -1 1 -1 -1 1 -1 1 1 1 -1 1 1 1 1 1 -1 -1 -1 1 1 -1 1 1 -1 -1 -1 1 1 -1 -1
-1 -1 1 1 1 1 1 -1 -1 1 1 -1 1 -1 -1 1 1 -1 -1 -1 -1 1 1 -1 1 1 1 1 1 1 -1 -1 1 -1 -1 1 1
1 1 -1 -1 -1 1 1 -1 -1 -1 1 1 -1 -1 -1 1 1 -1 1 -1 -1 -1 -1 1 1 -1 1 1 1 -1 -1 -1 1 -1 -1 1 -1
1 1 1 -1 1 -1 -1 1 -1 1 1 -1 -1 1 1 -1 -1 1 -1 1 -1 1 1 1 -1 1 1 -1 -1 -1 -1 1 1 -1 -1 -1 1
1 -1 -1 1 1 -1 -1 -1 1 -1 -1 1 1 1 -1 -1 1 1 1 -1 -1 1 -1 1 1 -1 1 -1 1 1 -1 1 -1 -1 -1 1 -1
-1 1 -1 -1 -1 1 1 -1 1 1 -1 1 -1 -1 -1 1 1 1 -1 -1 1 1 1 1 1 -1 -1 1 -1 1 1 -1 -1 -1 1 -1 -1
1 1 -1 1 -1 1 -1 -1 -1 1 1 1 -1 -1 1 -1 1 -1 1 -1 1 1 -1 1 1 1 -1 1 -1 1 1 1 -1 -1 -1 -1 1
-1 -1 -1 1 1 -1 -1 1 -1 -1 1 1 -1 1 1 -1 -1 1 -1 1 -1 -1 1 -1 1 -1 1 1 -1 -1 -1 -1 -1 -1 -1 1 1
1 -1 1 1 1 -1 1 1 1 -1 -1 -1 -1 -1 1 -1 -1 -1 1 1 -1 1 -1 1 -1 1 -1 -1 1 1 1 1 1 1 -1 -1 -1
1 1 1 1 1 1 1 -1 -1 -1 -1 -1 -1 1 1 1 1 -1 -1 -1 1 -1 -1 -1 -1 -1 -1 -1 -1 1 -1 1 1 -1 -1 -1 -1
1 1 -1 -1 1 1 -1 1 -1 1 -1 -1 1 1 1 1 -1 1 1 1 -1 -1 1 -1 1 1 -1 1 1 1 -1 1 -1 -1 -1 1 -1
1 1 1 -1 1 1 -1 1 -1 -1 -1 1 1 1 -1 -1 1 -1 -1 -1 1 1 1 1 -1 -1 -1 1 -1 -1 1 -1 1 -1 -1 -1 1
-1 -1 -1 1 1 1 1 1 1 -1 1 -1 1 -1 -1 -1 1 -1 -1 1 1 -1 1 1 1 1 -1 1 -1 -1 -1 -1 -1 -1 1 1 1
1 -1}

FIG. 54C

5400 dRU-LTF PAPR (dB) for BW80, {1ss,2ss}

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| dRU52 | 5.10, 5.08 | 5.04, 5.07 | 4.78, 4.77 | 4.72, 4.68 | 5.02, 5.05 | 5.06, 4.42 | 5.06, 5.05 | 4.72, 4.96 | 5.08, 4.44 | 4.94, 4.94 | 4.96, 4.87 | 5.07, 5.06 | 4.93, 4.85 | 4.87, 5.08 | 4.99, 4.53 | 4.94, 4.92 |
| dRU106 | 5.28, 5.47 | | 5.39, 5.48 | | 5.42, 5.41 | | 5.24, 4.99 | | 5.26, 5.41 | | 5.49, 5.19 | | 4.98, 5.48 | | 5.40, 5.45 | |
| dRU242 | 5.69, 5.6 | | | | 5.67, 5.43 | | | | 5.56, 5.50 | | | | 5.54, 5.50 | | | |
| dRU484 | 6.15, 6.25 | | | | | | | | 6.29, 6.32 | | | | | | | |

1st Spatial Stream PAPR

2nd Spatial Stream PAPR

| | 1 | 2 | 3 | 4 | 5 | 6 | 7 | 8 | 9 |
|---|---|---|---|---|---|---|---|---|---|
| dRU26 | 3.72, 3.89 | 3.58, 3.76 | 3.84, 3.74 | 3.71, 3.71 | 2.96, 2.97 Or 2.97, 2.96 | 3.91, 3.91 | 3.60, 3.90 | 3.91, 3.91 | 3.71, 3.50 |
| dRU52 | 4.55, 4.78 | | 4.78, 4.70 | | | 4.77. 4.79 | | 4.32, 4.62 | |
| dRU106 | 4.65, 4.68 | | | | | 4.65,4.67 | | | |

FIG. 55

5600 dRU LTF sequence option-1

$dRU\_LTF_{-122:122}$=
{0 0 -1 -1 1 1 1 -1 1 -1 -1 -1 -1 1 -1 1 -1 1 1 -1 1 1 -1 1 -1
1 -1 1 -1 1 1 -1 -1 -1 1 1 -1 -1 -1 1 -1 -1 -1 1 1 1 -1 -1 -1 1
1 -1 -1 1 -1 -1 -1 -1 1 1 1 1 1 1 -1 -1 -1 1 1 -1 1 1 -1 -1 -1
-1 -1 -1 -1 -1 1 1 1 -1 -1 -1 -1 -1 -1 1 1 1 1 1 -1 1 -1 -1 -1 1
1 -1 1 -1 1 -1 1 -1 1 -1 -1 1 -1 1 -1 -1 -1 1 -1 -1 1 0 0 0 -1
1 1 -1 1 1 -1 1 1 -1 -1 -1 1 1 1 1 1 -1 -1 1 -1 1 -1 1 1 1
1 -1 -1 1 -1 1 1 -1 -1 1 -1 1 1 1 -1 1 1 1 -1 1 -1 -1 -1 1 -1
-1 -1 -1 -1 1 -1 1 1 1 -1 -1 1 -1 1 -1 -1 -1 1 1 -1 -1 1 -1 -1 -1
-1 -1 -1 1 -1 -1 1 1 1 1 -1 -1 -1 -1 1 1 1 1 -1 1 -1 1 1 1 -1
-1 -1 1 -1 1 1 1 -1 -1 1 1 -1 1 -1 -1 1 -1 1 0 0}

FIG. 56

5700 dRU LTF sequence option-2

$dRU\_LTF_{-122:122}$=
{0 0 -1 -1 1 1 1 -1 1 -1 -1 -1 -1 1 -1 1 -1 1 1 -1 1 1 -1 1 -1
1 -1 1 -1 1 1 -1 -1 -1 1 1 -1 -1 -1 1 -1 -1 -1 1 1 1 -1 -1 -1 1
1 -1 -1 1 -1 1 -1 -1 1 1 1 1 1 1 -1 -1 -1 1 1 -1 1 1 -1 -1 -1
-1 -1 -1 -1 -1 1 1 1 -1 -1 -1 -1 -1 -1 1 1 1 1 1 -1 1 -1 -1 -1 1
1 -1 1 -1 1 -1 1 -1 1 -1 -1 1 -1 1 -1 -1 -1 1 -1 -1 1 0 0 0 -1
1 1 -1 1 1 -1 1 1 -1 -1 -1 1 1 1 1 1 -1 -1 1 -1 1 -1 1 1 1
1 -1 -1 1 -1 1 1 -1 -1 1 -1 1 1 1 -1 1 1 1 -1 1 -1 -1 -1 1 -1
-1 -1 -1 -1 1 -1 -1 1 1 -1 -1 1 -1 1 -1 -1 -1 1 1 -1 -1 1 -1 -1 -1
-1 -1 -1 1 -1 -1 1 1 1 1 -1 -1 -1 -1 1 1 1 1 -1 1 -1 1 1 1 -1
-1 -1 1 -1 1 1 1 -1 -1 1 1 -1 1 -1 -1 1 -1 1 0 0}

FIG. 57

5800 dRU LTF sequence option-3

$dRU\_LTF_{-122:122}$=

5900 dRU LTF sequence option-4

$dRU\_LTF_{-122:122}$=

6000 dRU LTF sequence option-5

$dRU\_LTF_{-122:122}$=
{0 0 -1 -1 1 1 1 -1 1 -1 1 -1 -1 1 -1 1 -1 1 1 -1 1 1 -1 1 -1
1 -1 1 1 1 1 -1 -1 -1 1 1 -1 -1 -1 1 -1 -1 -1 1 1 1 1 -1 -1 1
1 -1 -1 1 -1 -1 -1 -1 1 1 1 1 1 1 1 -1 -1 1 1 -1 1 1 -1 -1 -1
-1 -1 -1 -1 -1 1 1 -1 -1 -1 -1 -1 -1 -1 1 1 1 1 1 -1 1 -1 -1 -1 1
-1 -1 1 -1 1 -1 1 -1 1 -1 -1 1 -1 1 -1 -1 -1 1 1 -1 1 0 0 0 -1
1 1 -1 1 1 -1 1 1 -1 -1 -1 -1 1 1 1 1 -1 -1 1 -1 1 -1 1 1 1
1 -1 -1 1 1 1 1 -1 -1 1 -1 1 1 1 -1 1 1 1 -1 1 -1 -1 1 1 -1
-1 -1 -1 -1 1 -1 1 1 1 -1 -1 1 -1 1 -1 1 -1 1 1 -1 -1 1 -1 -1 -1
-1 -1 -1 1 -1 -1 1 1 -1 1 -1 -1 -1 -1 1 1 1 1 -1 1 -1 1 1 1 -1
-1 1 1 -1 1 1 1 -1 -1 1 1 -1 1 -1 -1 1 -1 1 0 0}

FIG. 60

6100 dRU LTF sequence option-6

$dRU\_LTF_{-122:122}$=
{0 0 -1 -1 1 1 1 -1 1 -1 1 -1 -1 1 -1 1 -1 1 1 -1 1 1 -1 1 -1
1 -1 1 1 1 1 -1 -1 -1 1 1 -1 -1 -1 1 -1 -1 -1 1 1 1 1 -1 -1 1
1 -1 -1 1 -1 1 -1 -1 1 1 1 1 1 1 1 -1 -1 1 1 -1 1 1 -1 -1 -1
-1 -1 -1 -1 -1 1 1 -1 -1 -1 -1 -1 -1 -1 1 1 1 1 1 -1 1 -1 -1 -1 1
-1 -1 1 -1 1 -1 1 -1 1 -1 -1 1 -1 1 -1 -1 -1 1 1 -1 1 0 0 0 -1
1 1 -1 1 1 -1 1 1 -1 -1 -1 -1 1 1 1 1 -1 -1 1 -1 1 -1 1 1 1
1 -1 -1 1 1 1 1 -1 -1 1 -1 1 1 1 -1 1 1 1 -1 1 -1 -1 1 1 -1
-1 -1 -1 -1 1 -1 -1 1 1 -1 -1 1 -1 1 -1 1 -1 1 1 -1 -1 1 -1 -1 -1
-1 -1 -1 1 -1 -1 1 1 -1 1 -1 -1 -1 -1 1 1 1 1 -1 1 -1 1 1 1 -1
-1 1 1 -1 1 1 1 -1 -1 1 1 -1 1 -1 -1 1 -1 1 0 0}

FIG. 61

6200 dRU LTF sequence option-7

$dRU\_LTF_{-122:122}$=

6300 dRU LTF sequence option-8

$dRU\_LTF_{-122:122}$=
{0 0 -1 -1 1 1 1 -1 1 -1 1 -1 -1 1 -1 1 -1 1 1 1 1 1 -1 1 -1
1 -1 1 1 1 1 -1 -1 -1 1 1 -1 1 -1 1 -1 -1 -1 1 1 1 1 -1 -1 1
1 -1 -1 1 -1 1 -1 -1 1 1 1 1 1 1 1 -1 -1 1 1 -1 1 1 -1 1 -1
-1 -1 -1 -1 -1 1 1 -1 -1 -1 -1 -1 -1 -1 1 1 -1 1 1 -1 1 -1 -1 -1 1
-1 -1 1 -1 1 -1 1 -1 1 1 -1 1 -1 1 -1 -1 -1 1 1 -1 1 0 0 0 -1
1 1 1 1 1 -1 1 1 -1 -1 -1 -1 1 1 1 1 -1 -1 1 -1 -1 -1 1 1 1
1 -1 -1 1 1 1 1 -1 -1 1 -1 1 1 -1 -1 1 1 1 -1 1 -1 -1 1 1 -1
-1 -1 -1 -1 1 -1 -1 1 1 -1 -1 1 -1 1 -1 1 -1 1 1 -1 -1 1 -1 -1 1
-1 -1 -1 1 -1 -1 1 1 -1 1 -1 -1 -1 -1 1 1 1 -1 -1 1 -1 1 1 1 -1
-1 1 1 -1 1 1 1 -1 -1 1 -1 -1 1 -1 -1 1 -1 1 0 0}

| | 1 | 2 | 3 | 4 | 5 | 6 | 7 | 8 | 9 |
|---|---|---|---|---|---|---|---|---|---|
| dRU26 | 3.72, 3.89 | 3.58, 3.76 | 3.84, 3.74 | 3.71, 3.71 | 2.87, 3.04 Or 3.04, 2.87 | 3.91, 3.91 | 3.60, 3.90 | 3.91, 3.91 | 3.71, 3.50 |
| dRU52 | 4.55, 4.78 | | 4.78, 4.70 | | | 4.77. 4.79 | | 4.32, 4.62 | |
| dRU106 | 4.65, 4.68 | | | | | 4.65,4.67 | | | |

FIG. 64

6500 dRU LTF sequence option-9

$dRU\_LTF_{-122:122}$=

6600 dRU LTF sequence option-10

$dRU\_LTF_{-122:122}$=
{0 0 -1 -1 1 1 1 -1 1 -1 -1 -1 -1 1 -1 1 -1 1 1 -1 1 1 -1 1 -1
1 -1 1 -1 1 1 -1 -1 -1 1 1 -1 -1 -1 1 -1 -1 -1 1 1 1 -1 -1 -1 1
1 -1 -1 1 -1 1 -1 -1 1 1 1 1 1 1 -1 -1 -1 1 1 -1 1 1 -1 1 -1
-1 -1 -1 -1 -1 1 1 1 -1 -1 -1 -1 -1 -1 1 1 -1 1 1 -1 1 -1 -1 -1 1
1 -1 1 -1 1 -1 1 -1 1 1 -1 1 -1 1 -1 -1 -1 1 -1 -1 1 0 0 0 -1
1 1 1 1 1 -1 1 1 -1 -1 -1 -1 1 1 1 1 -1 -1 1 -1 1 -1 1 1 1
1 -1 -1 1 -1 1 1 -1 -1 1 -1 1 1 1 -1 1 1 1 -1 1 -1 -1 1 1 -1
-1 -1 -1 -1 1 -1 1 1 1 -1 -1 1 -1 1 -1 -1 -1 1 1 -1 -1 1 -1 -1 -1
-1 -1 -1 1 -1 -1 1 1 1 1 -1 -1 -1 -1 1 1 1 1 -1 1 -1 1 1 1 -1
-1 1 1 -1 1 1 1 -1 -1 1 -1 -1 1 -1 -1 1 -1 1 0 0}

FIG. 66

6700 dRU LTF sequence option-11

$dRU\_LTF_{-122:122}$=
{0 0 -1 -1 1 1 1 -1 1 -1 -1 -1 -1 1 -1 1 -1 1 1 1 1 1 -1 1 -1
1 -1 1 -1 1 1 -1 -1 -1 1 1 -1 1 -1 1 -1 -1 -1 1 1 1 -1 -1 -1 1
1 -1 -1 1 -1 -1 -1 -1 1 1 1 1 1 1 -1 -1 -1 1 1 -1 1 1 -1 -1 -1
-1 -1 -1 -1 -1 1 1 1 -1 -1 -1 -1 -1 -1 1 1 1 1 1 -1 1 -1 -1 -1 1
1 -1 1 -1 1 -1 1 -1 1 -1 -1 1 -1 1 -1 -1 -1 1 -1 -1 1 0 0 0 -1
1 1 -1 1 1 -1 1 1 -1 -1 -1 -1 1 1 1 1 -1 -1 1 -1 -1 -1 1 1 1
1 -1 -1 1 -1 1 1 -1 -1 1 -1 1 1 -1 -1 1 1 1 -1 1 -1 -1 1 1 -1
-1 -1 -1 -1 1 -1 -1 1 1 -1 -1 1 -1 1 -1 -1 -1 1 1 -1 -1 1 -1 -1 1
-1 -1 -1 1 -1 -1 1 1 1 1 -1 -1 -1 -1 1 1 1 -1 -1 1 -1 1 1 1 -1
-1 1 1 -1 1 1 1 -1 -1 1 1 -1 1 -1 -1 1 -1 1 0 0}

FIG. 67

6800 dRU LTF sequence option-12

$dRU\_LTF_{-122:122}$=
{0 0 -1 -1 1 1 1 -1 1 -1 -1 -1 -1 1 -1 1 -1 1 1 1 1 1 -1 1 -1
1 -1 1 -1 1 1 -1 -1 -1 1 1 -1 1 -1 1 -1 -1 -1 1 1 1 -1 -1 -1 1
1 -1 -1 1 -1 1 -1 -1 1 1 1 1 1 1 -1 -1 -1 1 1 -1 1 1 -1 -1 -1
-1 -1 -1 -1 -1 1 1 1 -1 -1 -1 -1 -1 -1 1 1 1 1 1 -1 1 -1 -1 -1 1
1 -1 1 -1 1 -1 1 -1 1 -1 -1 1 -1 1 -1 -1 -1 1 -1 -1 1 0 0 0 -1
1 1 -1 1 1 -1 1 1 -1 -1 -1 -1 1 1 1 1 -1 -1 1 -1 -1 -1 1 1 1
1 -1 -1 1 -1 1 1 -1 -1 1 -1 1 1 -1 -1 1 1 1 -1 1 -1 -1 1 1 -1
-1 -1 -1 -1 1 -1 1 1 1 -1 -1 1 -1 1 -1 -1 -1 1 1 -1 -1 1 -1 -1 1
-1 -1 -1 1 -1 -1 1 1 1 1 -1 -1 -1 -1 1 1 1 -1 -1 1 -1 1 1 1 -1
-1 1 1 -1 1 1 1 -1 -1 1 1 -1 1 -1 -1 1 -1 1 0 0}

FIG. 68

6900 dRU LTF sequence option-13

$dRU\_LTF_{-122:122}$=
{0 0 -1 -1 1 1 1 -1 1 -1 1 -1 -1 1 -1 1 -1 1 1 -1 1 1 -1 1 -1
1 -1 1 1 1 1 -1 -1 -1 1 1 -1 -1 -1 1 -1 -1 -1 1 1 1 1 -1 -1 1
1 -1 -1 1 -1 -1 -1 -1 1 1 1 1 1 1 1 -1 -1 1 1 -1 1 1 -1 1 -1
-1 -1 -1 -1 -1 1 1 -1 -1 -1 -1 -1 -1 -1 1 1 -1 1 1 -1 1 -1 -1 -1 1
-1 -1 1 -1 1 -1 1 -1 1 1 -1 1 -1 1 -1 -1 -1 1 1 -1 1 0 0 0 -1
1 1 1 1 1 -1 1 1 -1 -1 -1 1 1 1 1 1 -1 -1 1 -1 1 -1 1 1 1
1 -1 -1 1 1 1 1 -1 -1 1 -1 1 1 1 -1 1 1 1 -1 1 -1 -1 -1 1 -1
-1 -1 -1 -1 1 -1 -1 1 1 -1 -1 1 -1 1 -1 1 -1 1 1 -1 -1 1 -1 -1 -1
-1 -1 -1 1 -1 -1 1 1 -1 1 -1 -1 -1 -1 1 1 1 1 -1 1 -1 1 1 1 -1
-1 -1 1 -1 1 1 1 -1 -1 1 -1 -1 1 -1 -1 1 -1 1 0 0}

FIG. 69

7000 dRU LTF sequence option-14

$dRU\_LTF_{-122:122}=$

7100 dRU LTF sequence option-15

$dRU\_LTF_{-122:122}$=

7200 dRU LTF sequence option-16

$dRU\_LTF_{-122:122}=$

| | 1 | 2 | 3 | 4 | 5 | 6 | 7 | 8 | 9 |
|---|---|---|---|---|---|---|---|---|---|
| dRU26 | 3.72, 3.89 | 3.58, 3.76 | 3.84, 3.74 | 3.71, 3.71 | 2.68, 3.27 Or 3.27, 2.68 | 3.91, 3.91 | 3.60, 3.90 | 3.91, 3.91 | 3.71, 3.50 |
| dRU52 | 4.55, 4.78 | | 4.78, 4.70 | | | 4.77, 4.79 | | 4.32, 4.62 | |
| dRU106 | 4.65, 4.68 | | | | | 4.65,4.67 | | | |

FIG. 73

7400 dRU LTF sequence option-17

$dRU\_LTF_{-122:122}$=

7500 dRU LTF sequence option-18

$dRU\_LTF_{-122:122}$=

7600 dRU LTF sequence option-19

$dRU\_LTF_{-122:122}$=
{0 0 -1 -1 1 1 1 -1 1 -1 -1 -1 -1 1 -1 1 -1 1 1 1 1 1 -1 1 -1
1 -1 1 -1 1 1 -1 -1 -1 1 1 -1 1 -1 1 -1 -1 -1 1 1 1 1 -1 -1 1
1 -1 -1 1 -1 -1 -1 -1 1 1 1 1 1 1 1 -1 -1 1 1 -1 1 1 -1 -1 -1
-1 -1 -1 -1 -1 1 1 1 -1 -1 -1 -1 -1 -1 1 1 -1 1 1 -1 1 -1 -1 -1 1
-1 -1 1 -1 1 -1 1 -1 1 -1 -1 1 -1 1 -1 -1 -1 1 1 -1 1 0 0 0 -1
1 1 1 1 1 -1 1 1 -1 -1 -1 1 1 1 1 1 -1 -1 1 -1 -1 -1 1 1 1
1 -1 -1 1 -1 1 1 -1 -1 1 -1 1 1 -1 -1 1 1 1 -1 1 -1 -1 1 1 -1
-1 -1 -1 -1 1 -1 -1 1 1 -1 -1 1 -1 1 -1 -1 -1 1 1 -1 -1 1 -1 -1 1
-1 -1 -1 1 -1 -1 1 1 1 1 -1 -1 -1 -1 1 1 1 -1 -1 1 -1 1 1 1 -1
-1 1 1 -1 1 1 1 -1 -1 1 1 -1 1 -1 -1 1 -1 1 0 0}

FIG. 76

7700 dRU LTF sequence option-20

$dRU\_LTF_{-122:122}$=
{0 0 -1 -1 1 1 1 -1 1 -1 -1 -1 -1 1 -1 1 -1 1 1 1 1 1 -1 1 -1
1 -1 1 -1 1 1 -1 -1 -1 1 1 -1 1 -1 1 -1 -1 -1 1 1 1 1 -1 -1 1
1 -1 -1 1 -1 1 -1 -1 1 1 1 1 1 1 1 -1 -1 1 1 -1 1 1 -1 -1 -1
-1 -1 -1 -1 -1 1 1 1 -1 -1 -1 -1 -1 -1 1 1 -1 1 1 -1 1 -1 -1 -1 1
-1 -1 1 -1 1 -1 1 -1 1 -1 -1 1 -1 1 -1 -1 -1 1 1 -1 1 0 0 0 -1
1 1 1 1 1 -1 1 1 -1 -1 -1 1 1 1 1 1 -1 -1 1 -1 -1 -1 1 1 1
1 -1 -1 1 -1 1 1 -1 -1 1 -1 1 1 -1 -1 1 1 1 -1 1 -1 -1 1 1 -1
-1 -1 -1 -1 1 -1 1 1 1 -1 -1 1 -1 1 -1 -1 -1 1 1 -1 -1 1 -1 -1 1
-1 -1 -1 1 -1 -1 1 1 1 1 -1 -1 -1 -1 1 1 1 -1 -1 1 -1 1 1 1 -1
-1 1 1 -1 1 1 1 -1 -1 1 1 -1 1 -1 -1 1 -1 1 0 0}

FIG. 77

7800 dRU LTF sequence option-21

$dRU\_LTF_{-122:122}$=
{0 0 -1 -1 1 1 1 -1 1 -1 1 -1 -1 1 -1 1 -1 1 1 -1 1 1 -1 1 -1
1 -1 1 1 1 1 -1 -1 -1 1 1 -1 -1 -1 1 -1 -1 -1 1 1 1 -1 -1 -1 1
1 -1 -1 1 -1 -1 -1 -1 1 1 1 1 1 1 -1 -1 -1 1 1 -1 1 1 -1 1 -1
-1 -1 -1 -1 -1 1 1 -1 -1 -1 -1 -1 -1 -1 1 1 1 1 1 -1 1 -1 -1 -1 1
1 -1 1 -1 1 -1 1 -1 1 1 -1 1 -1 1 -1 -1 -1 1 -1 -1 1 0 0 0 -1
1 1 -1 1 1 -1 1 1 -1 -1 -1 -1 1 1 1 1 -1 -1 1 -1 1 -1 1 1 1
1 -1 -1 1 1 1 1 -1 -1 1 -1 1 1 1 -1 1 1 1 -1 1 -1 -1 -1 1 -1
-1 -1 -1 -1 1 -1 -1 1 1 -1 -1 1 -1 1 -1 1 -1 1 1 -1 -1 1 -1 -1 -1
-1 -1 -1 1 -1 -1 1 1 -1 1 -1 -1 -1 -1 1 1 1 1 -1 1 -1 1 1 1 -1
-1 -1 1 -1 1 1 1 -1 -1 1 -1 -1 1 -1 -1 1 -1 1 0 0}

FIG. 78

7900 dRU LTF sequence option-22

$dRU\_LTF_{-122:122}$=

8000 dRU LTF sequence option-23

$dRU\_LTF_{-122:122}$=
{0 0 -1 -1 1 1 1 -1 1 -1 1 -1 -1 1 -1 1 -1 1 1 1 1 1 -1 1 -1
1 -1 1 1 1 1 -1 -1 -1 1 1 -1 1 -1 1 -1 -1 -1 1 1 1 -1 -1 -1 1
1 -1 -1 1 -1 -1 -1 -1 1 1 1 1 1 1 -1 -1 -1 1 1 -1 1 1 -1 -1 -1
-1 -1 -1 -1 -1 1 1 -1 -1 -1 -1 -1 -1 -1 1 1 -1 1 1 -1 1 -1 -1 -1 1
1 -1 1 -1 1 -1 1 -1 1 -1 -1 1 -1 1 -1 -1 -1 1 -1 -1 1 0 0 0 -1
1 1 1 1 1 -1 1 1 -1 -1 -1 -1 1 1 1 1 -1 -1 1 -1 -1 -1 1 1 1
1 -1 -1 1 1 1 1 -1 -1 1 -1 1 1 -1 -1 1 1 1 -1 1 -1 -1 -1 1 -1
-1 -1 -1 -1 1 -1 -1 1 1 -1 -1 1 -1 1 -1 1 -1 1 1 -1 -1 1 -1 -1 1
-1 -1 -1 1 -1 -1 1 1 -1 1 -1 -1 -1 -1 1 1 1 -1 -1 1 -1 1 1 1 -1
-1 -1 1 -1 1 1 1 -1 -1 1 1 -1 1 -1 -1 1 -1 1 0 0}

FIG. 80

8100 dRU LTF sequence option-24

$dRU\_LTF_{-122:122}$=
{0 0 -1 -1 1 1 1 -1 1 -1 1 -1 -1 1 -1 1 -1 1 1 1 1 1 -1 1 -1
1 -1 1 1 1 1 -1 -1 -1 1 1 -1 1 -1 1 -1 -1 -1 1 1 1 -1 -1 -1 1
1 -1 -1 1 -1 1 -1 -1 1 1 1 1 1 1 -1 -1 -1 1 1 -1 1 1 -1 -1 -1
-1 -1 -1 -1 -1 1 1 -1 -1 -1 -1 -1 -1 -1 1 1 -1 1 1 -1 1 -1 -1 -1 1
1 -1 1 -1 1 -1 1 -1 1 -1 -1 1 -1 1 -1 -1 -1 1 -1 -1 1 0 0 0 -1
1 1 1 1 1 -1 1 1 -1 -1 -1 -1 1 1 1 1 -1 -1 1 -1 -1 -1 1 1 1
1 -1 -1 1 1 1 1 -1 -1 1 -1 1 1 -1 -1 1 1 1 -1 1 -1 -1 -1 1 -1
-1 -1 -1 -1 1 -1 1 1 1 -1 -1 1 -1 1 -1 1 -1 1 1 -1 -1 1 -1 -1 1
-1 -1 -1 1 -1 -1 1 1 -1 1 -1 -1 -1 -1 1 1 1 -1 -1 1 -1 1 1 1 -1
-1 -1 1 -1 1 1 1 -1 -1 1 1 -1 1 -1 -1 1 -1 1 0 0}

FIG. 81

EHT-LTF SEQUENCE DESIGN FOR DISTRIBUTED-TONE RESOURCE UNITS WITH PAPR REDUCTION

CROSS REFERENCE TO RELATED PATENT APPLICATION

The present disclosure is part of a non-provisional patent application claiming the priority benefit of U.S. Provisional Patent Application Nos. 63/150,152, 63/200,497, 63/246,827, 63/256,651 and 63/274,038, filed 17 Feb. 2021, 11 Mar. 2021, 22 Sep. 2021, 18 Oct. 2021, and 1 Nov. 2021, respectively, the contents of which being incorporated by reference in their entirety.

TECHNICAL FIELD

The present disclosure is generally related to wireless communications and, more particularly, to extremely-high-throughput long training field (EHT-LTF) sequence design for distributed-tone resource units (dRUs) with peak-to-average power ratio (PAPR) reduction.

BACKGROUND

Unless otherwise indicated herein, approaches described in this section are not prior art to the claims listed below and are not admitted as prior art by inclusion in this section.

There are strict power spectral density (PSD) requirements for low-power indoor (LPI) applications in 6 GHz which tend to result in lower power in transmission and short coverage range. One approach to improving coverage range is to distribute small resource unit (RU) tones ("regular RU" or "logical RU") over a wider bandwidth or a large frequency subblock, thereby resulting in interleaved, interlaced or distributed-tone RUs (dRU) to achieve higher transmission power. Unlike regular RUs in which subcarriers are basically continuous or adjacent to one another, the subcarriers in dRUs are spread over a wider bandwidth and hence the tones are separated apart with different distances therebetween. Due to tone separations or non-continuity, directly reusing EHT-LTF sequence of regular RU for dRU transmission will result in high PAPR. Therefore, there is a need for a solution for EHT-LTF sequence design for dRUs with PAPR reduction in 6 GHz LPI systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT-LTF sequence design for dRUs with PAPR reduction in 6 GHz LPI systems. It is believed that implementations of the proposed schemes may address or otherwise alleviate aforementioned issues.

In one aspect, a method may involve distributing subcarriers of a RU with a resolution of four times (4×) subcarrier spacing to generate a 4×EHT-LTF of an uplink (UL) trigger-based (TB) physical-layer protocol data unit (PPDU) with a dRU. The method may also involve transmitting the 4×EHT-LTF for the UL TB PPDU with the dRU.

In another aspect, an apparatus may include a transceiver and a processor coupled to the transceiver. The transceiver may be configured to transmit and receive wirelessly. The processor may be configured to distribute subcarriers of a RU with a resolution of 4× subcarrier spacing to generate a 4×EHT-LTF of an UL TB PPDU with a dRU. The processor may be also configured to transmit, via the transceiver, the 4×EHT-LTF for the UL TB PPDU with the dRU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design in accordance with an implementation of the present disclosure.

FIG. 3 is a diagram of an example design in accordance with an implementation of the present disclosure.

FIG. 4 is a diagram of an example scenario in accordance with an implementation of the present disclosure.

FIG. 5 is a diagram of an example design in accordance with an implementation of the present disclosure.

FIG. 6 is a diagram of an example design in accordance with an implementation of the present disclosure.

FIG. 13 is a diagram of an example design in accordance with an implementation of the present disclosure.

FIG. 14 is a diagram of an example design in accordance with an implementation of the present disclosure.

FIG. 15 is a diagram of an example design in accordance with an implementation of the present disclosure.

FIG. 16 is a diagram of an example design in accordance with an implementation of the present disclosure.

FIG. 17 is a diagram of an example design in accordance with an implementation of the present disclosure.

FIG. 18 is a diagram of an example design in accordance with an implementation of the present disclosure.

FIG. 19 is a diagram of an example design in accordance with an implementation of the present disclosure.

FIG. 20 is a diagram of an example design in accordance with an implementation of the present disclosure.

FIG. 21 is a diagram of an example design in accordance with an implementation of the present disclosure.

FIG. 22 is a diagram of an example design in accordance with an implementation of the present disclosure.

FIG. 23 is a diagram of an example design in accordance with an implementation of the present disclosure.

FIG. 24 is a diagram of an example design in accordance with an implementation of the present disclosure.

FIG. 25 is a diagram of an example design in accordance with an implementation of the present disclosure.

FIG. 26 is a diagram of an example design in accordance with an implementation of the present disclosure.

FIG. 27 is a diagram of an example design in accordance with an implementation of the present disclosure.

FIG. 28 is a diagram of an example design in accordance with an implementation of the present disclosure.

FIG. 29 is a diagram of an example design in accordance with an implementation of the present disclosure.

FIG. 30 is a diagram of an example design in accordance with an implementation of the present disclosure.

FIG. 31 is a diagram of an example design in accordance with an implementation of the present disclosure.

FIG. 32 is a diagram of an example design in accordance with an implementation of the present disclosure.

FIG. 33 is a diagram of an example design in accordance with an implementation of the present disclosure.

FIG. 34 is a diagram of an example design in accordance with an implementation of the present disclosure.

FIG. 35 is a diagram of an example design in accordance with an implementation of the present disclosure.

FIG. 36 is a diagram of an example design in accordance with an implementation of the present disclosure.

FIG. 37 is a diagram of an example design in accordance with an implementation of the present disclosure.

FIG. 38 is a diagram of an example design in accordance with an implementation of the present disclosure.

FIG. 39 is a diagram of an example design in accordance with an implementation of the present disclosure.

FIG. 40 is a diagram of an example design in accordance with an implementation of the present disclosure.

FIG. 41 is a diagram of an example design in accordance with an implementation of the present disclosure.

FIG. 42 is a diagram of an example design in accordance with an implementation of the present disclosure.

FIG. 43 is a diagram of an example design in accordance with an implementation of the present disclosure.

FIG. 44 is a diagram of an example design in accordance with an implementation of the present disclosure.

FIG. 45 is a diagram of an example design in accordance with an implementation of the present disclosure.

FIG. 47 is a diagram of an example design in accordance with an implementation of the present disclosure.

FIG. 48 is a diagram of an example design in accordance with an implementation of the present disclosure.

FIG. 49 is a diagram of an example design in accordance with an implementation of the present disclosure.

FIG. 50 is a diagram of an example design in accordance with an implementation of the present disclosure.

FIG. 51 is a diagram of an example design in accordance with an implementation of the present disclosure.

FIG. 52 is a diagram of an example design in accordance with an implementation of the present disclosure.

FIG. 54A~FIG. 54D each is a diagram of a respective aspect of an example design in accordance with an implementation of the present disclosure.

FIG. 55 is a diagram of an example scenario in accordance with an implementation of the present disclosure.

FIG. 56 is a diagram of an example design in accordance with an implementation of the present disclosure.

FIG. 57 is a diagram of an example design in accordance with an implementation of the present disclosure.

FIG. 58 is a diagram of an example design in accordance with an implementation of the present disclosure.

FIG. 59 is a diagram of an example design in accordance with an implementation of the present disclosure.

FIG. 60 is a diagram of an example design in accordance with an implementation of the present disclosure.

FIG. 61 is a diagram of an example design in accordance with an implementation of the present disclosure.

FIG. 62 is a diagram of an example design in accordance with an implementation of the present disclosure.

FIG. 63 is a diagram of an example design in accordance with an implementation of the present disclosure.

FIG. 64 is a diagram of an example scenario in accordance with an implementation of the present disclosure.

FIG. 65 is a diagram of an example design in accordance with an implementation of the present disclosure.

FIG. 66 is a diagram of an example design in accordance with an implementation of the present disclosure.

FIG. 67 is a diagram of an example design in accordance with an implementation of the present disclosure.

FIG. 68 is a diagram of an example design in accordance with an implementation of the present disclosure.

FIG. 69 is a diagram of an example design in accordance with an implementation of the present disclosure.

FIG. 70 is a diagram of an example design in accordance with an implementation of the present disclosure.

FIG. 71 is a diagram of an example design in accordance with an implementation of the present disclosure.

FIG. 72 is a diagram of an example design in accordance with an implementation of the present disclosure.

FIG. 73 is a diagram of an example scenario in accordance with an implementation of the present disclosure.

FIG. 74 is a diagram of an example design in accordance with an implementation of the present disclosure.

FIG. 75 is a diagram of an example design in accordance with an implementation of the present disclosure.

FIG. 76 is a diagram of an example design in accordance with an implementation of the present disclosure.

FIG. 77 is a diagram of an example design in accordance with an implementation of the present disclosure.

FIG. 78 is a diagram of an example design in accordance with an implementation of the present disclosure.

FIG. 79 is a diagram of an example design in accordance with an implementation of the present disclosure.

FIG. 80 is a diagram of an example design in accordance with an implementation of the present disclosure.

FIG. 81 is a diagram of an example design in accordance with an implementation of the present disclosure.

DETAILED DESCRIPTION OF PREFERRED EMBODIMENTS

Figure 1:
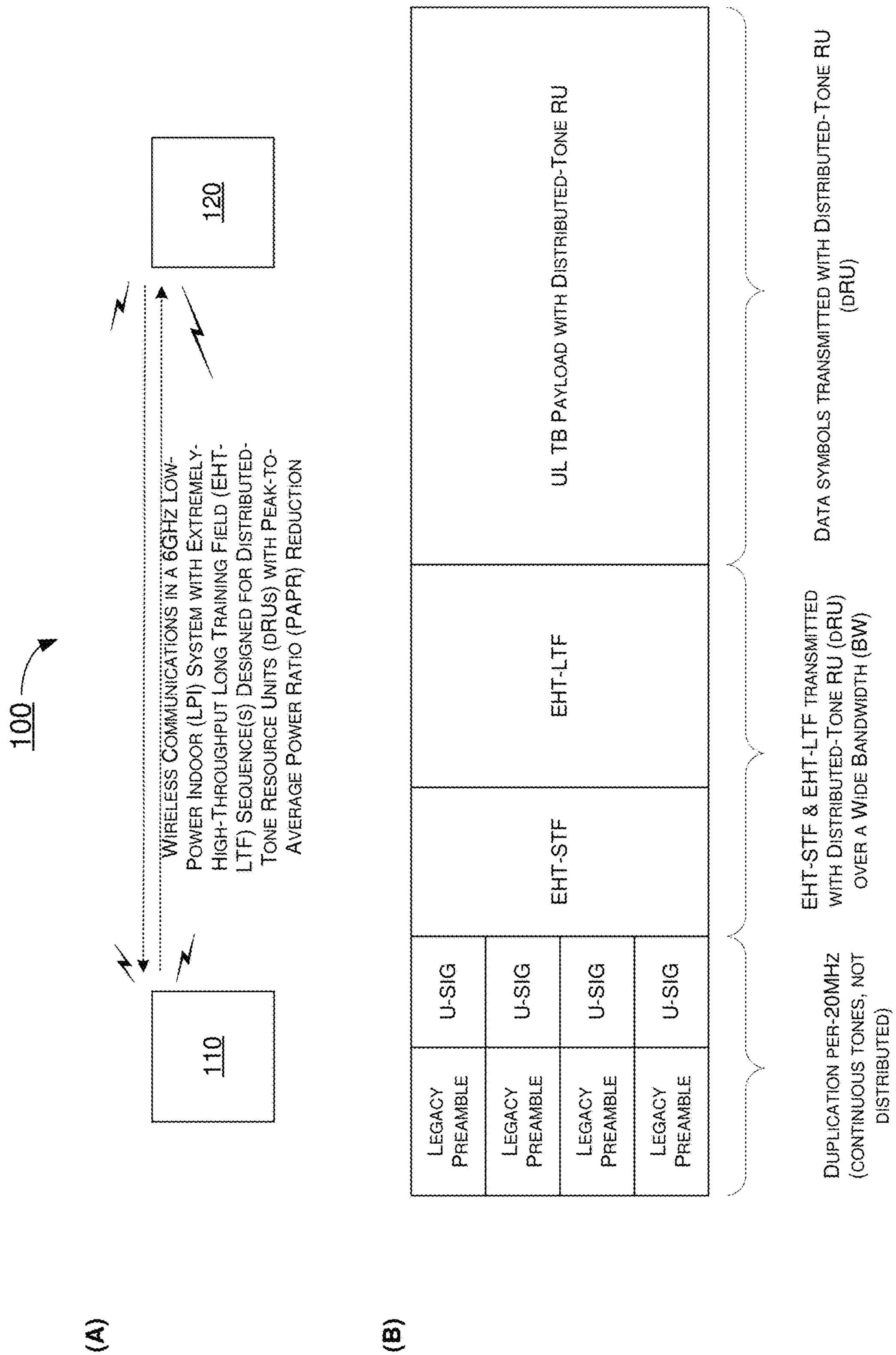
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT-LTF sequence design for dRUs with PAPR reduction in 6 GHz LPI systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320. It is further noteworthy that, in the present disclosure, a 26-tone interleaved-tone (or interlaced-tone) RU may be interchangeably denoted as iRU26 as well as dRU26 (26-tone distributed-tone RU), a 52-tone interleaved-tone (or interlaced-tone) RU may be interchangeably denoted as iRU52 as well as dRU52 (52-tone distributed-tone RU), a 106-tone interleaved-tone (or interlaced-tone) RU may be interchangeably denoted as iRU106 as well as dRU106 (106-tone distributed-tone RU), a 242-tone interleaved-tone (or interlaced-tone) RU may be interchangeably denoted as iRU242 as well as dRU242 (242-tone distributed-tone RU), and a 484-tone interleaved-tone (or interlaced-tone) RU may be interchangeably denoted as iRU484 as well as dRU484 (484-tone distributed-tone RU).

Figure 83:
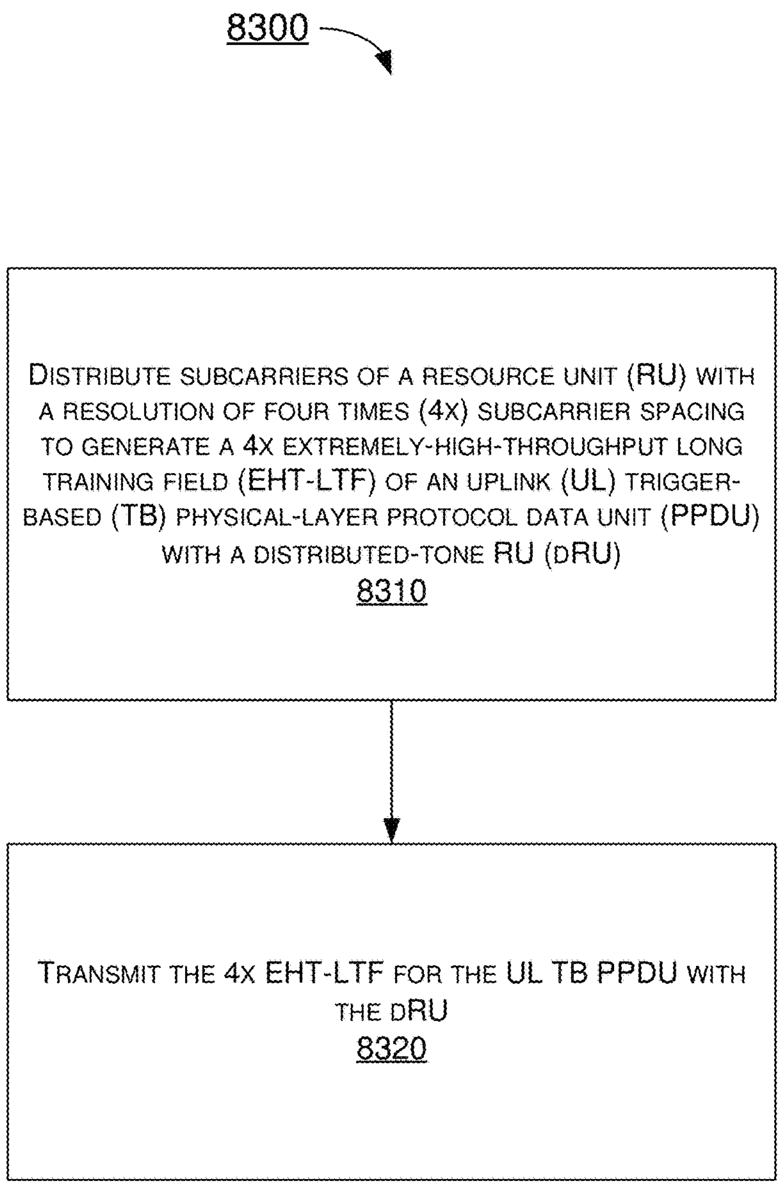
FIG. 83 is a flowchart of an example process in accordance with an implementation of the present disclosure.

FIG. 1 illustrates an example network environment 100 in which various solutions and schemes in accordance with the present disclosure may be implemented. FIG. 2~FIG. 83 illustrate examples of implementation of various proposed schemes in network environment 100 in accordance with the present disclosure. The following description of various proposed schemes is provided with reference to FIG. 1~FIG. 83.

Referring to part (A) of FIG. 1, network environment 100 may involve a communication entity 110 and a communication entity 120 communicating wirelessly (e.g., in a WLAN in accordance with one or more Institute of Electrical and Electronics Engineers (IEEE) 802.11 standards). For instance, communication entity 110 may be a first station (STA) and communication entity 120 may be a second STA, with each of the first STA and second STA functioning as either an access point (AP) STA or a non-AP STA. Under various proposed schemes in accordance with the present disclosure, communication entity 110 and communication entity 120 may be configured to communicate wirelessly with EHT-LTF sequence design for dRUs with PAPR reduction in 6 GHz LPI systems, as described herein.

Referring to part (B) of FIG. 1, an uplink (UL) trigger-based (TB) physical-layer protocol data unit (PPDU) transmitted by UE 110 with dRU for BW80 in a 6 GHz LPI system under various proposed schemes in accordance with the present disclosure may include legacy preamble(s), universal signal (U-SIG) field(s), an EHT short training field (EHT-STF), an EHT-LTF, and a payload (e.g., data). The legacy preamble(s) and U-SIG field(s) may be transmitted per 20 MHz (e.g., continuous/adjacent tones that are not distributed or otherwise interleaved) and may be duplicated for each 20 MHz segment or frequency subblock. On the other hand, each of the EHT-STF, EHT-LTF and payload may be transmitted with dRUs. More specifically, under various proposed schemes described below, the EHT-STF may be transmitted with a dRU over an entirety of a wide bandwidth (e.g., 80 MHz, 160 MHz or 320 MHz).

In IEEE 802.11ax/be, three guard interval (GI) modes, such as high-efficiency long training field (HE-LTF)+GI and EHT-LTF+GI, are supported for UL TB PPDU transmissions, including: 1×LTF+1.6 μs GI, 2×LTF+1.6 μs GI, and 4×LTF+3.2 μs GI. For UL TB PPDU transmission with distributed-tone (or interleaved-tone or interlaced-tone) RU(s), the resolution of subcarrier spacing (SCS) typically requires four times (4×), e.g., $F_{SCS}$=78.125 kHz. Therefore, under a proposed scheme in accordance with the present disclosure, only 4×EHT-LTF may be used for UL TB PPDU with dRU(s). The EHT-LTF transmission may be based on the same tone index of distributed tone or dRU as for a data symbol. Thus, there may be two options for the EHT-LTF+GI combinations. A first option (Option 1), as a one-step method, may involve 4×EHT-LTF+3.2 μs GI only. In the first option, an EHT-LTF sequence may be selected based on dRU subcarrier indices for EHT-LTF transmission for dRU. A second option (Option 2), as a two-step method, may also involve 4×EHT-LTF+3.2 μs GI only. In the second option, for EHT-LTF transmission for dRU, an EHT-LTF sequence may be selected based on a rRU and then an EHT-LTF sequence may be assigned based on dRU subcarrier indices.

An illustrative example of the one-step method under the first option is shown in FIG. 2~FIG. 5. FIG. 2 illustrates an example design 200 of a 4×EHT-LTF sequence for BW20. FIG. 3 illustrates an example design 300 of subcarrier indices for dRUs in BW20. FIG. 4 illustrates an example scenario 400 of EHT-LTF sequence selection with a one-step method resulting from using dRU subcarrier indices in FIG. 3 to pick an EHT-LTF sequence in FIG. 2. In FIG. 4, the circled tones constitute a portion of the selected/mapped EHT-LTF sequence for transmission of a 26-tone dRU in BW20. FIG. 5 illustrates an example design 500 for EHT-LTF transmission for UL TB PPDU with dRU. In design 500, Kr denotes a set of subcarrier indices for the tones in the dRU being transmitted.

Figure 7:
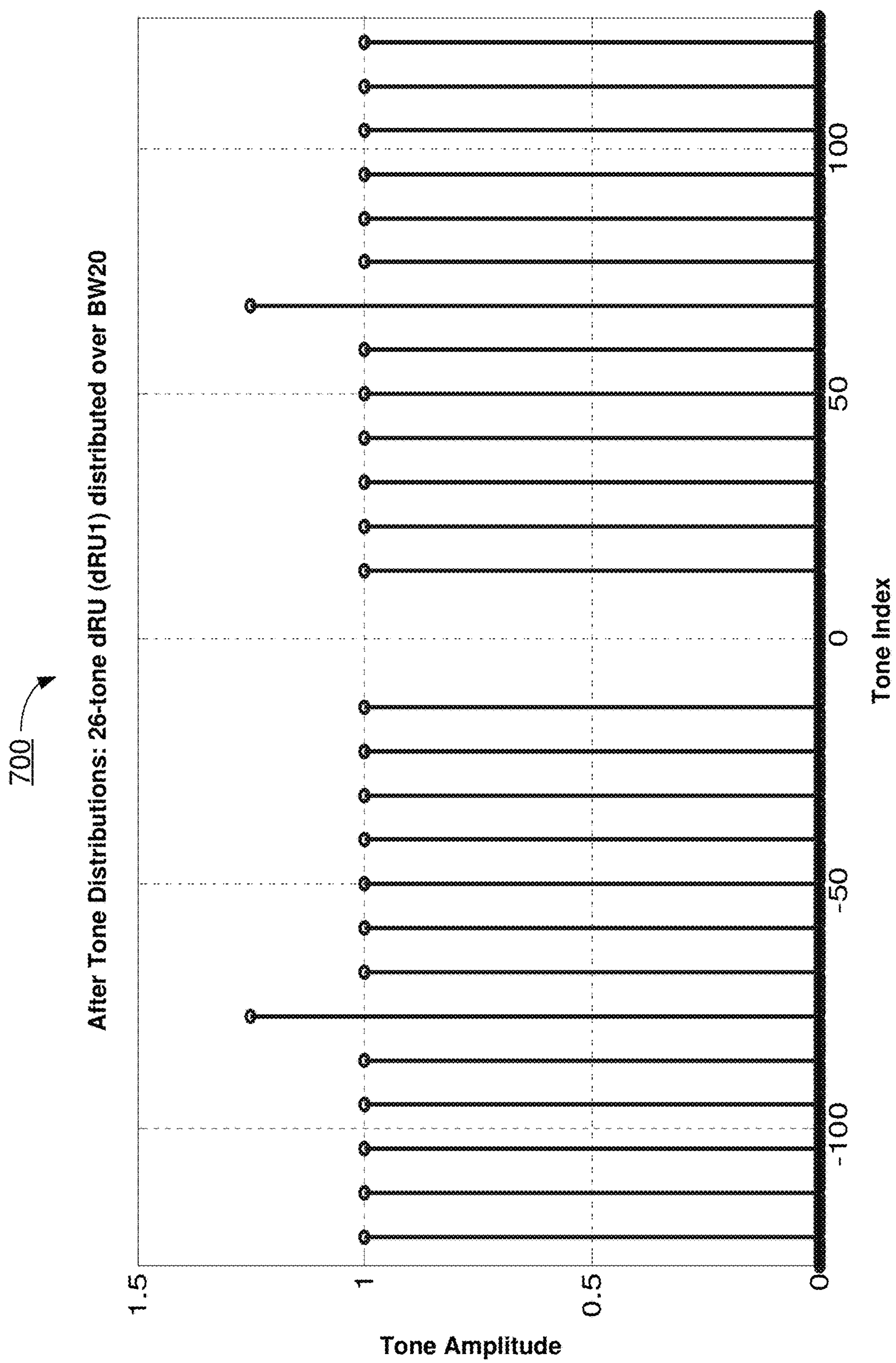
FIG. 7 is a diagram of an example scenario in accordance with an implementation of the present disclosure.

An illustrative example of the two-step method under the second option is shown in FIG. 2, FIG. 3, FIG. 6 and FIG. 7. FIG. 6 illustrates an example design 600 of subcarrier indices for rRUs in BW20. FIG. 7 illustrates an example scenario 700 of tone distribution over BW20. In the second option, a portion of a 4×EHT-LTF sequence in FIG. 2 corresponding to a rRU (e.g., 26-tone rRU1) may be selected. Then, in FIG. 7, an EHT-LTF sequence (out of the selected portion of the 4×EHT-LTF sequence from FIG. 2) may be assigned onto the tone locations based on dRU subcarrier indices for a dRU (e.g., 26-tone dRU1) from FIG. 6.

Under a proposed scheme in accordance with the present disclosure, to reduce the PAPR for EHT-LTF transmissions with dRU(s), several operations may be performed. For instance, an EHT-LTF sequence for a dRU may be defined per dRU size and per BW. That is, a given/defined EHT-LTF sequence may be utilized for a corresponding dRU size (e.g., 26-tone, 52-tone, 106-tone, 242-tone or 484-tone dRU) for a given bandwidth (e.g., BW20, BW40 or BW80). Additionally, dRU EHT-LTF sequence may be defined for one spatial stream (1ss) and two spatial streams (2ss) separately. Alternatively, the unified or jointly optimized dRU EHT-LTF sequence for 1ss and 2ss or up to 4ss may be used. Moreover, EHT-LTF transmission may be defined for an aggregate of distributed-tone multi-RU (dMRU).

Under a proposed scheme in accordance with the present disclosure, to minimize the distributed-tone EHT-LTF PAPR, a new EHT-LTF sequence may be defined per BW and per dRU size. For instance, $\text{EHT-LTF}_{dRU26,BW20}$ may be defined for all 26-tone dRU distributed over BW20 (or 20 MHz frequency subblock or segment), $\text{EHT-LTF}_{dRU52,BW20}$ may be defined for all 52-tone dRU distributed over BW20 (or 20 MHz frequency subblock or segment), and $\text{EHT-LTF}_{dRU106,BW20}$ may be defined for all 106-tone dRU distributed over BW20 (or 20 MHz frequency subblock or segment). Similarly, $\text{EHT-LTF}_{dRU26,BW40}$ may be defined for all 26-tone dRU distributed over BW40 (or 40 MHz frequency subblock or segment), $\text{EHT-LTF}_{dRU52,BW40}$ may be defined for all 52-tone dRU distributed over BW40 (or 40 MHz frequency subblock or segment), $\text{EHT-LTF}_{dRU106,BW40}$ may be defined for all 106-tone dRU distributed over BW40 (or 40 MHz frequency subblock or segment), and $\text{EHT-LTF}_{dRU242,BW40}$ may be defined for all 242-tone dRU distributed over BW40 (or 40 MHz frequency subblock or segment). Likewise, $\text{EHT-LTF}_{dRU26,BW80}$ may be defined for all 26-tone dRU distributed over BW80 (or 80 MHz frequency subblock or segment), $\text{EHT-LTF}_{dRU52,BW80}$ may be defined for all 52-tone dRU distributed over BW80 (or 80 MHz frequency subblock or segment), $\text{EHT-LTF}_{dRU106,BW80}$ may be defined for all 106-tone dRU distributed over BW80 (or 80 MHz frequency subblock or segment), and $\text{EHT-LTF}_{dRU242,BW80}$ may be defined for all 242-tone dRU distributed over BW80 (or 80 MHz frequency subblock or segment), and $\text{EHT-LTF}_{dRU484,BW80}$ may be defined for all 484-tone dRU distributed over BW80 (or 80 MHz frequency subblock or segment). The new EHT-LTF sequence (per-BW and per-dRU size) may be optimized or defined separately for number of spatial streams (Nss)=1 or Nss=2 or up to 4ss. Alternatively, the new EHT-LTF sequence (per-BW and per-dRU size) may be optimized or defined jointly for Nss=1 and Nss=2 or Nss=1 to 4.

Figure 8:
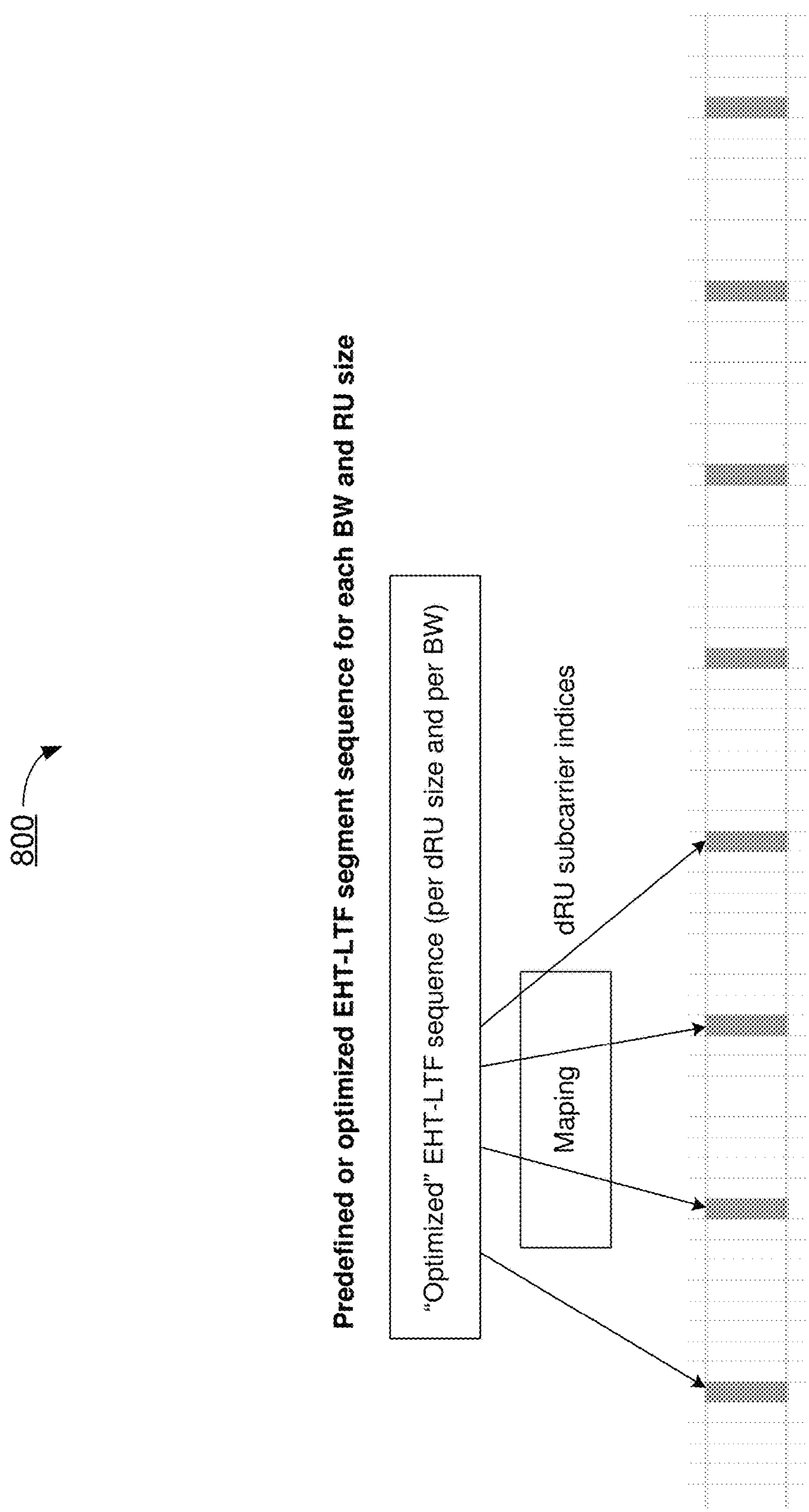
FIG. 8 is a diagram of an example scenario in accordance with an implementation of the present disclosure.

FIG. 8 illustrates an example scenario 800 under a proposed scheme in accordance with the present disclosure. Under the proposed scheme, tone distribution of EHT-LTF symbols and data symbols may use the same dRU subcarrier indices. Referring to FIG. 8, given the new predefined or otherwise optimized EHT-LTF sequence (according to the dRU size and distribution BW (or distribution window size)), the EHT-LTF sequence may be distributed or mapped over the distribution BW based on dRU subcarrier indices.

Figure 9:
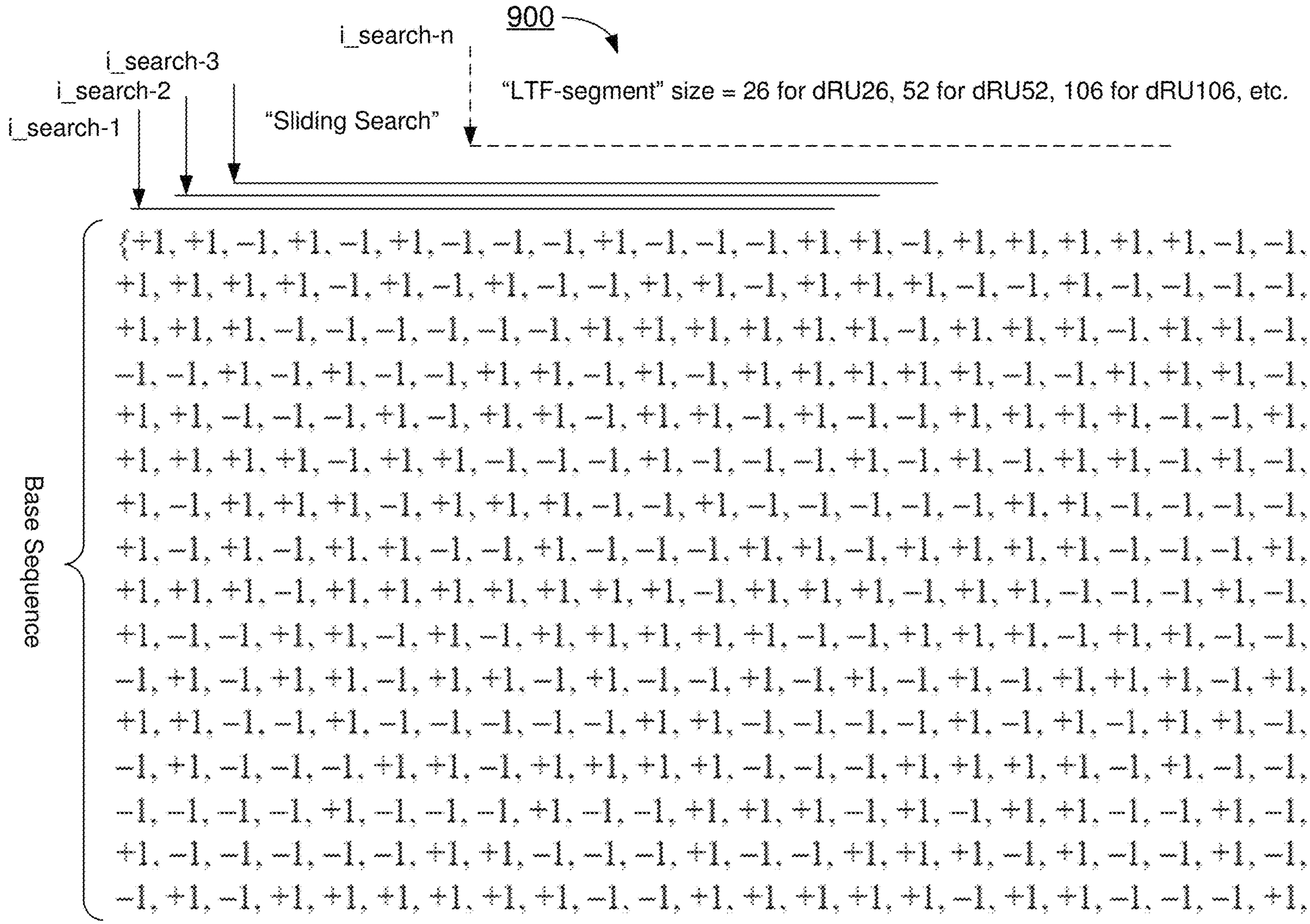
FIG. 9 is a diagram of an example scenario in accordance with an implementation of the present disclosure.

FIG. 9 illustrates an example scenario 900 under a proposed scheme in accordance with the present disclosure. Scenario 900 is an example of optimization for dRU EHT-LTF sequence. Referring to FIG. 9, the new/optimized EHT-LTF sequence may be generated to minimize the "worst" dRU PAPR by performing a "sliding search" over certain "base sequences" which may be any existing HE-LTF and/or EHT-LTF for BW20, BW40, BW80 and/or BW160, and so on. The base sequences may also be any random sequence(s) with value=−1 or +1. In scenario 900, the size of a given LTF segment may be 26 tones for dRU26, 52 tones for dRU52, 106 tones for dRU106, and so on.

Figure 10:
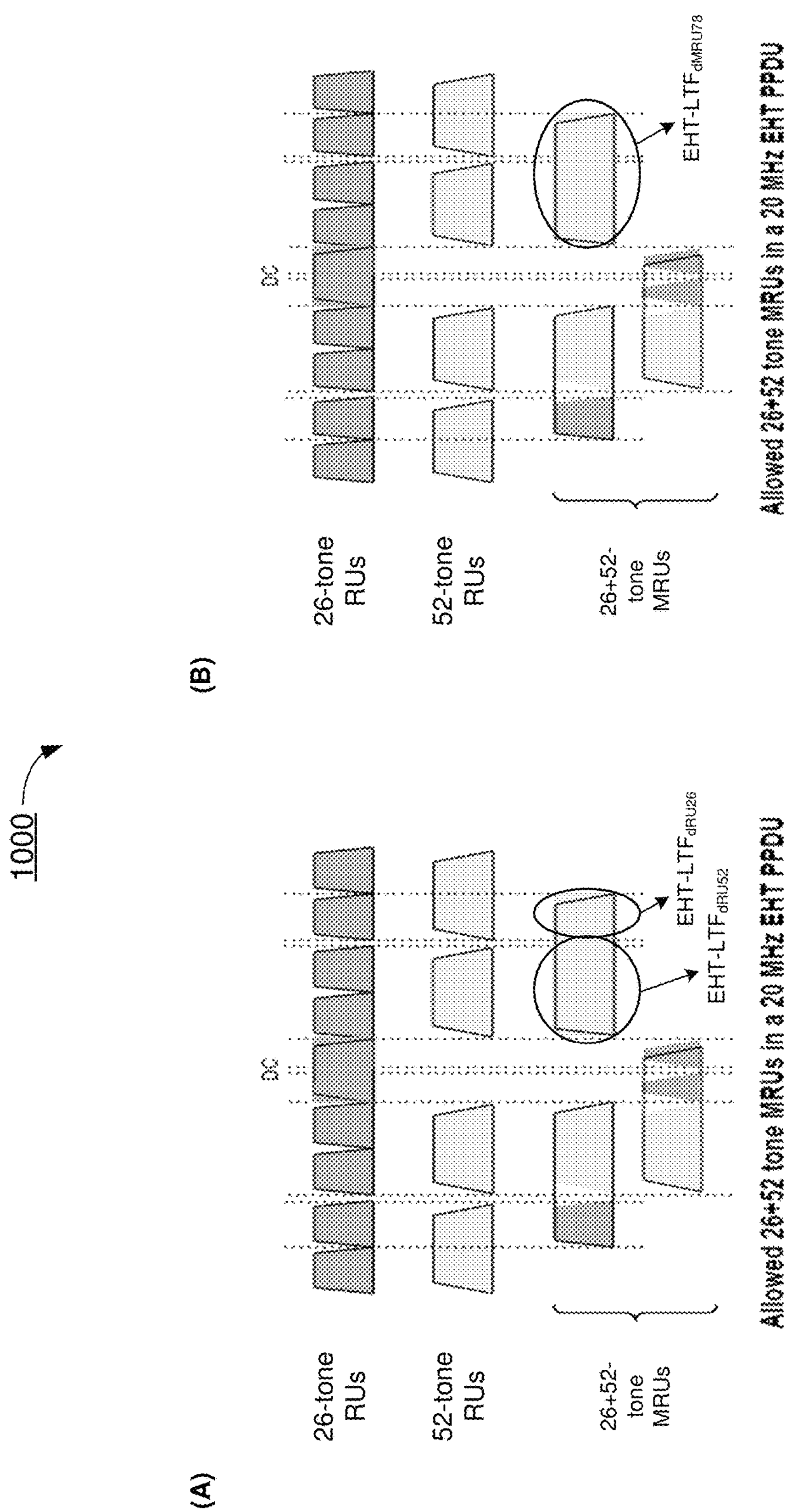
FIG. 10 is a diagram of an example scenario in accordance with an implementation of the present disclosure.

FIG. 10 illustrates an example scenario 1000 under a proposed scheme in accordance with the present disclosure. Scenario 1000 shows an example of EHT-LTF transmission for dMRU(26+52). Referring to part (A) of FIG. 10, under a first method, an "optimized" $\text{EHT-LTF}_{dRU26}$ and $\text{EHT-LTF}_{dRU52}$ may be used for dMRU78 EHT-LTF transmission. Referring to part (B) of FIG. 10, under a second method, an "optimized" $\text{EHT-LTF}_{dRU78}$ may be used for dMRU78 EHT-LTF transmission.

Figure 11:
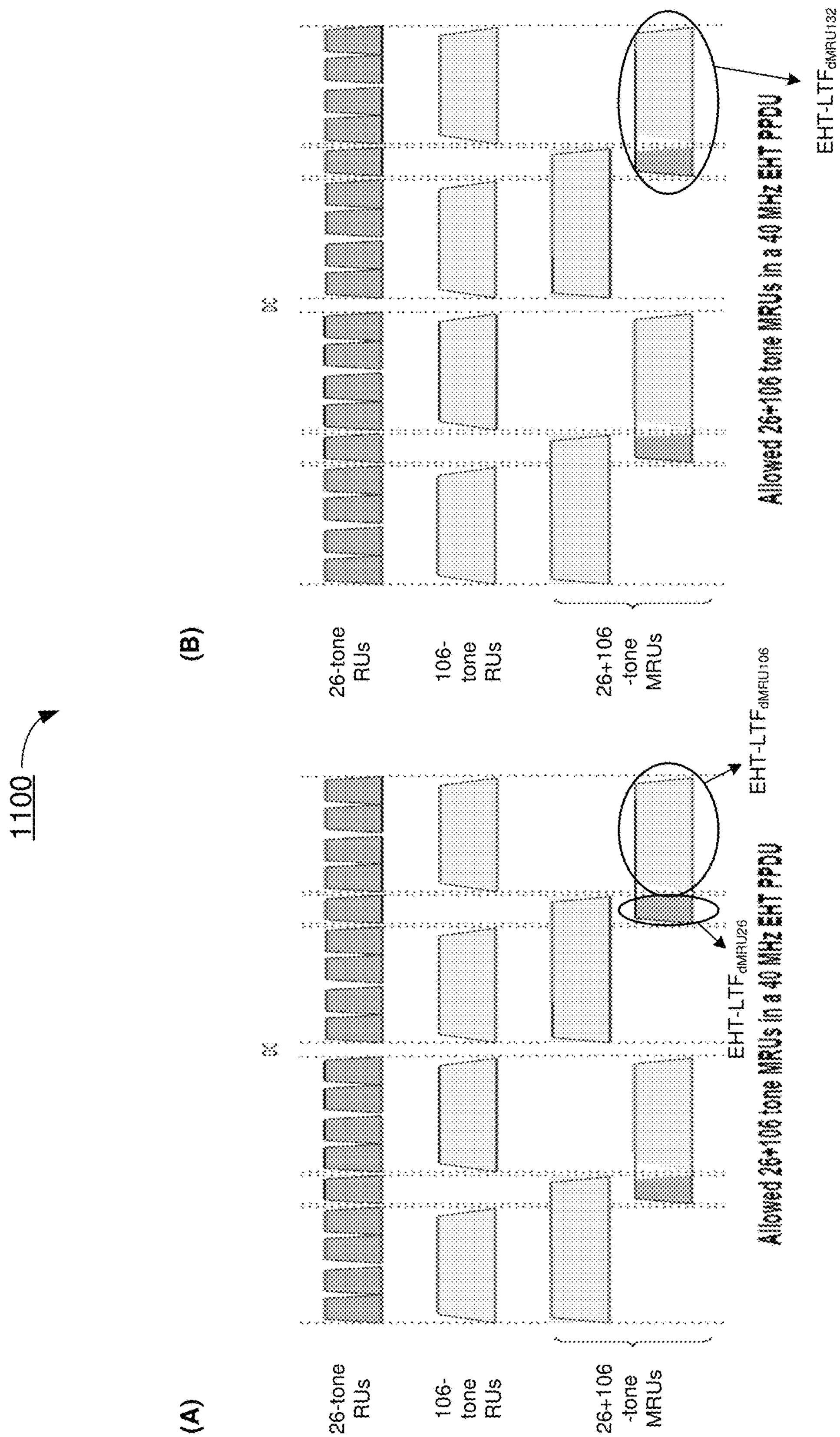
FIG. 11 is a diagram of an example scenario in accordance with an implementation of the present disclosure.

FIG. 11 illustrates an example scenario 1100 under a proposed scheme in accordance with the present disclosure. Scenario 1100 shows an example of EHT-LTF transmission for dMRU(26+106). Referring to part (A) of FIG. 11, under a first method, an "optimized" $\text{EHT-LTF}_{dRU26}$ and $\text{EHT-LTF}_{dRU106}$ may be used for dMRU132 EHT-LTF transmission. Referring to part (B) of FIG. 11, under a second method, an "optimized" $\text{EHT-LTF}_{dRU132}$ may be used for dMRU132 EHT-LTF transmission.

Under a proposed scheme in accordance with the present disclosure, to minimize the distributed-tone EHT-LTF PAPR, a new EHT-LTF sequence may be defined per BW and per dRU size. For instance, $\text{EHT-LTF}_{dRU78,BW20}$ may be defined for all 78-tone dRU distributed over BW20 (or 20 MHz frequency subblock or segment), and $\text{EHT-LTF}_{dRU132,BW20}$ may be defined for all 132-tone dRU distributed over BW20 (or 20 MHz frequency subblock or segment). Similarly, EHT-LTF$_{dRU78,BW40}$ may be defined for all 78-tone dRU distributed over BW40 (or 40 MHz frequency subblock or segment), and EHT-LTF$_{dRU132,BW40}$ may be defined for all 132-tone dRU distributed over BW40 (or 40 MHz frequency subblock or segment). Likewise, EHT-LTF$_{dRU78,BW80}$ may be defined for all 78-tone dRU distributed over BW80 (or 80 MHz frequency subblock or segment), and EHT-LTF$_{dRU132,BW80}$ may be defined for all 132-tone dRU distributed over BW80 (or 80 MHz frequency subblock or segment). The new EHT-LTF sequence (per-BW and per-dRU size) may be optimized or defined separately for number of spatial streams (Nss)=1 or Nss=2 or Nss up to 4. Alternatively, the new EHT-LTF sequence (per-BW and per-dRU size) may be optimized or defined jointly for Nss=1 and Nss=2 or Nss=1 to 4.

Under a proposed scheme in accordance with the present disclosure with respect to EHT-LTF sequence set for dRU PAPR reduction, three sets of optimized EHT-LTF sequences (herein referred to as set-1/2/3) may be introduced corresponding to the different dRU tone plans and/or distribution patterns. For instance, set-1 may be used for edge-aligned and direct-current (DC) tone-symmetric tone pattern; set-2 may be used for center-aligned and DC-asymmetric tone pattern; and set-3 may be used for center-aligned and DC-symmetric and evenly-pilot tone pattern. In each set of EHT-LTF sequence, there may be three subsets (herein referred to as subset-a/b/c (e.g., subset 1a/1b/1c, subset 2a/2b/2c, and subset 3a/3b/3c). The subset-a (e.g., subset 1a/2a/3a) may be optimized for Nss=1 (e.g., dRU being transmitted with 1ss). The subset-b (e.g., subset 1b/2b/3b) may be optimized for Nss=2 (e.g., dRU being transmitted with 2ss). The subset-c (e.g., subset 1c/2c/3c) may be optimized jointly for Nss=1 and Nss=2 (e.g., dRU being transmitted with either 1ss or 2ss). Moreover, subset-a may be used for both Nss=1 and Nss=2. Furthermore, subset-b may be used for both Nss=1 and Nss=2.

Figure 12:
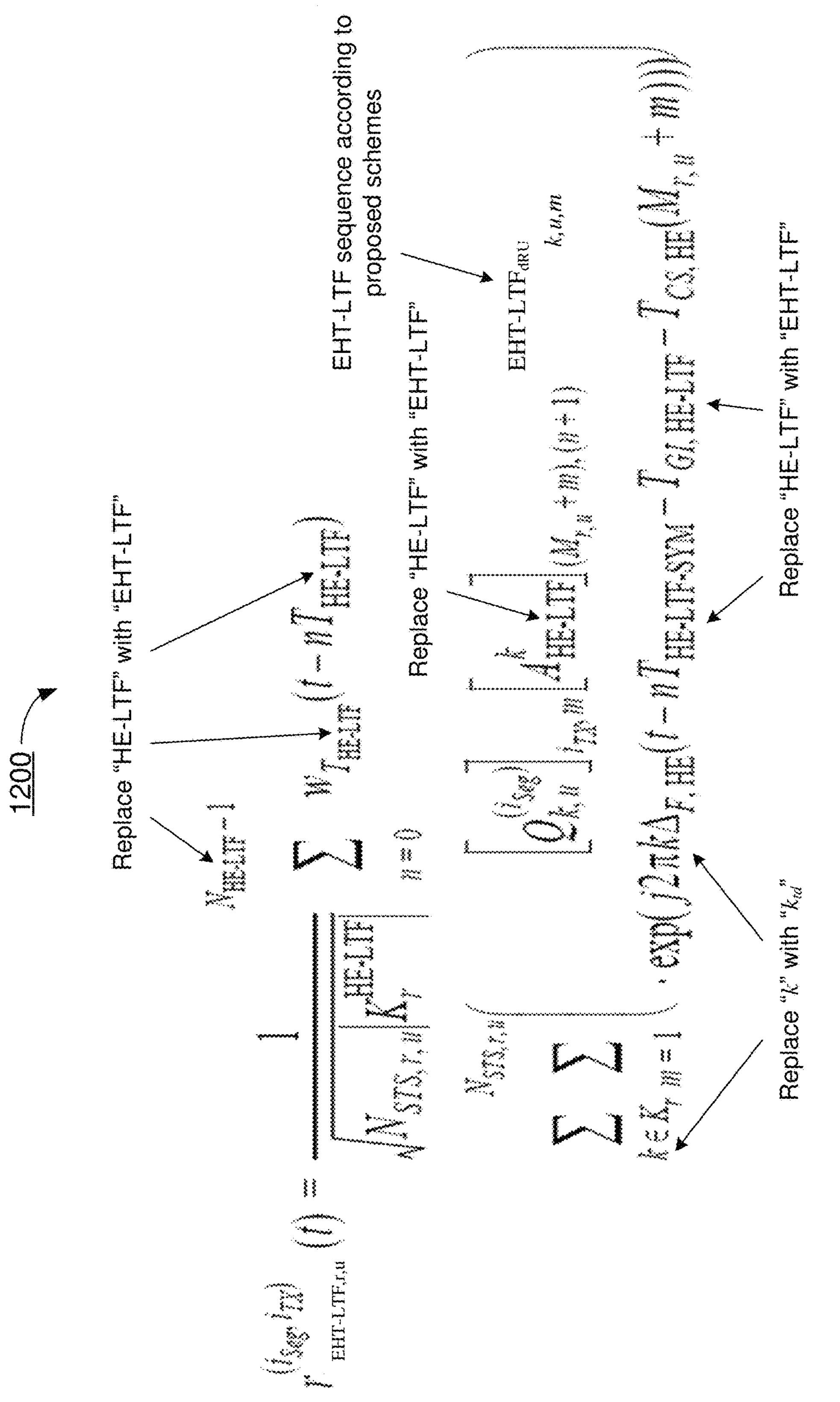
FIG. 12 is a diagram of an example design in accordance with an implementation of the present disclosure.

FIG. 12 illustrates an example design 1200 for EHT-LTF transmission for dRU PAPR reduction under a proposed scheme in accordance with the present disclosure. In design 1200, Kr denotes a set of subcarrier indices for the tones in the dRU being transmitted. Moreover, in design 1200, HE-LTF is replaced with EHT-LTF in the equation.

FIG. 13 illustrates an example design 1300 of EHT-LTF sequence set 1-a for 26-tone and 52-tone dRU transmission with 1ss. In design 1300, EHT-LTF$_{dRU26,BW40}$ may be the same as EHT-LTF$_{dRU26,BW20}$. Additionally, EHT-LTF$_{dRU52,BW80}$ may be the same as EHT-LTF$_{dRU52,BW20}$. Moreover, EHT-LTF$_{dRU26,BW20}$ may be used for all nine 26-tone dRUs on BW20. Similarly, EHT-LTF$_{dRU26,BW40}$ may be used for all eighteen 26-tone dRUs on BW40. Furthermore, EHT-LTF$_{dRU52,BW20}$ may be used for all four 52-tone dRUs on BW20. Likewise, EHT-LTF$_{dRU52,BW40}$ may be used for all eight 52-tone dRUs on BW20. FIG. 14 illustrates an example design 1400 of EHT-LTF sequence set 1-a for 106-tone dRU transmission with 1ss. FIG. 15 illustrates an example design 1500 of EHT-LTF sequence set 1-a for 242-tone dRU transmission with 1ss. FIG. 16 illustrates an example design 1600 of EHT-LTF sequence set 1-a for 78-tone and 132-tone dMRU transmission with 1ss.

FIG. 17 illustrates an example design 1700 of EHT-LTF sequence set 1-b for 26-tone and 52-tone dRU transmission with 2ss. In design 1700, EHT-LTF$_{dRU26,BW20}$ may be used for all nine 26-tone dRUs on BW20. Similarly, EHT-LTF$_{dRU26,BW40}$ may be used for all eighteen 26-tone dRUs on BW40. FIG. 18 illustrates an example design 1800 of EHT-LTF sequence set 1-b for 106-tone dRU transmission with 2ss. FIG. 19 illustrates an example design 1900 of EHT-LTF sequence set 1-b for 242-tone dRU transmission with 2ss. FIG. 20 illustrates an example design 2000 of EHT-LTF sequence set 1-b for 78-tone and 132-tone dMRU transmission with 2ss.

FIG. 21 illustrates an example design 2100 of EHT-LTF sequence set 1-c for 26-tone, 52-tone and 106-tone dRU transmission with 1ss and 2ss jointly. FIG. 22 illustrates an example design 2200 of EHT-LTF sequence set 1-c for 242-tone dRU transmission with 1ss and 2ss jointly. FIG. 23 illustrates an example design 2300 of EHT-LTF sequence set 1-c for 78-tone and 132-tone dMRU transmission with 1ss and 2ss jointly.

FIG. 24 illustrates an example design 2400 of EHT-LTF sequence set 2-a for 26-tone, 52-tone and 106-tone dRU transmission with 1ss. FIG. 25 illustrates an example design 2500 of EHT-LTF sequence set 2-a for 242-tone dRU transmission with 1ss. FIG. 26 illustrates an example design 2600 of EHT-LTF sequence set 2-a for 78-tone and 132-tone dMRU transmission with 1ss.

FIG. 27 illustrates an example design 2700 of EHT-LTF sequence set 2-b for 26-tone, 52-tone and 106-tone dRU transmission with 2ss. FIG. 28 illustrates an example design 2800 of EHT-LTF sequence set 2-b for 242-tone dRU transmission with 2ss. FIG. 29 illustrates an example design 2900 of EHT-LTF sequence set 2-b for 78-tone and 132-tone dMRU transmission with 2ss.

FIG. 30 illustrates an example design 3000 of EHT-LTF sequence set 2-c for 26-tone, 52-tone and 106-tone dRU transmission with 1ss and 2ss jointly. FIG. 31 illustrates an example design 3100 of EHT-LTF sequence set 2-c for 242-tone dRU transmission with 1ss and 2ss jointly. FIG. 32 illustrates an example design 3200 of EHT-LTF sequence set 2-c for 78-tone and 132-tone dMRU transmission with 1ss and 2ss jointly.

FIG. 33 illustrates an example design 3300 of EHT-LTF sequence set 3-a for 26-tone, 52-tone and 106-tone dRU transmission with 1ss. FIG. 34 illustrates an example design 3400 of EHT-LTF sequence set 3-a for 242-tone dRU transmission with 1ss. FIG. 35 illustrates an example design 3500 of EHT-LTF sequence set 3-a for 78-tone and 132-tone dMRU transmission with 1ss.

FIG. 36 illustrates an example design 3600 of EHT-LTF sequence set 3-b for 26-tone, 52-tone and 106-tone dRU transmission with 2ss. FIG. 37 illustrates an example design 3700 of EHT-LTF sequence set 3-b for 242-tone dRU transmission with 2ss. FIG. 38 illustrates an example design 3800 of EHT-LTF sequence set 3-b for 78-tone and 132-tone dMRU transmission with 2ss.

FIG. 39 illustrates an example design 3900 of EHT-LTF sequence set 3-c for 26-tone, 52-tone and 106-tone dRU transmission with 1ss and 2ss jointly. FIG. 40 illustrates an example design 4000 of EHT-LTF sequence set 3-c for 242-tone dRU transmission with 1ss and 2ss jointly. FIG. 41 illustrates an example design 4100 of EHT-LTF sequence set 3-c for 78-tone and 132-tone dMRU transmission with 1ss and 2ss jointly.

It is noteworthy that the EHT-LTF PAPR for dRU can be much higher than that for rRU EHT-LTF PAPR for some cases, and the gap (or difference) may be larger than 2 dB, specifically for dRU on BW20. The EHT-LTF PAPR also may depend on pilot tone locations for Nss>1. Under a proposed scheme in accordance with the present disclosure, several methods may be utilized with the optimized EHT-LTF sequences/transmission for dRU to reduce EHT-LTF PAPR. In a first optimization option (Option-1), which involves performing per-RU size per BW optimization, an "optimized EHT-LTF" search may be conducted across all existing BW2040/80/160 HE/EHT-LTF sequences and BW320 EHT-LTF sequences. The optimization may be based on a hierarchical pilot tone design (and the same optimization method may also be applied on other pilot design schemes herein). Option-1 may involve joint-optimization for Nss. In a second optimization option (Option-2), two sub-options (option-2a and option-2b) may be available. In option-2a, per-RU index per BW optimization may be performed, and all may be based on the same EHT-LTF base sequence (e.g., BW80 IEEE 802.11be EHT-LTF sequence, and so on). In option-2b, per-RU size per BW optimization may be performed, but all may be based on the same EHT-LTF base sequence (e.g., BW80 IEEE 802.11be EHT-LTF sequence, and so on). In a third optimization option (Option-3), per-RU size over all distribution BW optimization may be performed, with an "optimized EHT-LTF" search conducted across all existing BW2040/80/160 HE/EHT-LTF sequences and BW320 EHT-LTF sequences.

It is also noteworthy that one consideration of dRU EHT-LTF transmission may be to re-use the existing IEEE 802.11be EHT-LTF sequences with the one-step method and two-step method described above. A comparison of the EHT-LTF PAPR performance of the first-step method and the EHT-LTF PAPR performance of the two-step method indicates that the two-step method tends to outperform the one-step method for all dRUs over BW20/40/80 for both Nss=1 and Nss 2.

FIG. 42 illustrates an example design 4200 of an EHT-LTF base sequence for BW20 rRU. FIG. 43 illustrates an example design 4300 of an EHT-LTF base sequence for BW40 rRU. FIG. 44 illustrates an example design 4400 of an EHT-LTF base sequence for BW80 rRU. FIG. 45 illustrates an example design 4500 of an EHT-LTF left and right base sequences for BW320 rRU. In each of FIG. 42, FIG. 43 and FIG. 44, a black box is placed where some 0's (DCs) would be. This is because, when carrying out a sliding-window search for dRU LTF optimization over an existing base sequence, those 0's (in DC) are not used and thus are blocked out in FIG. 42, FIG. 43 and FIG. 44.

Figure 46:
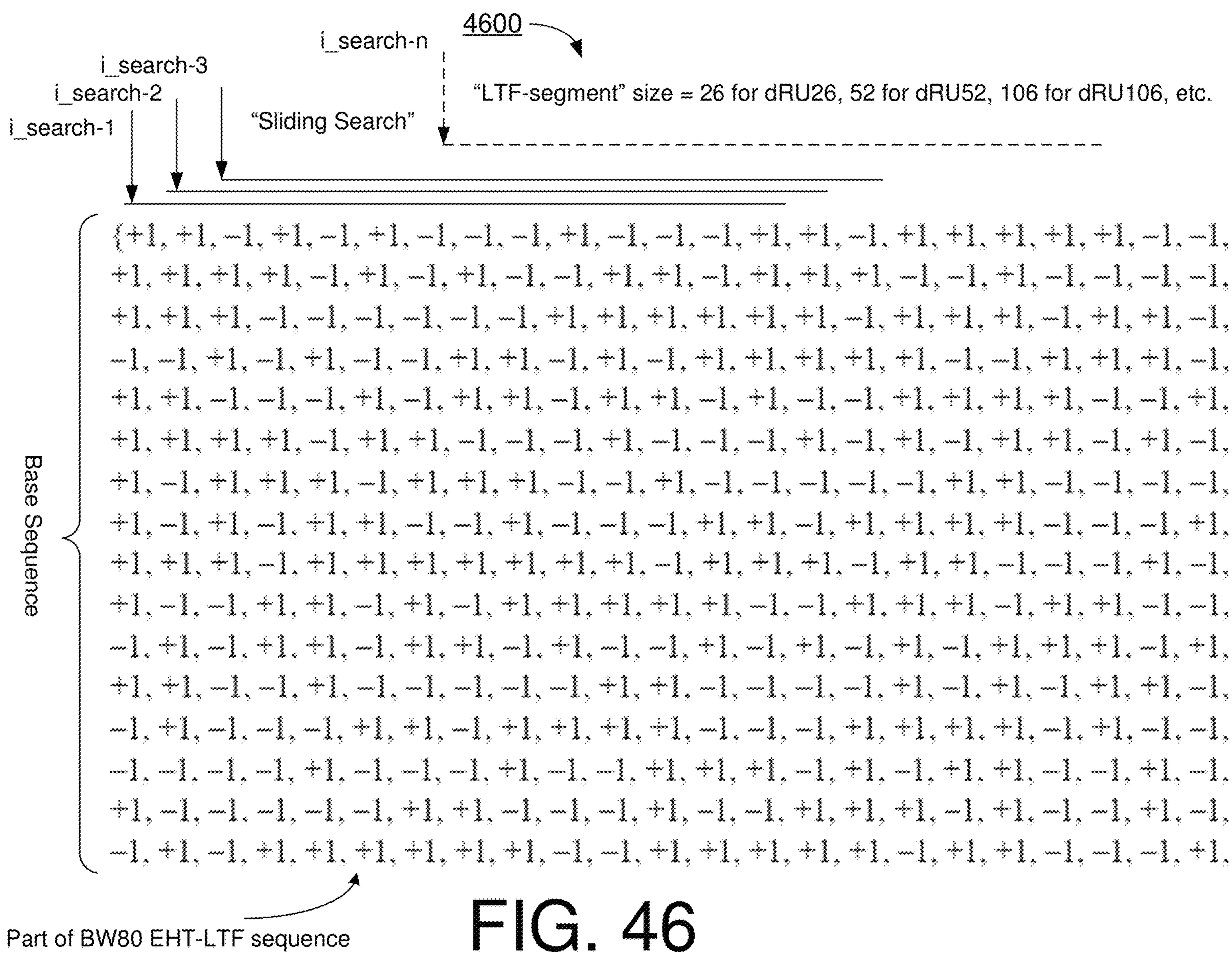
FIG. 46 is a diagram of an example design in accordance with an implementation of the present disclosure.

FIG. 46 illustrates an example design 4600 under Option-1. Design 4600 is an example of per-RU size and per-BW optimization for dRU EHT-LTF transmission. Referring to FIG. 46, the new/optimized EHT-LTF sequence may be generated to minimize the "worst" dRU PAPR by performing a "sliding search" over certain "base sequences" which may be any existing HE-LTF and/or EHT-LTF for BW20, BW40, BW80 and/or BW160, and so on. The base sequences may also be any random sequence(s) with value=−1 or +1. In the example shown in FIG. 46, the base sequence is a part of a BW80 EHT-LTF sequence. In scenario 4600, the size of a given LTF segment may be 26 tones for dRU26, 52 tones for dRU52, 106 tones for dRU106, and so on.

FIG. 47 illustrates an example design 4700 of an optimized EHT-LTF sequence for dRU on BW20 under Option-1. For EHT-$LTF_{dRU26,BW20}$, one EHT-LTF sequence may be used for all dRU26 on BW20 or 20 MHz frequency subblock and for all Nss. For EHT-$LTF_{dRU52,BW20}$, one EHT-LTF sequence may be used for all dRU52 on BW20 or 20 MHz frequency subblock and for all Nss. For EHT-$LTF_{dRU106,BW20}$, one EHT-LTF sequence may be used for all dRU106 on BW20 or 20 MHz frequency subblock and for all Nss. In design 4700, instead of listing the sequences, an alternative way to represent the "optimized EHT-LTF" sequence may be to define parameters of "starting point" or "starting position" or "starting index" (herein denoted as "$S_{ltf}$") and the "base sequence" as shown in FIG. 48. FIG. 48 illustrates an example design 4800 of parameters for optimization for BW20, BW40 and BW80 under Option-1.

FIG. 49 illustrates an example design 4900 under Option-2. Design 4900 is an example of per-RU size and/or per-BW optimization for dRU EHT-LTF transmission. Referring to FIG. 49, the "base sequence" may be its own BW EHT-LTF sequence or, alternatively, BW80 EHT-LTF sequence may be utilized for all of BW20, BW40 and BW80. Simulations indicated that all BW20/40/80 using the BW80 EHT-LTF base sequence tends to yield better PAPR performance. In design 4900, each dRU EHT-LTF sequence may be simply defined by one parameter of $S_{ltf}$ for a given base sequence. The starting position $S_{ltf}$ may be jointly optimized for all Nss (e.g., Nss=1 and Nss=2). Then, the EHT-LTF sequence used for dRU transmission may be easily defined as: EHT-$LTF_{base}$ ($S_{ltf}$:$S_{ltf}$+$N_{st}$−1), where Nst is the total number of dRU tones including both data and pilot subcarriers and $S_{ltf}$ may be defined as shown in FIG. 50 and FIG. 51.

FIG. 50 illustrates an example design 5000 of parameters for optimization under Option-2 using BW80 EHT-LTF base sequence for all BW20/40/80 and all dRU sizes. In design 5000, for BW20, the optimization may also be based on BW20 or BW40 EHT-LTF sequence, then $S_{ltf}$ may be updated accordingly. Similarly, for BW40, the optimization may also be based on BW20 or BW40 EHT-LTF sequence, then $S_{ltf}$ may be updated accordingly. Likewise, for BW80, the optimization may also be based on BW40 EHT-LTF sequence, then $S_{ltf}$ may be updated accordingly.

FIG. 51 illustrates an example design 5100 of parameters for optimization under Option-2. To avoid potential high receiver (Rx) PAPR at an AP's receiver side due to duplication of the same EHT-LTF sequence, the $S_{ltf}$ may be modified for option-2a to make each dRU index with different "starting position" $S_{ltf}$. In design 5100, for BW20, the optimization may also be based on BW20 or BW40 or BW160 or BW320 EHT-LTF sequence, then $S_{ltf}$ may be updated accordingly. Similarly, for BW40, the optimization may also be based on BW20 or BW40 or BW160 or BW320 EHT-LTF sequence, then $S_{ltf}$ may be updated accordingly. Likewise, for BW80, the optimization may also be based on BW40 or BW160 or BW320 EHT-LTF sequence, then $S_{ltf}$ may be updated accordingly.

FIG. 52 illustrates an example design 5200 of parameters for optimization under Option-3. The EHT-LTF sequence may be optimized for all the same-sized dRUs over all the distribution bandwidth of BW20, BW40 and BW80. As an example, the starting position $S_{ltf}$=137 may be used for all the dRU106 on all the BW20/40/80 and for all Nss.

Figure 53:
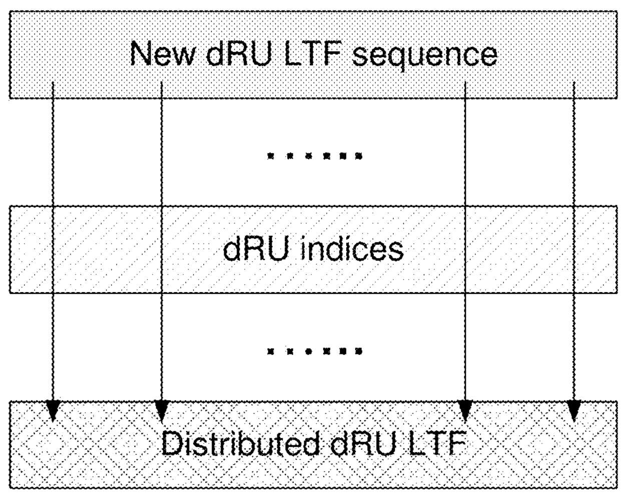
FIG. 53 is a diagram of an example design in accordance with an implementation of the present disclosure.

FIG. 53 illustrates an example design 5300 of dRU LTF transmission under a proposed scheme in accordance with the present disclosure. Under the proposed scheme, with a new proposed dRU sequence, dRU LTF transmission for UL TB PPDU may follow the similar procedure and formula as that of a rRU. Referring to FIG. 53, EHT-LTF may be replaced by a distributed-tone RU long training field (dRU-LTF) sequence under the proposed scheme. In design 5300, subcarrier indices k may use dRU subcarrier indices instead of rRU tone indices. Each of FIG. 54A, FIG. 54B, FIG. 54C and FIG. 54D illustrates a respective aspect of an example design 5400 under a proposed scheme in accordance with the present disclosure. In particular, FIG. 54A illustrates a new proposed LTF sequence and corresponding PAPR values for dRU transmission on BW20 under example design 5400. FIG. 54B illustrates a new proposed LTF sequence and corresponding PAPR values for dRU transmission on BW40 under example design 5400. FIG. 54C and FIG. 54D each illustrates a new proposed LTF sequence and corresponding PAPR values for dRU transmission on BW80 under example design 5400.

FIG. 55 illustrates an example scenario 5500 of LTF PAPR values for dRU on BW20. In particular, the table in FIG. 55 lists the PAPR values for 1ss and 2ss with a proposed dRU LTF sequence in options 1~8 shown in FIG. 56~FIG. 63. FIG. 56 illustrates an example design 5600 of a dRU LTF sequence for PAPR reduction under an option-1. FIG. 57 illustrates an example design 5700 of a dRU LTF sequence for PAPR reduction under an option-2. FIG. 58 illustrates an example design 5800 of a dRU LTF sequence for PAPR reduction under an option-3. FIG. 59 illustrates an example design 5800 of a dRU LTF sequence for PAPR reduction under an option-4. FIG. 60 illustrates an example design 6000 of a dRU LTF sequence for PAPR reduction under an option-5. FIG. 61 illustrates an example design 6100 of a dRU LTF sequence for PAPR reduction under an option-6. FIG. 62 illustrates an example design 6200 of a dRU LTF sequence for PAPR reduction under an option-7. FIG. 63 illustrates an example design 6300 of a dRU LTF sequence for PAPR reduction under an option-8.

FIG. 64 illustrates an example scenario 6400 of LTF PAPR values for dRU on BW20. In particular, the table in FIG. 64 lists the PAPR values for 1ss and 2ss with a proposed dRU LTF sequence in options 9~16 shown in FIG. 65~FIG. 72. FIG. 65 illustrates an example design 6500 of a dRU LTF sequence for PAPR reduction under an option-9. FIG. 66 illustrates an example design 6600 of a dRU LTF sequence for PAPR reduction under an option-10. FIG. 67 illustrates an example design 6700 of a dRU LTF sequence for PAPR reduction under an option-11. FIG. 68 illustrates an example design 6800 of a dRU LTF sequence for PAPR reduction under an option-12. FIG. 69 illustrates an example design 6900 of a dRU LTF sequence for PAPR reduction under an option-13. FIG. 70 illustrates an example design 7000 of a dRU LTF sequence for PAPR reduction under an option-14. FIG. 71 illustrates an example design 7100 of a dRU LTF sequence for PAPR reduction under an option-15. FIG. 72 illustrates an example design 7200 of a dRU LTF sequence for PAPR reduction under an option-16.

FIG. 73 illustrates an example scenario 7300 of LTF PAPR values for dRU on BW20. In particular, the table in FIG. 73 lists the PAPR values for 1ss and 2ss with a proposed dRU LTF sequence in options 17~24 shown in FIG. 74~FIG. 81. FIG. 74 illustrates an example design 7400 of a dRU LTF sequence for PAPR reduction under an option-17. FIG. 75 illustrates an example design 7500 of a dRU LTF sequence for PAPR reduction under an option-18. FIG. 76 illustrates an example design 7600 of a dRU LTF sequence for PAPR reduction under an option-19. FIG. 77 illustrates an example design 7700 of a dRU LTF sequence for PAPR reduction under an option-20. FIG. 78 illustrates an example design 7800 of a dRU LTF sequence for PAPR reduction under an option-21. FIG. 79 illustrates an example design 7900 of a dRU LTF sequence for PAPR reduction under an option-22. FIG. 80 illustrates an example design 8000 of a dRU LTF sequence for PAPR reduction under an option-23. FIG. 81 illustrates an example design 8100 of a dRU LTF sequence for PAPR reduction under an option-24.

Illustrative Implementations

Figure 82:
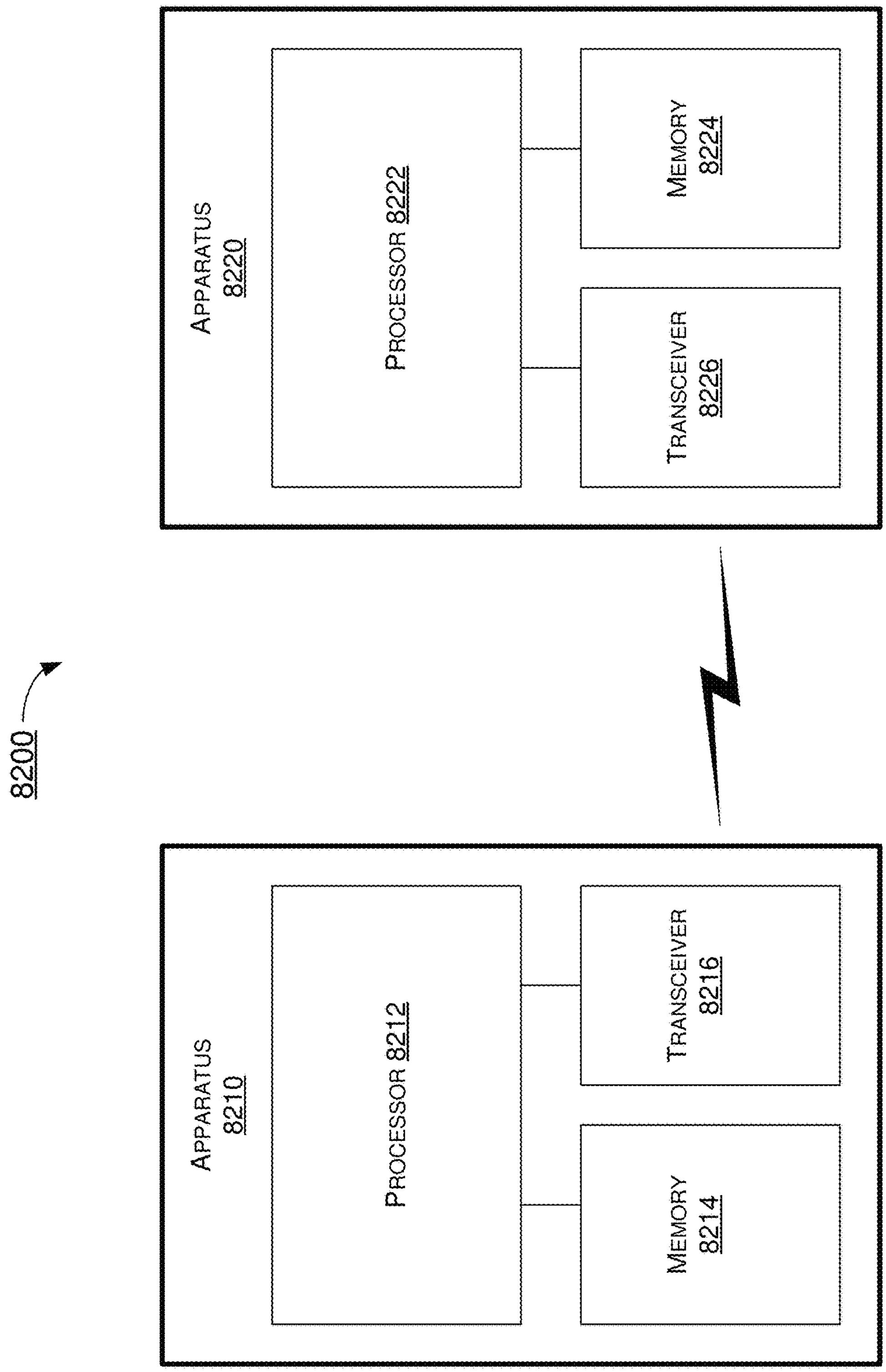
FIG. 82 is a block diagram of an example communication system in accordance with an implementation of the present disclosure.

FIG. 82 illustrates an example system 8200 having at least an example apparatus 8210 and an example apparatus 8220 in accordance with an implementation of the present disclosure. Each of apparatus 8210 and apparatus 8220 may perform various functions to implement schemes, techniques, processes and methods described herein pertaining to EHT-LTF sequence design for dRUs with PAPR reduction in 6 GHz LPI systems, including the various schemes described above with respect to various proposed designs, concepts, schemes, systems and methods described above as well as processes described below. For instance, apparatus 8210 may be an example implementation of communication entity 110, and apparatus 8220 may be an example implementation of communication entity 120.

Each of apparatus 8210 and apparatus 8220 may be a part of an electronic apparatus, which may be a STA or an AP, such as a portable or mobile apparatus, a wearable apparatus, a wireless communication apparatus or a computing apparatus. For instance, each of apparatus 8210 and apparatus 8220 may be implemented in a smartphone, a smart watch, a personal digital assistant, a digital camera, or a computing equipment such as a tablet computer, a laptop computer or a notebook computer. Each of apparatus 8210 and apparatus 8220 may also be a part of a machine type apparatus, which may be an IoT apparatus such as an immobile or a stationary apparatus, a home apparatus, a wire communication apparatus or a computing apparatus. For instance, each of apparatus 8210 and apparatus 8220 may be implemented in a smart thermostat, a smart fridge, a smart door lock, a wireless speaker or a home control center. When implemented in or as a network apparatus, apparatus 8210 and/or apparatus 8220 may be implemented in a network node, such as an AP in a WLAN.

In some implementations, each of apparatus 8210 and apparatus 8220 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 8210 and apparatus 8220 may be implemented in or as a STA or an AP. Each of apparatus 8210 and apparatus 8220 may include at least some of those components shown in FIG. 82 such as a processor 8212 and a processor 8222, respectively, for example. Each of apparatus 8210 and apparatus 8220 may further include one or more other components not pertinent to the proposed scheme of the present disclosure (e.g., internal power supply, display device and/or user interface device), and, thus, such component(s) of apparatus 8210 and apparatus 8220 are neither shown in FIG. 82 nor described below in the interest of simplicity and brevity.

In one aspect, each of processor 8212 and processor 8222 may be implemented in the form of one or more single-core processors, one or more multi-core processors, one or more RISC processors or one or more CISC processors. That is, even though a singular term "a processor" is used herein to refer to processor 8212 and processor 8222, each of processor 8212 and processor 8222 may include multiple processors in some implementations and a single processor in other implementations in accordance with the present disclosure. In another aspect, each of processor 8212 and processor 8222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 8212 and processor 8222 is a special-purpose machine specifically designed, arranged and configured to perform specific tasks including those pertaining to EHT-LTF sequence design for dRUs with PAPR reduction in 6 GHz LPI systems in accordance with various implementations of the present disclosure. For instance, each of processor 8212 and processor 8222 may be configured with hardware components, or circuitry, implementing one, some or all of the examples described and illustrated herein.

In some implementations, apparatus 8210 may also include a transceiver 8216 coupled to processor 8212. Transceiver 8216 may be capable of wirelessly transmitting and receiving data. In some implementations, apparatus 8220 may also include a transceiver 8226 coupled to processor 8222. Transceiver 8226 may include a transceiver capable of wirelessly transmitting and receiving data.

In some implementations, apparatus 8210 may further include a memory 8214 coupled to processor 8212 and capable of being accessed by processor 8212 and storing data therein. In some implementations, apparatus 8220 may further include a memory 8224 coupled to processor 8222 and capable of being accessed by processor 8222 and storing data therein. Each of memory 8214 and memory 8224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 8214 and memory 8224 may include a type of read-only memory (ROM) such as mask ROM, programmable ROM (PROM), erasable programmable ROM (EPROM) and/or electrically erasable programmable ROM (EEPROM). Alternatively, or additionally, each of memory 8214 and memory 8224 may include a type of non-volatile random-access memory (NVRAM) such as flash memory, solid-state memory, ferroelectric RAM (FeRAM), magnetoresistive RAM (MRAM) and/or phase-change memory.

Each of apparatus 8210 and apparatus 8220 may be a communication entity capable of communicating with each other using various proposed schemes in accordance with the present disclosure. For illustrative purposes and without limitation, a description of capabilities of apparatus 8210, as communication entity 110, and apparatus 8220, as communication entity 120, is provided below. It is noteworthy that, although the example implementations described below are provided in the context of WLAN, the same may be implemented in other types of networks. Thus, although the following description of example implementations pertains to a scenario in which apparatus 8210 functions as a transmitting device and apparatus 8220 functions as a receiving device, the same is also applicable to another scenario in which apparatus 8210 functions as a receiving device and apparatus 8220 functions as a transmitting device.

Under a proposed scheme in accordance with the present disclosure with respect to EHT-LTF sequence design for dRUs with PAPR reduction in 6 GHz LPI systems, processor 8212 of apparatus 8210 may distribute subcarriers of a RU with a resolution of 4× subcarrier spacing to generate a 4×EHT-LTF of an UL TB PPDU with a dRU. Additionally, processor 8212 may transmit, via transceiver 8216, the 4×EHT-LTF for the UL TB PPDU with the dRU.

In some implementations, in generating the 4×EHT-LTF, processor 8212 may generate the 4×EHT-LTF with a one-step method involving selecting an EHT-LTF sequence based on subcarrier indices of the dRU to generate the 4×EHT-LTF. Alternatively, in generating the 4×EHT-LTF, processor 8212 may generate the 4×EHT-LTF with a two-step method involving: (i) selecting an EHT-LTF sequence based on a rRU; and (ii) assigning the EHT-LTF sequence based on subcarrier indices of the dRU to generate the 4×EHT-LTF.

In some implementations, an EHT-LTF sequence for the dRU may be defined per dRU size per BW.

In some implementations, the EHT-LTF sequence for the dRU may be optimized either: (a) separately for one spatial stream or two spatial streams or up to four spatial streams; or (b) jointly for both one spatial stream and two spatial streams or jointly for up to four spatial streams.

In some implementations, processor 8212 may optimize the EHT-LTF sequence for the dRU per RU size per BW by performing a sliding search for an optimized EHT-LTF across one or more base sequences in one or more of a 20 MHz bandwidth, a 40 MHz bandwidth and an 80 MHz bandwidth. In some implementations, the one or more base sequences may include one or more existing HE-LTF sequences of BW20/40/80/160 and/or one or more existing EHT-LTF sequences of BW20/40/80/160/320.

In some implementations, processor 8212 may optimize the EHT-LTF sequence for the dRU per RU index per BW by performing a sliding search for an optimized EHT-LTF across a base sequence in one or more of a 20 MHz bandwidth, a 40 MHz bandwidth and an 80 MHz bandwidth.

In some implementations, processor 8212 may optimize the EHT-LTF sequence for the dRU per RU size per BW by performing a sliding search for an optimized EHT-LTF across a base sequence in one or more of a 20 MHz bandwidth, a 40 MHz bandwidth and an 80 MHz bandwidth.

In some implementations, processor 8212 may optimize the EHT-LTF sequence for the dRU per RU size over a plurality of distribution BWs by performing a sliding search for an optimized EHT-LTF across one or more existing HE-LTF sequences and/or one or more existing EHT-LTF sequences in one or more of a 20 MHz bandwidth, a 40 MHz bandwidth and an 80 MHz bandwidth.

In some implementations, in distributing of the subcarriers of the RU to generate the 4×EHT-LTF, processor 8212 may generate a dRU-LTF by using a new dRU-LTF sequence with subcarrier indices of the dRU. Moreover, in transmitting of the 4×EHT-LTF for the UL TB PPDU with the dRU, processor 8212 may transmit the dRU-LTF for the UL TB PPDU with the dRU.

In some implementations, in generating the dRU-LTF, processor 8212 may generate the dRU-LTF per BW in one or more of a 20 MHz bandwidth, a 40 MHz bandwidth and an 80 MHz bandwidth.

In some implementations, the dRU-LTF sequence for dRU transmission on BW20 or 20 MHz frequency subblock may be expressed as:

| $dRU\_LTF_{-122:122}=$ |
|---|
| {0 0 −1 1 −1 1 −1 1 1 1 −1 1 1 −1 1 −1 −1 −1 −1 1 −1 −1 1 −1 −1<br>1 1 −1 −1 −1 −1 −1 −1 −1 1 1 −1 1 −1 1 1 −1 1 −1 1 −1 −1 −1 −1 −1<br>1 1 1 −1 1 1 −1 −1 1 1 −1 1 −1 1 −1 1 −1 −1 1 −1 1 1 1 1 −1<br>1 1 −1 1 −1 −1 −1 1 1 −1 1 −1 −1 1 −1 −1 −1 −1 −1 −1 1 −1 1 −1 −1<br>1 1 −1 1 1 −1 1 1 −1 1 1 −1 1 −1 1 −1 1 −1 −1 1 −1 0 0 0 −1<br>1 −1 1 −1 −1 1 −1 −1 −1 1 −1 1 −1 −1 −1 1 1 1 −1 1 −1 −1 −1 −1 −1<br>−1 −1 −1 −1 −1 −1 1 1 −1 1 −1 −1 −1 −1 1 1 1 1 1 −1 −1 1 −1 −1 1<br>1 −1 −1 −1 −1 1 −1 1 1 −1 −1 1 1 1 −1 −1 1 −1 −1 −1 −1 1 −1 1 1<br>−1 −1 1 −1 1 1 −1 1 1 −1 1 1 −1 1 1 −1 1 −1 1 −1 −1 1 1 −1 −1<br>−1 −1 1 1 1 −1 −1 −1 −1 1 −1 −1 −1 1 1 1 −1 1 0 0} |

In some implementations, the dRU-LTF sequence for dRU transmission on BW40 or 40 MHz frequency subblock may be expressed as:

| $dRU\_LTF_{-244:244}$= |
| --- |
| {1 1 –1 1 –1 1 –1 1 –1 –1 1 –1 1 –1 1 –1 –1 –1 –1 1 1 –1 1 1 1 –1 1 1 –1 1 –1 |
| –1 –1 1 1 1 –1 –1 –1 –1 –1 –1 –1 1 1 –1 1 –1 1 –1 –1 –1 –1 –1 –1 1 1 1 1 1 1 –1 |
| –1 1 1 1 1 –1 1 1 1 –1 –1 –1 –1 1 –1 –1 –1 –1 –1 –1 –1 1 –1 1 1 –1 –1 1 1 1 1 –1 |
| –1 –1 1 1 –1 –1 –1 1 –1 1 –1 –1 1 1 1 –1 1 1 –1 1 –1 1 1 1 –1 1 –1 –1 1 –1 –1 |
| –1 1 1 –1 –1 1 –1 1 1 1 –1 –1 –1 –1 1 –1 –1 1 –1 –1 1 –1 –1 1 –1 1 1 –1 –1 –1 –1 |
| 1 –1 1 1 1 1 –1 –1 1 1 1 –1 1 –1 –1 1 –1 1 –1 1 –1 –1 –1 –1 1 1 1 –1 1 –1 –1 |
| 1 –1 –1 1 –1 –1 –1 1 1 1 1 –1 1 1 –1 1 1 –1 –1 1 1 –1 –1 1 1 1 –1 1 1 1 1 |
| 1 –1 1 –1 –1 –1 –1 1 1 –1 1 1 –1 1 –1 –1 1 1 –1 –1 1 1 1 –1 –1 0 0 0 0 0 1 |
| 1 –1 1 –1 –1 –1 –1 1 1 1 –1 –1 1 –1 1 1 1 1 –1 1 –1 –1 1 1 –1 –1 –1 1 –1 –1 1 |
| 1 –1 1 1 1 –1 1 –1 1 1 1 –1 1 –1 –1 –1 1 1 –1 –1 1 –1 –1 –1 –1 1 1 –1 –1 –1 –1 |
| 1 1 –1 –1 1 –1 –1 1 –1 1 –1 –1 1 1 –1 1 –1 –1 1 1 1 –1 1 1 1 1 –1 1 –1 1 –1 |
| 1 1 1 1 –1 1 –1 1 1 –1 –1 1 –1 1 1 1 1 –1 –1 1 1 1 –1 1 1 –1 –1 1 –1 1 1 |
| 1 –1 –1 1 –1 –1 1 1 1 1 –1 1 –1 –1 –1 1 –1 –1 1 –1 –1 1 –1 –1 1 1 1 1 –1 –1 –1 |
| 1 1 1 –1 1 1 1 1 –1 –1 –1 –1 1 1 –1 –1 –1 –1 1 –1 1 –1 1 –1 1 1 –1 –1 –1 –1 –1 |
| 1 1 –1 1 –1 1 1 –1 –1 1 –1 1 1 –1 –1 –1 1 –1 –1 –1 –1 1 1 1 1 1 –1 –1 1 1 1 |
| –1 1 –1 1 –1 –1 –1 1 1 1 1 1 1 –1 –1 1 –1 1 1 1 1 –1 –1 –1} |

In some implementations, the dRU-LTF sequence for dRU transmission on BW80 or 80 MHz frequency subblock may be expressed as:

| $dRU\_LTF_{-500:500}$= |
| --- |
| {0 –1 1 –1 1 –1 1 –1 1 –1 –1 –1 1 1 1 1 1 –1 –1 –1 –1 –1 –1 –1 –1 –1 –1 –1 –1 –1 –1 –1 –1 –1 –1 –1 –1 |
| –1 –1 –1 –1 –1 –1 –1 –1 –1 –1 –1 –1 1 1 –1 –1 –1 1 –1 1 1 1 1 1 1 1 1 –1 1 1 –1 –1 1 1 –1 1 1 |
| 1 1 1 1 1 1 1 –1 1 1 1 –1 –1 –1 1 1 –1 1 –1 –1 –1 –1 –1 –1 –1 –1 1 –1 –1 1 –1 –1 –1 –1 –1 –1 –1 |
| –1 –1 –1 –1 –1 –1 –1 –1 –1 –1 1 1 –1 1 –1 –1 1 –1 –1 –1 –1 –1 –1 –1 –1 –1 –1 –1 1 1 –1 –1 –1 –1 –1 –1 –1 |
| –1 –1 –1 –1 –1 –1 –1 –1 –1 1 1 1 1 –1 1 –1 1 1 1 1 1 1 1 1 –1 1 1 –1 –1 1 1 1 1 1 1 1 1 |
| 1 1 1 1 –1 1 1 1 –1 1 –1 1 1 1 –1 1 1 1 1 1 1 1 1 1 1 1 –1 –1 1 1 1 1 1 1 –1 1 1 1 1 |
| 1 1 1 1 1 1 1 –1 –1 1 1 –1 –1 –1 –1 –1 1 –1 –1 –1 1 –1 –1 –1 –1 1 1 –1 –1 1 –1 –1 1 –1 –1 –1 1 1 |
| –1 –1 1 –1 –1 –1 1 1 –1 –1 1 1 1 –1 1 –1 –1 –1 –1 –1 1 –1 1 1 –1 –1 –1 1 –1 1 –1 –1 1 1 –1 –1 1 1 |
| 1 1 –1 –1 –1 –1 1 1 1 –1 1 1 –1 –1 –1 1 1 1 –1 –1 –1 –1 1 1 –1 1 1 –1 –1 –1 –1 –1 –1 –1 –1 –1 1 1 |
| –1 –1 1 –1 1 –1 –1 1 –1 1 1 1 –1 –1 1 1 1 –1 –1 –1 1 1 1 1 –1 1 1 –1 1 –1 1 1 1 –1 1 –1 –1 |
| 1 –1 1 –1 1 –1 –1 1 –1 1 1 1 –1 –1 1 1 –1 –1 1 1 1 –1 1 –1 1 –1 –1 1 1 –1 1 1 –1 1 –1 –1 1 1 |
| 1 1 1 –1 –1 –1 –1 –1 1 –1 1 –1 –1 –1 1 1 1 –1 –1 1 –1 –1 –1 –1 1 1 –1 –1 –1 1 1 1 –1 1 1 –1 –1 |
| 1 –1 1 –1 1 –1 –1 1 1 1 –1 –1 –1 1 1 1 –1 1 1 –1 1 –1 –1 –1 –1 1 1 –1 –1 1 –1 1 –1 –1 1 1 1 |
| –1 –1 –1 1 0 0 0 0 0 0 0 0 0 0 0 0 0 0 0 0 0 0 0 0 0 0 0 0 0 0 0 0 0 0 0 1 |
| –1 1 1 –1 –1 –1 –1 –1 1 –1 –1 1 –1 1 1 1 –1 1 1 1 1 1 –1 –1 –1 1 1 –1 1 1 –1 –1 –1 1 1 –1 –1 |
| –1 –1 1 1 1 1 1 –1 –1 1 1 –1 1 –1 –1 1 1 –1 –1 –1 –1 1 1 –1 1 1 1 1 1 1 –1 –1 1 –1 –1 1 1 |
| 1 1 –1 –1 –1 1 1 –1 –1 –1 1 1 –1 –1 –1 1 1 –1 1 –1 –1 –1 –1 1 1 –1 1 1 1 –1 –1 –1 1 –1 –1 1 –1 |
| 1 1 1 –1 1 –1 –1 1 –1 1 1 –1 –1 1 1 –1 –1 1 –1 1 –1 1 1 1 –1 1 1 –1 –1 –1 –1 1 1 –1 –1 –1 1 |
| 1 –1 –1 1 1 –1 –1 –1 1 –1 –1 1 1 1 –1 –1 1 1 1 –1 –1 1 –1 1 1 –1 1 –1 1 1 –1 1 –1 –1 –1 1 –1 |
| –1 1 –1 –1 –1 1 1 –1 1 1 –1 1 –1 –1 –1 1 1 1 –1 –1 1 1 1 1 1 –1 –1 1 –1 1 1 –1 –1 –1 1 –1 –1 |
| 1 1 –1 1 –1 1 –1 –1 –1 1 1 1 –1 –1 1 –1 1 –1 1 –1 1 1 –1 1 1 1 –1 1 –1 1 1 1 –1 –1 –1 –1 1 |
| –1 –1 –1 1 1 –1 –1 1 –1 –1 1 1 –1 1 1 –1 –1 1 –1 1 –1 –1 1 –1 1 –1 1 1 –1 –1 –1 –1 –1 –1 –1 1 1 |
| 1 –1 1 1 1 –1 1 1 1 –1 –1 –1 –1 –1 1 –1 –1 –1 1 1 –1 1 –1 1 –1 1 –1 –1 1 1 1 1 1 1 –1 –1 –1 |
| 1 1 1 1 1 1 1 –1 –1 –1 –1 –1 –1 1 1 1 1 –1 –1 –1 1 –1 –1 –1 –1 –1 –1 –1 –1 1 –1 1 1 –1 –1 –1 –1 |
| 1 1 –1 –1 1 1 –1 1 –1 1 –1 –1 1 1 1 1 –1 1 1 1 –1 –1 1 –1 1 1 –1 1 1 1 –1 1 –1 –1 –1 1 –1 |
| 1 1 1 –1 1 1 –1 1 –1 –1 –1 1 1 1 –1 –1 1 –1 –1 –1 1 1 1 1 –1 –1 –1 1 –1 –1 1 –1 1 –1 –1 –1 1 |
| –1 –1 –1 1 1 1 1 1 1 –1 1 –1 1 –1 –1 –1 1 –1 –1 1 1 –1 1 1 1 1 –1 1 –1 –1 –1 –1 –1 –1 1 1 1 |
| 1 –1} |

Illustrative Processes

FIG. 83 illustrates an example process 8300 in accordance with an implementation of the present disclosure. Process 8300 may represent an aspect of implementing various proposed designs, concepts, schemes, systems and methods described above. More specifically, process 8300 may represent an aspect of the proposed concepts and schemes pertaining to EHT-LTF sequence design for dRUs with PAPR reduction in 6 GHz LPI systems in accordance with the present disclosure. Process 8300 may include one or more operations, actions, or functions as illustrated by one or more of blocks 8310 and 8320. Although illustrated as discrete blocks, various blocks of process 8300 may be divided into additional blocks, combined into fewer blocks, or eliminated, depending on the desired implementation. Moreover, the blocks/sub-blocks of process 8300 may be executed in the order shown in FIG. 83 or, alternatively in a different order. Furthermore, one or more of the blocks/sub-blocks of process 8300 may be executed repeatedly or iteratively. Process 8300 may be implemented by or in apparatus 8210 and apparatus 8220 as well as any variations thereof. Solely for illustrative purposes and without limiting the scope, process 8300 is described below in the context of apparatus 8210 as communication entity 110 (e.g., a transmitting device whether a STA or an AP) and apparatus 8220 as communication entity 120 (e.g., a receiving device whether a STA or an AP) of a wireless network such as a WLAN in accordance with one or more of IEEE 802.11 standards. Process 8300 may begin at block 8310.

At 8310, process 8300 may involve processor 8212 of apparatus 8210 distributing subcarriers of a RU with a resolution of 4× subcarrier spacing to generate a 4×EHT-LTF of an UL TB PPDU with a dRU. Process 8300 may proceed from 8310 to 8320.

At 8320, process 8300 may involve processor 8212 transmitting, via transceiver 8216, the 4×EHT-LTF for the UL TB PPDU with the dRU.

In some implementations, in generating the 4×EHT-LTF, process 8300 may involve processor 8212 generating the 4×EHT-LTF with a one-step method involving selecting an EHT-LTF sequence based on subcarrier indices of the dRU to generate the 4×EHT-LTF. Alternatively, in generating the 4×EHT-LTF, process 8300 may involve processor 8212 generating the 4×EHT-LTF with a two-step method involving: (i) selecting an EHT-LTF sequence based on a rRU; and (ii) assigning the EHT-LTF sequence based on subcarrier indices of the dRU to generate the 4×EHT-LTF.

In some implementations, an EHT-LTF sequence for the dRU may be defined per dRU size per BW.

In some implementations, the EHT-LTF sequence for the dRU may be optimized either: (a) separately for one spatial stream or two spatial streams or up to four spatial streams; or (b) jointly for both one spatial stream and two spatial streams or up to four spatial streams.

In some implementations, process 8300 may involve processor 8212 optimizing the EHT-LTF sequence for the dRU per RU size per BW by performing a sliding search for an optimized EHT-LTF across one or more base sequences in one or more of a 20 MHz bandwidth, a 40 MHz bandwidth and an 80 MHz bandwidth. In some implementations, the one or more base sequences may include one or more existing HE-LTF sequences of BW20/40/80/160 and/or one or more existing EHT-LTF sequences of BW20/40/80/160/320.

In some implementations, process 8300 may involve processor 8212 optimizing the EHT-LTF sequence for the dRU per RU index per BW by performing a sliding search for an optimized EHT-LTF across a base sequence in one or more of a 20 MHz bandwidth, a 40 MHz bandwidth and an 80 MHz bandwidth.

In some implementations, process 8300 may involve processor 8212 optimizing the EHT-LTF sequence for the dRU per RU size per BW by performing a sliding search for an optimized EHT-LTF across a base sequence in one or more of a 20 MHz bandwidth, a 40 MHz bandwidth and an 80 MHz bandwidth.

In some implementations, process 8300 may involve processor 8212 optimizing the EHT-LTF sequence for the dRU per RU size over a plurality of distribution BWs by performing a sliding search for an optimized EHT-LTF across one or more existing HE-LTF sequences and/or one or more existing EHT-LTF sequences in one or more of a 20 MHz bandwidth, a 40 MHz bandwidth and an 80 MHz bandwidth.

In some implementations, in distributing of the subcarriers of the RU to generate the 4×EHT-LTF, process 8300 may involve processor 8212 generating a dRU-LTF by using a dRU-LTF sequence with subcarrier indices of the dRU. Moreover, in transmitting of the 4×EHT-LTF for the UL TB PPDU with the dRU, process 8300 may involve processor 8212 transmitting the dRU-LTF for the UL TB PPDU with the dRU.

In some implementations, in generating the dRU-LTF, process 8300 may involve processor 8212 generating the dRU-LTF per BW in one or more of a 20 MHz bandwidth, a 40 MHz bandwidth and an 80 MHz bandwidth.

In some implementations, the dRU-LTF sequence of BW20 or 20 MHz frequency subblock may be expressed as:

| $dRU\_LTF_{-122:122}$= |
|---|
| {0 0 −1 1 −1 1 −1 1 1 1 −1 1 1 −1 1 −1 −1 −1 −1 1 −1 −1 1 −1 −1 |
| 1 1 −1 −1 −1 −1 −1 −1 −1 1 1 −1 1 −1 1 1 −1 1 −1 1 −1 −1 −1 −1 −1 |
| 1 1 1 −1 1 1 −1 −1 1 1 −1 1 −1 1 −1 1 −1 −1 1 −1 1 1 1 1 −1 |
| 1 1 −1 1 −1 −1 −1 1 1 −1 1 −1 −1 1 −1 −1 −1 −1 −1 −1 1 −1 1 −1 −1 |
| 1 1 −1 1 1 −1 1 1 −1 1 1 −1 1 −1 1 −1 1 −1 −1 1 −1 0 0 0 −1 |
| 1 −1 1 −1 −1 1 −1 −1 −1 1 −1 1 −1 −1 −1 1 1 1 −1 1 −1 −1 −1 −1 −1 |
| −1 −1 −1 −1 −1 −1 1 1 −1 1 −1 −1 −1 −1 1 1 1 1 1 −1 −1 1 −1 −1 1 |
| 1 −1 −1 −1 −1 1 −1 1 1 −1 −1 1 1 1 −1 −1 1 −1 −1 −1 −1 1 −1 1 1 |
| −1 −1 1 −1 1 1 −1 1 1 −1 1 1 −1 1 1 −1 1 −1 1 −1 −1 1 1 −1 −1 |
| −1 −1 1 1 1 −1 −1 −1 −1 1 −1 −1 −1 1 1 1 −1 1 0 0} |

In some implementations, the dRU-LTF sequence of BW40 or 40 MHz frequency subblock may be expressed as:

| $dRU\_LTF_{-244:244}$= |
|---|
| {1 1 −1 1 −1 1 −1 1 −1 −1 1 −1 1 −1 1 −1 −1 −1 −1 1 1 −1 1 1 1 −1 1 1 −1 1 −1 |
| −1 −1 1 1 1 −1 −1 −1 1 −1 −1 −1 1 1 −1 1 −1 1 −1 −1 −1 −1 −1 −1 1 1 1 1 1 1 −1 |
| −1 1 1 1 1 −1 1 1 1 −1 −1 −1 −1 1 −1 −1 −1 −1 −1 −1 −1 1 −1 1 1 −1 −1 1 1 1 1 −1 |
| −1 −1 1 1 −1 −1 −1 1 −1 1 −1 −1 1 1 1 −1 1 1 −1 1 −1 1 1 1 −1 1 −1 −1 1 −1 −1 |
| −1 1 1 −1 −1 1 −1 1 1 1 −1 −1 −1 −1 1 −1 −1 1 −1 −1 1 −1 −1 1 −1 1 1 −1 −1 −1 −1 |
| 1 −1 1 1 1 1 −1 −1 1 1 1 −1 1 −1 −1 1 −1 1 −1 1 −1 −1 −1 −1 1 1 1 −1 1 −1 −1 |
| 1 −1 −1 1 −1 −1 −1 1 1 1 1 −1 1 1 −1 1 1 −1 −1 1 1 −1 −1 1 1 1 −1 1 1 1 1 |
| 1 −1 1 −1 −1 −1 −1 1 1 −1 1 1 −1 1 −1 −1 1 1 −1 −1 1 1 1 −1 −1 0 0 0 0 0 1 |
| 1 −1 1 −1 −1 −1 −1 1 1 1 −1 −1 1 −1 1 1 1 1 −1 1 −1 −1 1 1 −1 −1 −1 1 −1 −1 1 |
| 1 −1 1 1 1 −1 1 −1 1 1 1 −1 1 −1 −1 −1 1 1 −1 −1 1 −1 −1 −1 −1 1 1 −1 −1 −1 −1 |
| 1 1 −1 −1 1 −1 −1 1 −1 1 −1 −1 1 1 −1 1 −1 −1 1 1 1 −1 1 1 1 1 −1 1 −1 1 −1 |
| 1 1 1 1 −1 1 −1 1 1 −1 −1 1 −1 1 1 1 1 −1 −1 1 1 1 −1 1 1 −1 −1 1 −1 1 1 |
| 1 −1 −1 1 −1 −1 1 1 1 1 −1 1 −1 −1 −1 1 −1 −1 1 −1 −1 1 −1 −1 1 1 1 1 −1 −1 −1 |
| 1 1 1 −1 1 1 1 1 −1 −1 −1 −1 1 1 −1 −1 −1 −1 1 −1 1 −1 1 −1 1 1 −1 −1 −1 −1 −1 |
| 1 1 −1 1 −1 1 1 −1 −1 1 −1 1 1 −1 −1 −1 1 −1 −1 −1 −1 1 1 1 1 1 −1 −1 1 1 1 |
| −1 1 −1 1 −1 −1 −1 1 1 1 1 1 1 −1 −1 1 −1 1 1 1 1 −1 −1 1} |

In some implementations, the dRU-LTF sequence of BW80 or 80 MHz frequency subblock may be expressed as:

| $dRU\_LTF_{-500:500}$= |
|---|
| {0 −1 1 −1 1 −1 1 −1 1 −1 −1 −1 1 1 1 1 1 −1 −1 −1 −1 −1 −1 −1 −1 −1 −1 −1 −1 −1 −1 −1 −1 −1 −1 −1 −1 |
| −1 −1 −1 −1 −1 −1 −1 −1 −1 −1 −1 −1 1 1 −1 −1 −1 1 −1 1 1 1 1 1 1 1 1 −1 1 1 −1 −1 1 1 −1 1 1 |
| 1 1 1 1 1 1 1 −1 1 1 1 −1 −1 −1 1 1 −1 1 −1 −1 −1 −1 −1 −1 −1 −1 1 −1 −1 1 −1 −1 −1 −1 −1 −1 −1 |
| −1 −1 −1 −1 −1 −1 −1 −1 −1 −1 1 1 −1 1 −1 −1 1 −1 −1 −1 −1 −1 −1 −1 −1 −1 −1 −1 1 1 −1 −1 −1 −1 −1 −1 −1 |

-continued

| $dRU\_LTF_{-500:500}$= |
| --- |
| −1 −1 −1 −1 −1 −1 −1 −1 −1 1 1 1 1 −1 1 −1 1 1 1 1 1 1 1 1 −1 1 1 −1 −1 1 1 1 1 1 1 1 1 |
| 1 1 1 1 −1 1 1 1 −1 1 −1 1 1 1 −1 1 1 1 1 1 1 1 1 1 1 1 −1 −1 1 1 1 1 1 −1 1 1 1 |
| 1 1 1 1 1 1 1 −1 −1 1 1 −1 −1 −1 −1 −1 1 −1 −1 −1 1 −1 −1 −1 −1 1 1 −1 −1 1 −1 −1 1 −1 −1 −1 1 |
| −1 −1 1 −1 −1 −1 1 1 −1 −1 1 1 1 −1 1 −1 −1 −1 −1 −1 1 −1 1 1 −1 −1 −1 1 −1 1 −1 −1 1 1 −1 −1 1 |
| 1 1 −1 −1 −1 −1 1 1 1 −1 1 1 −1 −1 −1 1 1 1 −1 −1 −1 −1 1 1 −1 1 1 −1 −1 −1 −1 −1 −1 −1 −1 −1 1 |
| −1 −1 1 −1 1 −1 −1 1 −1 1 1 1 −1 −1 1 1 1 −1 −1 −1 1 1 1 1 −1 1 1 −1 1 −1 1 1 1 −1 1 −1 −1 |
| 1 −1 1 −1 1 −1 −1 1 −1 1 1 1 −1 −1 1 1 −1 −1 1 1 1 −1 1 −1 1 −1 −1 1 1 −1 1 1 −1 1 −1 −1 1 1 |
| 1 1 1 −1 −1 −1 −1 −1 1 −1 1 −1 −1 −1 1 1 1 −1 −1 1 −1 −1 −1 −1 1 1 −1 −1 −1 1 1 1 1 −1 1 1 1 −1 −1 |
| 1 −1 1 −1 1 −1 −1 1 1 1 −1 −1 −1 1 1 1 −1 1 1 −1 1 −1 −1 −1 −1 1 1 −1 −1 1 −1 1 −1 −1 1 1 1 |
| −1 −1 −1 1 0 0 0 0 0 0 0 0 0 0 0 0 0 0 0 0 0 0 0 0 0 0 0 0 0 0 0 0 0 0 0 0 1 |
| −1 1 1 −1 −1 −1 −1 −1 1 −1 −1 1 −1 1 1 1 −1 1 1 1 1 1 −1 −1 −1 1 1 −1 1 1 −1 −1 −1 1 1 −1 −1 |
| −1 −1 1 1 1 1 1 −1 −1 1 1 −1 1 −1 −1 1 1 −1 −1 −1 −1 1 1 −1 1 1 1 1 1 1 −1 −1 1 −1 −1 1 1 |
| 1 1 −1 −1 −1 1 1 −1 −1 −1 1 1 −1 −1 −1 1 1 −1 1 −1 −1 −1 −1 1 1 −1 1 1 1 −1 −1 −1 1 −1 −1 1 −1 |
| 1 1 1 −1 1 −1 −1 1 −1 1 1 −1 −1 1 1 −1 −1 1 −1 1 −1 1 1 1 −1 1 1 −1 −1 −1 −1 1 1 −1 −1 −1 1 |
| 1 −1 −1 1 1 −1 −1 −1 1 −1 −1 1 1 1 −1 −1 1 1 1 −1 −1 1 −1 1 1 −1 1 −1 1 1 −1 1 −1 −1 −1 1 −1 |
| −1 1 −1 −1 −1 1 1 −1 1 1 −1 1 −1 −1 −1 1 1 1 −1 −1 1 1 1 1 1 −1 −1 1 −1 1 1 −1 −1 −1 1 −1 −1 |
| 1 1 −1 1 −1 1 −1 −1 −1 1 1 1 −1 −1 1 −1 1 −1 1 −1 1 1 −1 1 1 1 −1 1 −1 1 1 1 −1 −1 −1 −1 1 |
| −1 −1 −1 1 1 −1 −1 1 −1 −1 1 1 −1 1 1 −1 −1 1 −1 1 −1 −1 1 −1 1 −1 1 1 −1 −1 −1 −1 −1 −1 −1 1 1 |
| 1 −1 1 1 1 −1 1 1 1 −1 −1 −1 −1 −1 1 −1 −1 −1 1 1 −1 1 −1 1 −1 1 −1 −1 1 1 1 1 1 1 −1 −1 −1 |
| 1 1 1 1 1 1 1 −1 −1 −1 −1 −1 −1 1 1 1 1 −1 −1 −1 1 −1 −1 −1 −1 −1 −1 −1 −1 1 −1 1 1 −1 −1 −1 −1 |
| 1 1 −1 −1 1 1 −1 1 −1 1 −1 −1 1 1 1 1 −1 1 1 1 −1 −1 1 −1 1 1 −1 1 1 1 −1 1 −1 −1 −1 1 −1 |
| 1 1 1 −1 1 1 −1 1 −1 −1 −1 1 1 1 −1 −1 1 −1 −1 −1 1 1 1 1 −1 −1 −1 1 −1 −1 1 −1 1 −1 −1 −1 1 |
| −1 −1 −1 1 1 1 1 1 1 −1 1 −1 1 −1 −1 −1 1 −1 −1 1 1 −1 1 1 1 1 −1 1 −1 −1 −1 −1 −1 −1 1 1 1 |
| 1 −1} |

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

distributing subcarriers of a resource unit (RU) with a resolution of four times (4×) subcarrier spacing to generate a 4× extremely-high-throughput long training field (EHT-LTF) of an uplink (UL) trigger-based (TB) physical-layer protocol data unit (PPDU) with a distributed-tone RU (dRU); and transmitting the 4×EHT-LTF for the UL TB PPDU with the dRU, wherein the 4×EHT-LTF is generated with either a one-step method or a two-step method, wherein the one-step method comprises selecting an EHT-LTF sequence based on subcarrier indices of the dRU to generate the 4×EHT-LTF, and wherein the two-step method comprises:

selecting an EHT-LTF sequence based on a regular RU (rRU); and assigning the EHT-LTF sequence based on subcarrier indices of the dRU to generate the 4×EHT-LTF.

2. The method of claim 1, wherein an EHT-LTF sequence for the dRU is defined per dRU size per bandwidth (BW).

3. The method of claim 2, wherein the EHT-LTF sequence for the dRU is optimized either:

separately for one spatial stream or two spatial streams or up to four spatial streams; or jointly for both one spatial stream and two spatial streams or up to four spatial streams.

4. The method of claim 2, wherein the EHT-LTF sequence for the dRU is optimized per RU size per bandwidth (BW) by performing a sliding search for an optimized EHT-LTF across one or more base sequences in one or more of a 20 MHz bandwidth, a 40 MHz bandwidth and an 80 MHz bandwidth, and wherein the one or more base sequences comprise one or more existing high-efficiency long training field (HE-LTF) sequences and one or more existing EHT-LTF sequences.

5. The method of claim 2, wherein the EHT-LTF sequence for the dRU is optimized per RU index per bandwidth (BW) by performing a sliding search for an optimized EHT-LTF across a base sequence in one or more of a 20 MHz bandwidth, a 40 MHz bandwidth and an 80 MHz bandwidth.

6. The method of claim 2, wherein the EHT-LTF sequence for the dRU is optimized per RU size over a plurality of distribution bandwidths (BWs) by performing a sliding search for an optimized EHT-LTF across one or more existing high-efficiency long training field (HE-LTF) sequences and one or more existing EHT-LTF sequences in one or more of a 20 MHz bandwidth, a 40 MHz bandwidth and an 80 MHz bandwidth.

7. The method of claim 1, wherein:

the distributing of the subcarriers of the RU to generate the 4×EHT-LTF comprises generating a distributed-tone RU long training field (dRU-LTF) by using a dRU-LTF sequence with subcarrier indices of the dRU; and the transmitting of the 4×EHT-LTF for the UL TB PPDU with the dRU comprises transmitting the dRU-LTF for the UL TB PPDU with the dRU.

8. The method of claim 7, wherein the generating of the dRU-LTF comprises generating the dRU-LTF per bandwidth (BW) in one or more of a 20 MHz bandwidth, a 40 MHz bandwidth and an 80 MHz bandwidth.

9. The method of claim 7, wherein the dRU-LTF sequence for a 20 MHz bandwidth or a 20 MHz frequency subblock is expressed as:

| $dRU\_LTF_{-122:122}$= |
| --- |
| {0 0 −1 1 −1 1 −1 1 1 1 −1 1 1 −1 1 −1 −1 −1 −1 1 −1 −1 1 −1 −1<br>1 1 −1 −1 −1 −1 −1 −1 −1 1 1 −1 1 −1 1 1 −1 1 −1 1 −1 −1 −1 −1 −1<br>1 1 1 −1 1 1 −1 −1 1 1 −1 1 −1 1 −1 1 −1 −1 1 −1 1 1 1 1 −1<br>1 1 −1 1 −1 −1 −1 1 1 −1 1 −1 −1 1 −1 −1 −1 −1 −1 −1 1 −1 1 −1 −1<br>1 1 −1 1 1 −1 1 1 −1 1 1 −1 1 −1 1 −1 1 −1 −1 1 −1 0 0 0 −1<br>1 −1 1 −1 −1 1 −1 −1 −1 1 −1 1 −1 −1 −1 1 1 1 −1 1 −1 −1 −1 −1 −1<br>−1 −1 −1 −1 −1 −1 1 1 −1 1 −1 −1 −1 −1 1 1 1 1 1 −1 −1 1 −1 −1 1 1<br>1 −1 −1 −1 −1 1 −1 1 1 −1 −1 1 1 1 −1 −1 1 −1 −1 −1 −1 1 −1 1 1<br>−1 −1 1 −1 1 1 −1 1 1 −1 1 1 −1 1 1 −1 1 −1 1 −1 −1 1 1 −1 −1<br>−1 −1 1 1 1 −1 −1 −1 −1 1 −1 −1 −1 1 1 1 −1 1 0 0}. |

10. The method of claim 7, wherein the dRU-LTF sequence for a 40 MHz bandwidth or a 40 MHz frequency subblock is expressed as:

| $dRU\_LTF_{-244:244}$= |
| --- |
| {1 1 −1 1 −1 1 −1 1 −1 −1 1 −1 1 −1 1 −1 −1 −1 −1 1 1 −1 1 1 1 −1 1 1 −1 1 −1<br>−1 −1 1 1 1 −1 −1 −1 −1 −1 −1 −1 1 1 −1 1 −1 1 −1 −1 −1 −1 −1 −1 1 1 1 1 1 1 −1<br>−1 1 1 1 1 −1 1 1 1 −1 −1 −1 −1 1 −1 −1 −1 −1 −1 −1 −1 1 −1 1 1 −1 −1 1 1 1 −1<br>−1 −1 1 1 −1 −1 −1 1 −1 1 −1 −1 1 1 1 −1 1 1 −1 1 −1 1 1 1 −1 1 −1 −1 1 −1 −1<br>−1 1 1 −1 −1 1 −1 1 1 1 −1 −1 −1 −1 1 −1 −1 1 −1 −1 1 −1 −1 1 −1 1 1 −1 −1 −1 −1<br>1 −1 1 1 1 1 −1 −1 1 1 1 −1 1 −1 −1 1 −1 1 −1 1 −1 −1 −1 −1 1 1 1 −1 1 −1 −1<br>1 −1 −1 1 −1 −1 −1 1 1 1 1 −1 1 1 −1 1 1 −1 −1 1 1 −1 −1 1 1 1 −1 1 1 1 1<br>1 −1 1 −1 −1 −1 −1 1 1 −1 1 1 −1 1 −1 −1 1 1 −1 −1 1 1 1 −1 −1 0 0 0 0 0 1<br>1 −1 1 −1 −1 −1 −1 1 1 1 −1 −1 1 −1 1 1 1 1 −1 1 −1 −1 1 1 −1 −1 −1 1 −1 −1 1<br>1 −1 1 1 1 −1 1 −1 1 1 1 −1 1 −1 −1 −1 1 1 −1 −1 1 −1 −1 −1 −1 1 1 −1 −1 −1 −1<br>1 1 −1 −1 1 −1 −1 1 −1 1 −1 −1 1 1 −1 1 −1 −1 1 1 1 −1 1 1 1 1 −1 1 −1 1 −1<br>1 1 1 1 −1 1 −1 1 1 −1 −1 1 −1 1 1 1 1 −1 −1 1 1 1 −1 1 1 −1 −1 1 −1 1 1<br>1 −1 −1 1 −1 −1 1 1 1 1 −1 1 −1 −1 −1 1 −1 −1 1 −1 −1 1 −1 −1 1 1 1 1 −1 −1 −1<br>1 1 1 −1 1 1 1 1 −1 −1 −1 −1 1 1 −1 −1 −1 −1 1 −1 1 −1 1 −1 1 1 −1 −1 −1 −1 −1<br>1 1 −1 1 −1 1 1 −1 −1 1 −1 1 1 −1 −1 −1 1 −1 −1 −1 −1 1 1 1 1 1 −1 −1 1 1 1<br>−1 1 −1 1 −1 −1 −1 1 1 1 1 1 1 −1 −1 1 −1 1 1 1 1 −1 −1 −1}. |

11. The method of claim 7, wherein the dRU-LTF sequence for an 80 MHz bandwidth or an 80 MHz frequency subblock is expressed as:

| $dRU\_LTF_{-500:500}$= |
| --- |
| {0 −1 1 −1 1 −1 1 −1 1 −1 −1 −1 1 1 1 1 1 −1 −1 −1 −1 −1 −1 −1 −1 −1 −1 −1 −1 −1 −1 −1 −1 −1 −1 −1<br>−1 −1 −1 −1 −1 −1 −1 −1 −1 −1 −1 −1 1 1 −1 −1 −1 1 −1 1 1 1 1 1 1 1 1 −1 1 1 −1 −1 1 1 −1 1 1<br>1 1 1 1 1 1 1 −1 1 1 1 −1 −1 −1 1 1 −1 1 −1 −1 −1 −1 −1 −1 −1 −1 1 −1 −1 1 −1 −1 −1 −1 −1 −1 −1<br>−1 −1 −1 −1 −1 −1 −1 −1 −1 −1 1 1 −1 1 −1 −1 1 −1 −1 −1 −1 −1 −1 −1 −1 −1 −1 −1 1 1 −1 −1 −1 −1 −1 −1 −1<br>−1 −1 −1 −1 −1 −1 −1 −1 −1 1 1 1 1 −1 1 −1 1 1 1 1 1 1 1 1 −1 1 1 −1 −1 1 1 1 1 1 1 1 1<br>1 1 1 1 −1 1 1 1 −1 1 −1 1 1 1 −1 1 1 1 1 1 1 1 1 1 1 1 −1 −1 1 1 1 1 1 1 −1 1 1 1 1<br>1 1 1 1 1 1 1 −1 −1 1 1 −1 −1 −1 −1 −1 1 −1 −1 −1 1 −1 −1 −1 −1 1 1 −1 −1 1 −1 −1 1 −1 −1 −1 1 1<br>−1 −1 1 −1 −1 −1 1 1 −1 −1 1 1 1 −1 1 −1 −1 −1 −1 −1 1 −1 1 1 −1 −1 −1 1 −1 1 −1 −1 1 1 −1 −1 1 1<br>1 1 −1 −1 −1 −1 1 1 1 −1 1 1 −1 −1 −1 1 1 1 −1 −1 −1 −1 1 1 −1 1 1 −1 −1 −1 −1 −1 −1 −1 −1 −1 1 1<br>−1 −1 1 −1 1 −1 −1 1 −1 1 1 1 −1 −1 1 1 1 −1 −1 −1 1 1 1 1 −1 1 1 −1 1 −1 1 1 1 −1 1 −1 −1<br>1 −1 1 −1 1 −1 −1 1 −1 1 1 1 −1 −1 1 1 −1 −1 1 1 1 −1 1 −1 1 −1 −1 1 1 −1 1 1 −1 1 −1 −1 1 1<br>1 1 1 −1 −1 −1 −1 −1 1 −1 1 −1 −1 −1 1 1 1 −1 −1 1 −1 −1 −1 −1 1 1 −1 −1 −1 1 1 1 −1 1 1 −1 −1<br>1 −1 1 −1 1 −1 −1 1 1 1 −1 −1 −1 1 1 1 −1 1 1 −1 1 −1 −1 −1 −1 1 1 −1 −1 1 −1 1 −1 −1 1 1 1<br>−1 −1 −1 1 0 0 0 0 0 0 0 0 0 0 0 0 0 0 0 0 0 0 0 0 0 0 0 0 0 0 0 0 0 0 0 0 1<br>−1 1 1 −1 −1 −1 −1 −1 1 −1 −1 1 −1 1 1 1 −1 1 1 1 1 1 −1 −1 −1 1 1 −1 1 1 −1 −1 −1 1 1 −1 −1<br>−1 −1 1 1 1 1 1 −1 −1 1 1 −1 1 −1 −1 1 1 −1 −1 −1 −1 1 1 −1 1 1 1 1 1 1 1 −1 −1 1 −1 −1 1 1<br>1 1 −1 −1 −1 1 1 −1 −1 −1 1 1 −1 −1 −1 1 1 −1 1 −1 −1 −1 −1 1 1 −1 1 1 1 −1 −1 −1 1 −1 −1 1 −1<br>1 1 1 −1 1 −1 −1 1 −1 1 1 −1 −1 1 1 −1 −1 1 −1 1 −1 1 1 1 −1 1 1 −1 −1 −1 −1 1 1 −1 −1 −1 1<br>1 −1 −1 1 1 −1 −1 −1 1 −1 −1 1 1 1 −1 −1 1 1 1 −1 −1 1 −1 1 1 −1 1 −1 1 1 −1 1 −1 −1 −1 1 −1<br>−1 1 −1 −1 −1 1 1 −1 1 1 −1 1 −1 −1 −1 1 1 1 −1 −1 1 1 1 1 1 −1 −1 1 −1 1 1 −1 −1 −1 1 −1 −1<br>1 1 −1 1 −1 1 −1 −1 −1 1 1 1 −1 −1 1 −1 1 −1 1 −1 1 1 −1 1 1 1 −1 1 −1 1 1 1 −1 −1 −1 −1 1 1<br>−1 −1 −1 1 1 −1 −1 1 −1 −1 1 1 −1 1 1 −1 −1 1 −1 1 −1 −1 1 −1 1 −1 1 1 −1 −1 −1 −1 −1 −1 −1 1 1<br>1 −1 1 1 1 −1 1 1 1 −1 −1 −1 −1 −1 1 −1 −1 −1 1 1 −1 1 −1 1 −1 1 −1 −1 1 1 1 1 1 1 −1 −1 −1<br>1 1 1 1 1 1 1 −1 −1 −1 −1 −1 −1 1 1 1 1 −1 −1 −1 1 −1 −1 −1 −1 −1 −1 −1 −1 1 −1 1 1 −1 −1 −1 −1<br>1 1 −1 −1 1 1 −1 1 −1 1 −1 −1 1 1 1 1 −1 1 1 1 −1 −1 1 −1 1 1 −1 1 1 1 −1 1 −1 −1 −1 1 −1<br>1 1 1 −1 1 1 −1 1 −1 −1 −1 1 1 1 −1 −1 1 −1 −1 −1 1 1 1 1 −1 −1 −1 1 −1 −1 1 −1 1 −1 −1 −1 1 1<br>−1 −1 −1 1 1 1 1 1 1 −1 1 −1 1 −1 −1 −1 1 −1 −1 1 1 −1 1 1 1 1 −1 1 −1 −1 −1 −1 −1 −1 1 1 1 1<br>1 −1}. |

12. An apparatus, comprising:

a transceiver configured to transmit and receive wirelessly; and a processor coupled to the transceiver and configured to perform operations comprising:

distributing subcarriers of a resource unit (RU) with a resolution of four times (4×) subcarrier spacing to generate a 4× extremely-high-throughput long training field (EHT-LTF) of an uplink (UL) trigger-based (TB) physical-layer protocol data unit (PPDU) with a distributed-tone RU (dRU); and transmitting, via the transceiver, the 4×EHT-LTF for the UL TB PPDU with the dRU, wherein the 4×EHT-LTF is generated with either a one-step method or a two-step method, wherein the one-step method comprises selecting an EHT-LTF sequence based on subcarrier indices of the dRU to generate the 4×EHT-LTF, and wherein the two-step method comprises:

selecting an EHT-LTF sequence based on a regular RU (rRU); and assigning the EHT-LTF sequence based on subcarrier indices of the dRU to generate the 4×EHT-LTF.

13. The apparatus of claim 12, wherein an EHT-LTF sequence for the dRU is defined per dRU size per bandwidth (BW).

14. The apparatus of claim 12, wherein:

in distributing the subcarriers of the RU to generate the 4×EHT-LTF, the processor is configured to generate a distributed-tone RU long training field (dRU-LTF) by using a dRU-LTF sequence with subcarrier indices of the dRU; and in transmitting the 4×EHT-LTF for the UL TB PPDU with the dRU, the processor is configured to transmit the dRU-LTF for the UL TB PPDU with the dRU.

15. The apparatus of claim 14, wherein, in generating the dRU-LTF, the processor is configured to generate the dRU-LTF per bandwidth (BW) in one or more of a 20 MHz bandwidth, a 40 MHz bandwidth and an 80 MHz bandwidth.

16. The apparatus of claim 14, wherein the dRU-LTF sequence for a 20 MHz bandwidth or a 20 MHz frequency subblock is expressed as:

| $dRU\_LTF_{-122:122}$= |
| --- |
| {0 0 −1 1 −1 1 −1 1 1 1 −1 1 1 −1 1 −1 −1 −1 −1 1 −1 −1 1 −1 −1<br>1 1 −1 −1 −1 −1 −1 −1 −1 1 1 −1 1 −1 1 1 −1 1 −1 1 −1 −1 −1 −1 −1<br>1 1 1 −1 1 1 −1 −1 1 1 −1 1 −1 1 −1 1 −1 −1 1 −1 1 1 1 1 −1<br>1 1 −1 1 −1 −1 −1 1 1 −1 1 −1 −1 1 −1 −1 −1 −1 −1 −1 1 −1 1 −1 −1<br>1 1 −1 1 1 −1 1 1 −1 1 1 −1 1 −1 1 −1 1 −1 −1 1 −1 0 0 0 −1<br>1 −1 1 −1 −1 1 −1 −1 −1 1 −1 1 −1 −1 −1 1 1 1 −1 1 −1 −1 −1 −1 −1<br>−1 −1 −1 −1 −1 −1 1 1 −1 1 −1 −1 −1 −1 1 1 1 1 1 −1 −1 1 −1 −1 1<br>1 −1 −1 −1 −1 1 −1 1 1 −1 −1 1 1 1 −1 −1 1 −1 −1 −1 −1 −1 −1 1 1<br>−1 −1 1 −1 1 1 −1 1 1 −1 1 1 −1 1 1 −1 1 −1 1 −1 −1 1 1 −1 −1<br>−1 −1 1 1 1 −1 −1 −1 −1 1 −1 −1 −1 1 1 1 −1 1 0 0}. |

* * * * *